(12) United States Patent
Kim

(10) Patent No.: US 12,483,818 B2
(45) Date of Patent: Nov. 25, 2025

(54) ELECTRONIC DEVICE FOR SENSING WEARING STATE OF ELECTRONIC DEVICE USING INERTIAL SENSOR, AND METHOD FOR CONTROLLING SAME

(71) Applicant: SAMSUNG ELECTRONICS CO., LTD., Suwon-si (KR)

(72) Inventor: Kiyean Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 479 days.

(21) Appl. No.: 18/106,751

(22) Filed: Feb. 7, 2023

(65) Prior Publication Data
US 2023/0199366 A1 Jun. 22, 2023

Related U.S. Application Data

(63) Continuation of application No. PCT/KR2021/007270, filed on Jun. 10, 2021.

(30) Foreign Application Priority Data

Aug. 7, 2020 (KR) .................. 10-2020-0099494

(51) Int. Cl.
*H04R 1/10* (2006.01)
*H04R 29/00* (2006.01)

(52) U.S. Cl.
CPC ......... *H04R 1/1041* (2013.01); *H04R 1/1016* (2013.01); *H04R 29/00* (2013.01); *H04R 2420/07* (2013.01)

(58) Field of Classification Search
CPC .... H04R 1/1041; H04R 1/1016; H04R 29/00; H04R 2420/07

USPC ........................................................... 381/58
See application file for complete search history.

(56) References Cited

U.S. PATENT DOCUMENTS

| | | | |
|---|---|---|---|
| 10,555,066 | B1 | 2/2020 | Bunney et al. |
| 2009/0097689 | A1 | 4/2009 | Prest et al. |
| 2010/0053210 | A1 | 3/2010 | Kon |
| 2010/0259471 | A1 | 10/2010 | Takano et al. |

(Continued)

FOREIGN PATENT DOCUMENTS

| | | | | |
|---|---|---|---|---|
| CN | 110121129 A | | 8/2019 | |
| CN | 110381407 A | * | 10/2019 | ........... H04R 1/1041 |

(Continued)

OTHER PUBLICATIONS

International Search Report (PCT/ISA/210) dated Sep. 17, 2021 issued by the International Searching Authority in International Application No. PCT/KR2021/007270.

(Continued)

*Primary Examiner* — Sean H Nguyen
(74) *Attorney, Agent, or Firm* — Sughrue Mion, PLLC

(57) ABSTRACT

An electronic device includes: at least one sensor; and at least one processor disposed in electrical communication with the at least one sensor. The at least one processor is configured to: identify a first movement of the electronic device using the at least one sensor, identify a position of a rotation center point of the detected first movement, identify a classification of the first movement, based on the identified position of the rotation center point, and identify a first wearing angle of the electronic device, based on the determined classification.

20 Claims, 29 Drawing Sheets

(56) References Cited

U.S. PATENT DOCUMENTS

| | | |
|---|---|---|
| 2011/0077056 A1 | 3/2011 | Park et al. |
| 2014/0093088 A1 | 4/2014 | Tachibana et al. |
| 2016/0066078 A1 | 3/2016 | Baek et al. |
| 2018/0073886 A1 | 3/2018 | Ilse et al. |
| 2018/0103321 A1 | 4/2018 | Seo et al. |
| 2018/0374495 A1* | 12/2018 | Fienberg ................ H04R 1/406 |
| 2019/0222913 A1 | 7/2019 | Leclerc et al. |
| 2019/0230427 A1 | 7/2019 | Degner et al. |
| 2019/0306609 A1 | 10/2019 | Lee |
| 2022/0360883 A1 | 11/2022 | Tie |

FOREIGN PATENT DOCUMENTS

| | | | |
|---|---|---|---|
| CN | 110944261 A | 3/2020 | |
| CN | 111698632 A * | 9/2020 | ............. H04R 29/00 |
| JP | 2010-74228 A | 4/2010 | |
| JP | 2014-45312 A | 3/2014 | |
| JP | 2019-180082 A | 10/2019 | |
| KR | 10-2011-0033643 A | 3/2011 | |
| KR | 10-2016-0025850 A | 3/2016 | |
| KR | 10-2018-0039339 A | 4/2018 | |
| WO | 2012/153784 A1 | 11/2012 | |

OTHER PUBLICATIONS

Written Opinion (PCT/ISA/237) dated Sep. 17, 2022 issued by the International Searching Authority in International Application No. PCT/KR2021/007270.
Communication issued Jun. 28, 2024 by the Korean Patent Office for KR Patent Application No. 10-2020-0099494.

* cited by examiner

ELECTRONIC DEVICE FOR SENSING WEARING STATE OF ELECTRONIC DEVICE USING INERTIAL SENSOR, AND METHOD FOR CONTROLLING SAME

CROSS-REFERENCE TO RELATED APPLICATIONS

This application is a continuation of International Application No. PCT/KR2021/007270, filed on Jun. 10, 2021, which is based on and claims priority to Korean Patent Application No. 10-2020-0099494, filed on Aug. 7, 2020, in the Korean Intellectual Property Office, the disclosures of which are incorporated by reference herein in their entireties.

BACKGROUND

1. Field

The disclosure relates to an electronic device for sensing a wearing state of an electronic device using an inertial sensor, and a method for controlling the same.

2. Description of Related Art

With the development of digital technology, electronic devices are provided in various forms such as smartphones, tablet personal computers (PCs), or personal digital assistants (PDA). Electronic devices are also developed in a form capable of being worn on a user to improve portability and user accessibility thereof.

The electronic device may be an ear-wearable device capable of being worn on the ears of the user. The ear-wearable device may be connected to an external electronic device, and the external electronic device may transmit audio data (or audio content) to the ear-wearable device. The ear-wearable device may output the audio data (or audio content) received from the external electronic device through a speaker.

An electronic device and another electronic device (e.g., detachable earphones) may provide various functions. For example, an electronic device and another electronic device (e.g., detachable earphones) may include a beamforming microphone to effectively sense a user's voice, thereby providing improved call quality during a user's call. As another example, an electronic device and another electronic device (e.g., detachable earphones) may be divided into left/right earphones and provide (e.g., output) stereo sound according to each wearing direction.

An electronic device and another electronic device (e.g., detachable earphones) may be worn on, for example, the ears of a user. Since the locations (e.g., the user's ears) where the electronic device and another electronic device (e.g., detachable earphones) are worn fall outside of a user's field of view, it may be difficult for the user to wear the electronic devices at an correct angle. For this reason, when the user fails to wear the electronic devices in correct directions (e.g., rotated wearing), there may be a difference between the direction in which the above-described beamforming microphone senses the user's voice and the actual direction of the user's voice, so it may be difficult to effectively sense the user's voice. For example, a method of sensing the direction of gravity using an acceleration sensor (e.g., an accelerometer), estimating angles at which electronic devices are worn, based on the sensed direction of gravity, and adjusting parameters of the beamforming microphone (e.g., configuring the direction in which the beamforming microphone senses the user's voice) according to the estimated wearing angles may be considered. However, for example, in the case where the user wears the electronic devices while lying down or sitting at an angle on a chair, the wearing angles of the electronic devices may be incorrectly estimated.

Alternatively, if the user wears the electronic devices opposite each other (e.g., reverse wearing), there may be a difference between the direction in which the electronic devices are worn and the actual direction of the user's ears, so that the stereo sound may be output to be reversed between left and right. For example, a sound corresponding to the left ear may be output through the electronic device worn on the user's right ear, and a sound corresponding to the right ear may be output through the electronic device worn on the user's left ear. In the case where the electronic devices are implemented such that the user may wear the electronic devices on the ears without distinguishing between left and right, the above-described reverse wearing is highly likely to occur, thereby further causing the problem with reverse output of stereo sound between left and right.

SUMMARY

Provided are an electronic device that may identify an angle at which the electronic device is worn and/or whether or not the electronic device is reversely worn, based on the user, using at least one inertial sensor, and an operation method thereof.

In addition, provided are an electronic device that may identify a wearing angle and/or reverse or normal wearing, based on the user, adjusting parameters of a beamforming microphone, and/or outputting a stereo sound, and an operation method thereof.

According to an aspect of the disclosure, an electronic device includes: at least one sensor; and at least one processor configured to: detect a first movement of the electronic device using the at least one sensor, identify a position of a rotation center point of the detected first movement, identify a classification of the first movement, based on the identified position of the rotation center point, and identify a first wearing angle of the electronic device, based on the identified classification.

The at least one processor may be further configured to: identify at least one of a first linear velocity vector of the first movement or a first angular velocity vector of the first movement, based on sensing data obtained from the at least one sensor, and identify coordinates of the rotation center point, based on at least one of the first linear velocity vector or the first angular velocity vector.

The at least one processor may be further configured to identify whether the identified coordinates of the rotation center point are included in at least one range, and the at least one range is a range preconfigured based on at least one axis corresponding to an expected inserting angle of the electronic device into a user.

The at least one processor may be further configured to, based on the identified coordinates of the rotation center point being included in a first range of the at least one range, identify the classification of the first movement as a first classification, and the first range includes a region configured as at least one plane perpendicular to the at least one axis.

The at least one processor may be further configured to, based on the classification of the first movement being identified as the first classification, identify the first wearing angle or a first inserting angle of the electronic device, based on the coordinates of the rotation center point.

The electronic device may further include a communication circuit, and the at least one processor may be further configured to: receive, from a second electronic device via the communication circuit, information about a second movement of the second electronic device corresponding to the first movement, and based on the classification of the first movement being identified as the first classification, identify a wearing state of the first electronic device and a wearing state of the second electronic device, based on the first linear velocity vector and the information about the second movement.

The at least one processor may be further configured to: convert the first linear velocity vector, based on the first wearing angle and the first inserting angle, identify the converted second linear velocity vector of the second movement, based on the information about the second movement, and identify the wearing state of the first electronic device and the wearing state of the second electronic device, based on the converted first linear velocity vector and the converted second linear velocity vector.

The at least one processor is configured to, based on the identified coordinates of the rotation center point being included in a second range of the at least one range, identify the classification of the first movement as a second classification, and the second range includes a region configured as at least one conical surface having the at least one axis as a center axis.

The at least one processor may be further configured to, based on the classification of the first movement being identified as the second classification, identify one or more wearing angles or a first inserting angle of the electronic device, based on the identified coordinates of the rotation center point based on the first angular velocity vector.

The at least one processor may be further configured to, based on the classification of the first movement being identified as the second classification, identify one of the one or more wearing angles as the first wearing angle, based on the first linear velocity vector.

The at least one processor may be further configured to: identify a gravitational acceleration vector using the at least one sensor, convert the identified gravitational acceleration vector, based on the determined first wearing angle, and identify another one of the one or more wearing angles as the first wearing angle for identifying a wearing state of the first electronic device, based on the converted gravitational acceleration vector.

The at least one processor may be further configured to: identify whether a z-axis component of the converted gravitational acceleration vector is negative, and based on the z-axis component being identified as not negative, identify another one of the one or more wearing angles as the first wearing angle.

The at least one processor may be further configured to identify a wearing state of the first electronic device, based on the identified first wearing angle and the first inserting angle.

The at least one processor may be further configured to, based on the identified coordinates of the first angular velocity vector being included in a third range, identify the classification of the first movement as a second classification, and the third range includes a region configured as at least one plane perpendicular to at least one axis corresponding to an expected inserting angle of the electronic device into a user.

According to an aspect of the disclosure, a method for controlling an electronic device, includes: detecting a first movement of the electronic device using at least one sensor of the electronic device; identifying a position of a rotation center point of the detected first movement; identifying a classification of the first movement, based on the identified position of the rotation center point; and identifying a first wearing angle of the first electronic device, based on the identified classification.

The identifying the position of the rotation center point of the detected first movement may include: identifying at least one of a first linear velocity vector of the first movement or a first angular velocity vector of the first movement, based on sensing data received from the at least one sensor, and identifying coordinates of the rotation center point, based on at least one of the first linear velocity vector or the first angular velocity vector.

The identifying the classification of the first movement may include identifying whether the coordinates of the rotation center point are included in at least one range, and the at least one range is a range preconfigured based on at least one axis corresponding to an expected inserting angle of the electronic device into a user.

The identifying the classification of the first movement may further include, based on the coordinates of the rotation center point being included in a first range of the at least one range, identifying that the classification of the first movement is a first classification, and the first range includes a region configured as at least one plane perpendicular to the at least one axis.

The identifying the first wearing angle of the electronic device may include, based on the classification of the first movement being identified as the first classification, identifying the first wearing angle of the electronic device, based on the coordinates of the rotation center point.

The method may further include: receiving, from a second electronic device, information about a second movement of the second electronic device corresponding to the first movement, and based on the classification of the first movement being identified as the first classification, identifying a wearing state of the first electronic device and a wearing state of the second electronic device, based on the first linear velocity vector and the information about the second movement.

According to one or more embodiments, the electronic device may accurately determine the angle at which the electronic device is worn and/or whether or not the electronic device is reversely worn, based on the user.

According to one or more embodiments, the electronic device may accurately identify a wearing angle based on the user and make the voice sensing direction of a beamforming microphone match the actual user's voice direction.

According to one or more embodiments, the electronic device may identify whether or not reverse wearing of the user and, in the case of reverse wearing, output a stereo sound corresponding to the actual wearing position (e.g., the user's left or right ear).

Various effects exerted by the disclosure are not limited to the above-described effects.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
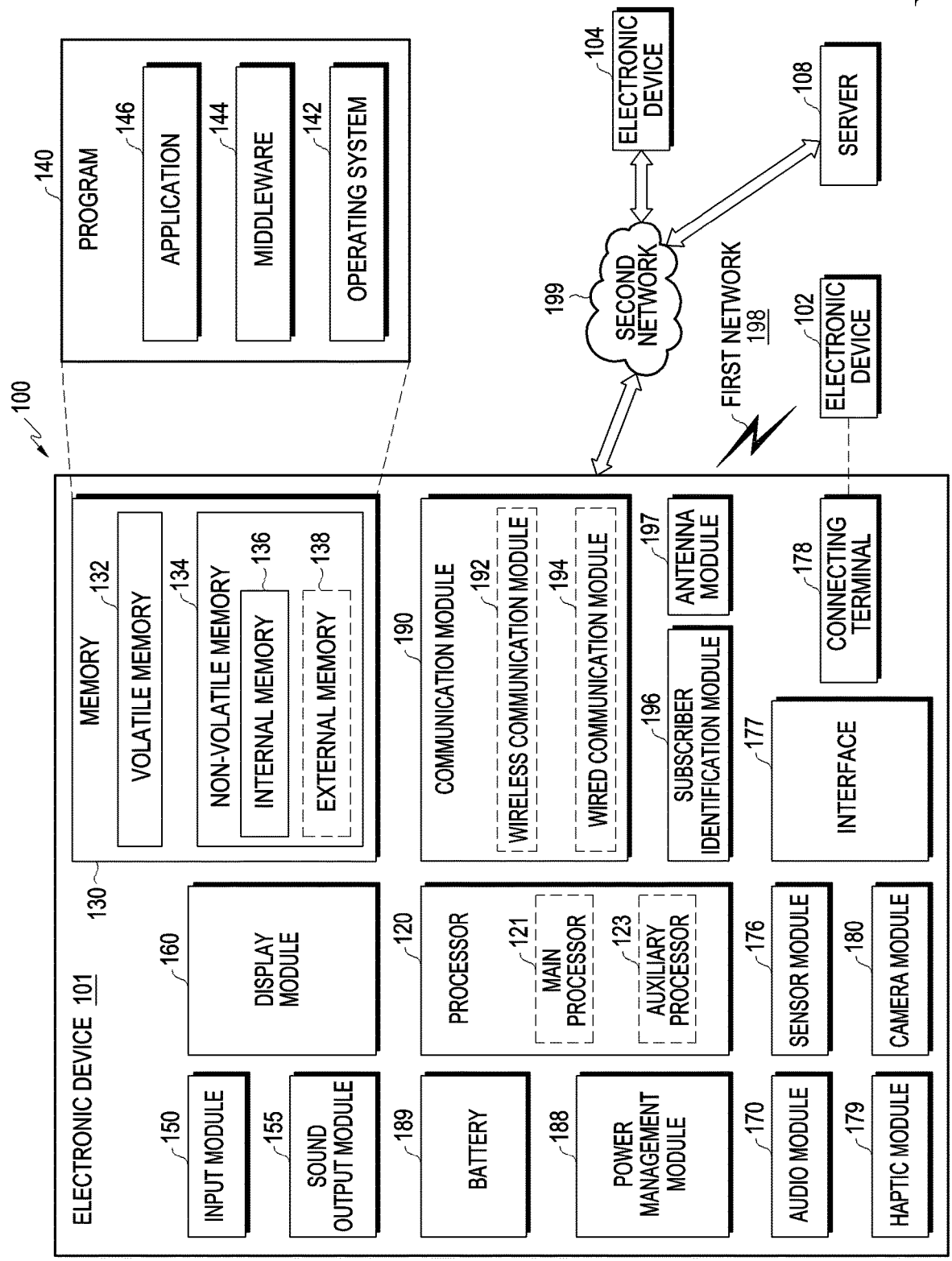
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
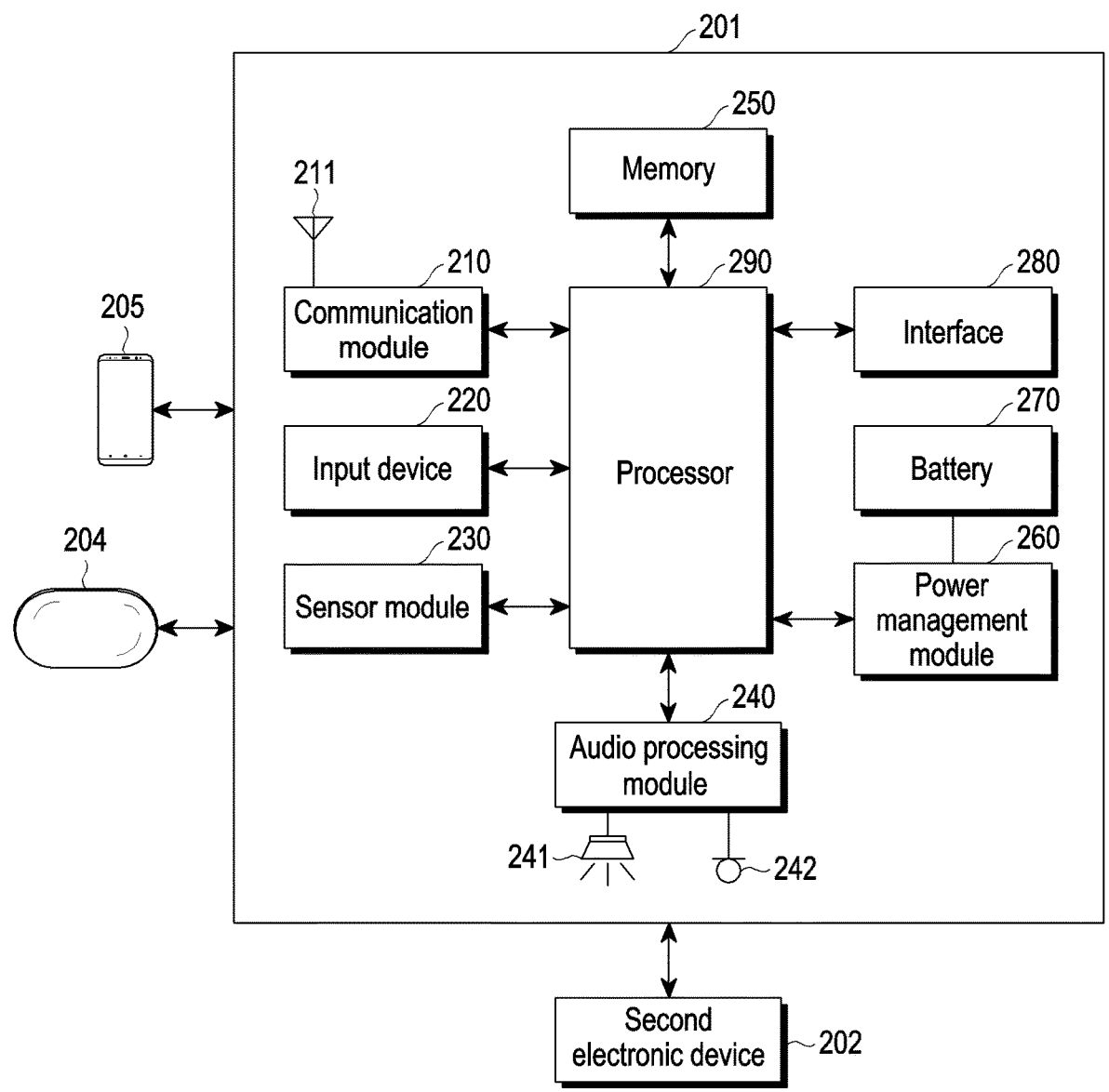
FIG. 2 is a block diagram of a first electronic device that wirelessly receives audio data from an external electronic device according to various embodiments.

FIG. 2 is a block diagram of a first electronic device 201 that wirelessly receives audio data from an external electronic device 205 (e.g., the electronic device 101 in FIG. 1) according to various embodiments.

According to various embodiments, a first electronic device 201 may be the electronic device 101 in FIG. 1. According to various embodiments, the first electronic device 201 may be the external electronic device 102 in FIG. 1 or the external electronic device 104 in FIG. 1. The first electronic device 201 may include an antenna 211 (e.g., the antenna module 197 in FIG. 1), a communication module 210 (e.g., the communication module 190 in FIG. 1), an input device 220 (e.g., the input device 150 in FIG. 1), a sensor module 230 (e.g., the sensor module 176 in FIG. 1), an audio processing module 240 (e.g., the audio module 170 in FIG. 1), a memory 250 (e.g., the memory 130 in FIG. 1), a power management module 260 (e.g., the power management module 188 in FIG. 1), a battery 270 (e.g., the battery 189 in FIG. 1), an interface 280 (e.g., the interface 177 in FIG. 1), and a processor 290 (e.g., the processor 120 in FIG. 1).

The communication module 210 may include a wireless communication module (e.g., a cellular communication module, a WiFi (wireless fidelity) communication module, a Bluetooth communication module, a near-field communication (NFC) communication module, or a global navigation satellite system (GNSS) communication module) or a wired communication module (e.g., a local area network (LAN) communication module or a power line communication module). A corresponding communication module among the above communication modules may communicate with at least one of a first external electronic device 204 (e.g., a charging device), a second external electronic device 205 (e.g., a portable terminal), or a second electronic device 202 through a first network (e.g., the first network 198 in FIG. 1) or a second network (e.g., the second network 199 in FIG. 1). The second electronic device 202 may be an earbud configured as a pair with the first electronic device 201. The communication module 210 may include one or more communication processors that operate independently of the processor 290 and support direct (e.g., wired) communication or wireless communication.

The antenna module 211 may transmit or receive a signal or power to or from another electronic device (e.g., the external electronic device 204 or 205 or the second electronic device 202). According to an embodiment, the antenna module 211 may include one antenna including a radiator configured as a conductor or a conductive pattern formed on a substrate (e.g., a printed circuit board (PCB)). According to an embodiment, the antenna module 211 may include a plurality of antennas. In this case, at least one antenna suitable for a communication scheme used in a communication network such as a first network (e.g., the first network 198 in FIG. 1) or a second network (e.g., the second network 199 in FIG. 2) may be selected from the plurality of antennas by, for example, the communication module 210. A signal or power may be transmitted or received between the communication module 210 and another electronic device through at least one selected antenna. According to some embodiments, other components (e.g., an RFIC) other than the radiator may be further formed as a part of the antenna module 211.

According to various embodiments, the antenna module 211 may include at least one of a coil in which current may be induced by a magnetic field to wirelessly receive power from another electronic device (e.g., the external electronic device 204 or 205 or the second electronic device 202), a resonator in which a resonance phenomenon is generated by a magnetic field having a specific resonance frequency, or a plurality of patch antennas for receiving electromagnetic waves.

The input device 220 may be configured to generate various input signals necessary for operation of the first electronic device 201. The input device 220 may include a touch pad, a touch panel, or buttons. The touch pad may recognize a touch input using, for example, capacitive touch-sensing, pressure-sensitive touch-sensing, infrared touch-sensing, and/or ultrasonic touch-sensing. In the case where a capacitive touch pad is provided, physical contact or proximity recognition may be possible. The touch pad may further include a tactile layer. The touch pad including a tactile layer may provide a tactile response to a user. The buttons may include, for example, physical buttons or an optical key.

According to various embodiments, the input device 220 may produce a user input regarding turning on or off the first electronic device 201. According to an embodiment, the input device 220 may receive a user input for a communication connection between the first electronic device 201 and the second external electronic device 205. According to an embodiment, the input device 220 may receive a user input related to audio data (or audio content). For example, the user input may relate to functions of starting playback of audio data, pausing playback, stopping playback, adjusting playback speed, adjusting playback volume, or muting sound. The operation of the first electronic device 201 may be controlled by various gestures such as tapping on the surface on which the touch pad is installed or swiping the same up and down. According to an embodiment, if a gesture of a single tap is sensed through the input device 220, the first electronic device 201 (or the processor 290) may reproduce audio data or pause the reproduction thereof. According to an embodiment, if a gesture of two taps is sensed through the input device 220, the first electronic device 201 may switch reproduction to the next audio data. If a gesture of three taps is sensed through the input device 220, the first electronic device 201 may switch reproduction to the previous audio data. According to an embodiment, if a gesture of swiping up or down is sensed through the input device 220, the first electronic device 201 may adjust the volume for reproduction of audio data. According to an embodiment, if a gesture of two taps is sensed through the input device 220 when a call is received, the first electronic device 201 may connect the call.

The sensor module 230 may measure a physical quantity or sense an operation state of the first electronic device 201. The sensor module 230 may convert measured or sensed information into an electrical signal. The sensor module 230 may include, for example, an acceleration sensor, a gyro sensor, a geomagnetic sensor, a magnetic sensor, a proximity sensor, a gesture sensor, a grip sensor, an optical sensor, or a biometric sensor. In an embodiment, the first electronic device 201 may further include an optical sensor. The optical sensor may include a light-emitting unit (e.g., a light-emitting diode (LED)) that outputs light in at least one wavelength band. The optical sensor may include a light-receiving unit (e.g., a photodiode) that receives light in one or more wavelength bands scattered or reflected from an object and generates an electrical signal.

The audio processing module 240 may support a function of collecting audio data. The audio processing module 240 may reproduce the collected audio data. According to an embodiment, the audio processing module 240 may include an audio decoder and a D/A converter. The audio decoder may convert audio data stored in the memory 250 into a digital audio signal. The D/A converter may convert the digital audio signal converted by the audio decoder into an analog audio signal. According to various embodiments, the audio decoder may convert audio data, which is received from the second external electronic device 205 through the communication module 210 and stored in the memory 250, into a digital audio signal. The speaker 241 may output the analog audio signal converted by the D/A converter. According to various embodiments, the audio processing module 240 may output stereo sound through the speaker 241. For example, the audio processing module 240 may convert audio data corresponding to the first electronic device 201, among the stored audio data, into a digital audio signal and output the same as an analog audio signal through the speaker 241. The audio processing module 240 may convert audio data corresponding to the first electronic device 201 into a digital audio signal, based on a wearing position (e.g., left or right) of the first electronic device 201, and output the same as an analog audio signal through the speaker 241. The audio processing module 240 may be controlled by the processor 290, and the processor 290 may determine audio data corresponding to the wearing position (e.g., left or right) of the first electronic device 201. According to an embodiment, the processor 290 provides information about the wearing position (e.g., left or right) of the first electronic device 201 to another electronic device (e.g., the second electronic device 202) or provide audio data that does not correspond to the wearing position of the first electronic device 201 (e.g., corresponding to the wearing position of the second electronic device 202) to another electronic device (e.g., the second electronic device 202), and the audio data that does not correspond to the wearing position of the first electronic device 201 (e.g., corresponding to the wearing position of the second electronic device 202) may be converted into a digital audio signal by another electronic device (e.g., the second electronic device 202) and output as an analog audio signal through a speaker of another electronic device (e.g., the second electronic device 202). According to an embodiment, the audio processing module 240 may include an A/D converter. The A/D converter may convert an analog voice signal transmitted through the microphone 242 into a digital voice signal. According to various embodiments, the microphone 242 may include a beamforming microphone. For example, the microphone 242 may include two or more microphones disposed to be spaced apart from each other at a predetermined interval, and receive an analog voice signal through each of the two or more microphones. For example, analog audio signals received through two microphones may be converted into digital audio signals through the A/D converter and transmitted to the processor 290. Paths (e.g., sound paths) through which analog voice signals are received through the two microphones may have a difference, for example, by a distance (e.g., an arrangement interval) between the two microphones. In the case where the first electronic device 201 is worn in a rotated state, a path through which analog voice signals are received through two microphones may be smaller than a distance between the two microphones. For example, if the first electronic device 201 is worn in the state of being rotated by a certain angle (e.g., $\theta$), the above-described difference in the sound path may be a value obtained by multiplying the distance between the two microphones by $(1-\cos \theta)$. The audio processing module 240 may perform time delay as much as the difference in sound paths on the analog voice signal received through any one microphone, synthesize the same with an analog voice signal received through the other microphone, and convert the synthesized analog audio signal into a digital audio signal. Through this, analog voice signals received in a specific direction with respect to the first electronic device 201 may be amplified through constructive interference, and analog voice signals received in a direction different from the specific direction may be canceled through destructive interference. The audio processing module 240 may amplify at least one of the analog voice signals received through the two microphones by a weight (e.g., a microphone gain) and then synthesize the analog voice signals. The value by which the audio processing module 240 performs time delay on the analog voice signal may be controlled by the processor 290. For example, the processor 290 may identify an angle (e.g., $\theta$) at which the first electronic device 201 is rotationally worn, thereby determining a difference in the sound path, and control the audio processing module 240 to perform time delay on the analog voice signal.

According to various embodiments, the audio processing module 240 may reproduce a variety of audio data configured in the operation of the first electronic device 201. For example, the audio processing module 240 may be designed to reproduce, if it is sensed that the first electronic device 201 is mounted to or detached from the ear, audio data related to a corresponding effect or notification sound. According to various embodiments, the audio processing module 240 may be designed to reproduce, if it is sensed that the first electronic device 201 is coupled to the first external electronic device 204 or separated from the first external electronic device 204, audio data related to a corresponding effect or notification sound. The output of the sound effect or notification sound may be omitted according to a user setting or a designer's intention. According to various embodiments, the audio processing module 240 may be designed to be included in the processor 290.

The memory 250 may store a variety of data used by at least one element (e.g., the processor 290 or the sensor module 230) of the first electronic device 201. Data may include, for example, software and input data on commands in relation thereto or output data thereof. The memory 250 may include a volatile memory or a non-volatile memory.

According to an embodiment, the memory 250 may include a non-volatile memory that stores first audio data (non-volatile audio data) received from the second external electronic device 205. According to various embodiments, the memory 250 may include a volatile memory that stores second audio data (volatile audio data) received from the second external electronic device 205.

According to an embodiment, the memory 250 may store local address information, peer address information, and authentication address information. According to an embodiment, local address information of the first electronic device 201 may indicate the Bluetooth device address (e.g., BD_ADDR) of the first electronic device 201, and peer address information of the first electronic device 201 may indicate the Bluetooth device address of a counterpart device (e.g., the second electronic device 202) paired with the first electronic device 201 in the Bluetooth network. The local address information and the peer address information of the first electronic device 201 may be used for a communication connection between the first electronic device 201 and a counterpart device (e.g., the second electronic device 202) paired therewith or a communication connection with the second electronic device 205. According to an embodiment, the local address information or the peer address information may be in the form of a 6-byte Bluetooth device address (e.g., BD_ADDR) or LE address information produced based on the Bluetooth device address. According to an embodiment, authentication address information of the first electronic device 201 is address information of the first external electronic device 204 for storing the first electronic device 201, and may include communication address information (e.g., the MAC address or Bluetooth address) of the first external electronic device 301 or unique identification information such as a serial number configured by the manufacturer of the first external electronic device 301, and may be configured in the first electronic device 201. According to an embodiment, the initial state of the first electronic device 201 may include the state in which authentication address information is not configured.

The power management module 260 may manage power supplied to the first electronic device 201. According to an embodiment, the power management module 260 may be implemented as, for example, at least a part of a power management integrated circuit (PMIC). According to an embodiment, the power management module 260 may include a battery charging module. According to an embodiment, when another electronic device (e.g., the external electronic device 204 or 205 or the second electronic device 202) is electrically connected to the first electronic device 201 (wireless or wired connection), the power management module 260 may receive power from another electronic device to charge the battery 270. According to an embodiment, if the first electronic device 201 is received inside the first external electronic device 204 in the state in which the first electronic device 201 is turned off, the first electronic device 201 may be turned on or at least a portion of the communication module 210 may be turned on, based on the power supplied from another electronic device.

The battery 270 may supply power to at least one element of the first electronic device 201. According to an embodiment, the battery 270 may include, for example, a non-rechargeable primary cell, a rechargeable secondary cell, or a fuel cell. According to an embodiment, if the first electronic device 201 is received inside the first external electronic device 204, the first electronic device 201 may charge the battery 270 to a predetermined charge level, and then the first electronic device 201 may be turned on, or at least a portion of the communication module 210 may be turned on.

The interface 280 may support one or more specified protocols that may be used by the first electronic device 201 to directly or wirelessly connect with the external electronic device 204 or 205. According to an embodiment, the interface 280 may include, for example, a high-definition multimedia interface (HDMI), a universal serial bus (USB) interface, an SD card interface, or an audio interface. According to an embodiment, the interface 280 may include a connection terminal for establishing a physical connection with the first external electronic device 204.

According to various embodiments, the first electronic device 201 may include a display device. The display device may be configured to provide various screen interfaces required for operation of the first electronic device 201. The display device may provide a user interface related to reproduction of audio data. According to various embodiments, the display device may provide a user interface related to a function of receiving audio data from the second external electronic device 205 or a function of transmitting audio data to the second external electronic device 205. According to various embodiments, the display device may include a light-emitting means such as a light-emitting diode (LED). For example, the light-emitting means may be controlled to emit light of a color corresponding to charging or completion of charging. For example, the light-emitting means may be controlled to emit light of a specific color if the first electronic device 201 is connected to the second external electronic device 205 through communication. For example, the light-emitting means may be controlled to emit light of a specific color depending on the reproduction state of audio data (e.g., during reproduction or pausing reproduction). For example, the light-emitting means may be controlled to emit light of a specific color depending on a user input produced through the input device.

The processor 290 may execute, for example, software to control at least one other element (e.g., a hardware or software element) of the first electronic device 201 connected to the processor 290, and perform processing of a variety of data or computation thereof. According to an embodiment, as at least part of data processing or computation, the processor 290 may load commands or data received from another element (e.g., the sensor module 230 or the communication module 210) to the volatile memory 250, process the commands or data stored in the volatile memory, and store resultant data thereof in the non-volatile memory.

According to an embodiment, the processor 290 may identify whether or not an electrical connection is established between the first electronic device 201 and the first external electronic device 204 through the sensor module 230 or the interface 280. According to an embodiment, the processor 290 may recognize a magnet installed in the first external electronic device 204 through a magnetic sensor (e.g., the Hall sensor) included in the sensor module 230, thereby identifying whether or not an electrical connection is established between the first electronic device 201 and the first external electronic device 204. According to an embodiment, the processor 290 may recognize that a connection terminal included in the interface 280 comes into contact with a connection terminal installed in the mounting portion of the first external electronic device 204, thereby identifying whether or not an electrical connection is established between the first electronic device 201 and the first external electronic device 204. According to an embodiment, the processor 290 may identify whether or not the first electronic device 201 is worn on the ear through the sensor module 230.

According to an embodiment, the processor 290 may sense a movement of the first electronic device 201 using the sensor module 230. For example, the processor 290 may sense a rotational movement and/or a translational movement of the first electronic device 201 using at least one inertial sensor (e.g., an acceleration sensor and/or a gyro sensor). For example, the processor 290 may obtain sensing data from at least one inertial sensor (e.g., an acceleration sensor and/or a gyro sensor) and sense a rotational movement and/or a translational movement of the first electronic device 201, based on the obtained sensing data. For example, the rotational movement may include a movement of rotating clockwise or counterclockwise about one axis (e.g., the Y-axis) of the first electronic device 201. The rotational motion may include a linear translational movement (e.g., a translational motion), as well as the clockwise or counterclockwise rotation movement about one axis (e.g., the y-axis) of the first electronic device 201, and in this disclosure, a rotational movement that does not include the linear translational movement (e.g., including a small proportion of translational movement) will be referred to as a pure rotational movement of rigid body about a fixed axis. According to an embodiment, the processor 290 may identify an acceleration (e.g., linear acceleration) and/or a gravitational acceleration of the movement of the first electronic device 201 using the acceleration sensor. Through this, the processor 290 may obtain an acceleration vector (e.g., a linear acceleration vector) of the movement of the first electronic device 201. The processor 290 may perform an integration operation with time on the obtained acceleration vector (e.g., a linear acceleration vector) to obtain a velocity vector (e.g., a linear velocity vector). According to an embodiment, the processor 290 may identify an angular velocity of the movement of the first electronic device 201 using the gyro sensor. Through this, the processor 290 may obtain an angular velocity vector of the movement of the first electronic device 201. The processor 290 may perform a differential operation with time on the obtained angular velocity vector to obtain an angular acceleration vector. According to an embodiment, based on the sensing data obtained from at least one inertial sensor (e.g., an acceleration sensor and/or a gyro sensor), the processor 290 may identify a 6-axis coordinate system based on the first electronic device 201. For example, the processor 290 may identify coordinates in the x-axis, y-axis, and/or z-axis direction using the acceleration sensor and identify a rotation angle (e.g., a pitch angle, a rolling angle, and/or a yawing angle) with respect to the x-axis, y-axis, and/or z-axis using the gyro sensor. According to an embodiment, the processor 290 may further obtain sensing data (e.g., geomagnetic data) from a geomagnetic sensor to identify a 9-axis coordinate system. The above-described 6-axis coordinate system and/or 9-axis coordinate system may be a fixed coordinate system with one point of the first electronic device 201 as a center point.

According to various embodiments, when the first electronic device 201 is connected to the second electronic device 202 through communication, the first electronic device 201 may become a master device and the second electronic device 202 may become a slave device. According to an embodiment, the first electronic device 201 as a master device may transmit the audio signal received from the second external electronic device 205 to the second electronic device 202, as well as outputting the audio signal to the speaker 241. According to an embodiment, when the first electronic device 201 is connected to the second electronic device 202 through communication, the first electronic device 201 may become a slave device and the second electronic device 202 may become a master device. According to various embodiments, the second electronic device 202 may include the same modules as those included in the first electronic device 201.

According to various embodiments, the first electronic device 201 may further include various modules according to its provision form. Although it is not possible to enumerate all of them due to the wide variety of variations according to the convergence of digital devices, the first electronic device 201 may further include elements equivalent to the above-mentioned elements. In addition, in the first electronic device 201 according to an embodiment, specific elements may be excluded from the above elements or replaced with other elements depending on its provision form. This will be easily understood by those of ordinary skill in the art.

According to various embodiments, the second electronic device 202 configured as a pair with the first electronic device 201 may include the same elements as those included in the first electronic device 201 and perform all or some of the operations of the first electronic device 201, which will be described later.

According to various embodiments, operations described in the disclosure may be performed by the processor 290 of the first electronic device 201 or the second electronic device 202, unless otherwise stated.

Figure 3:
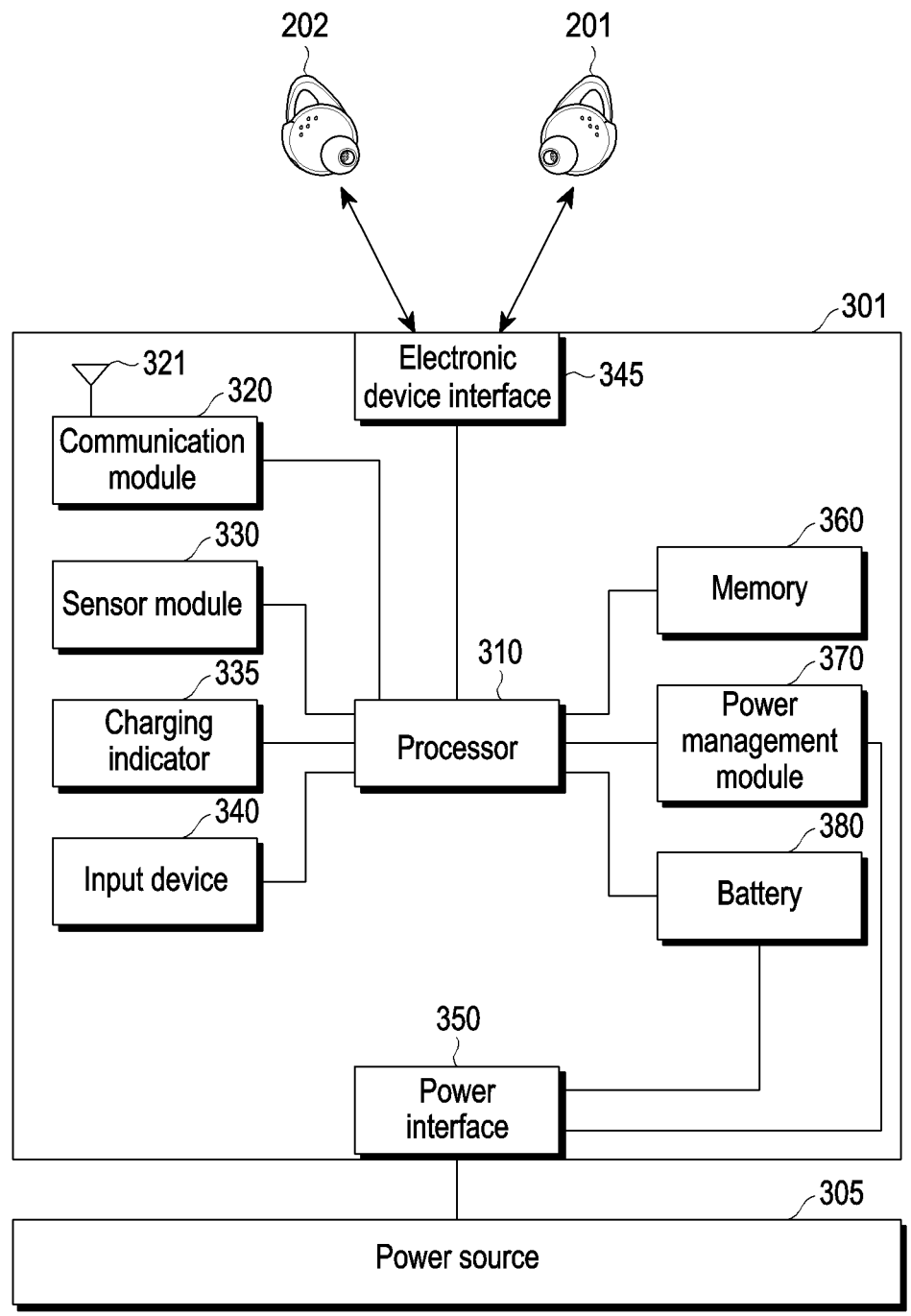
FIG. 3 is a block diagram of a first external electronic device that stores at least one electronic device according to various embodiments.

FIG. 3 is a block diagram of a first external electronic device 301 (e.g., the first external electronic device 204 in FIG. 2) that stores at least one electronic device (e.g., the first electronic device 201 and/or the second electronic device 202 in FIG. 2) according to various embodiments.

According to various embodiments, the first external electronic device 301 may be a case device for storing the first electronic device 201 and the second electronic device 202. The first external electronic device 301 may include a processor 310, an antenna 321, a communication module 320, a sensor module 330, at least one charging indicator 335, an input device 340, an electronic device interface 345, a power interface 350, a memory 360, a power management module 370, and a battery 380.

The processor 310 may execute, for example, software to control at least one other element (e.g., a hardware or software element) of the first external electronic device 301 connected to the processor 310, and perform processing of a variety of data or computation thereof. According to an embodiment, as at least part of data processing or computation, the processor 310 may load commands or data received from another element (e.g., the sensor module 330 or the communication module 320) to a volatile memory 360, process the commands or data stored in the volatile memory, and store resultant data thereof in a non-volatile memory.

The communication module 320 may include a wireless communication module (e.g., a cellular communication module, a WiFi (wireless fidelity) communication module, a Bluetooth communication module, a near-field communication (NFC) communication module, or a global navigation satellite system (GNSS) communication module) or a wired communication module (e.g., a local area network (LAN) communication module or a power line communication module). A corresponding communication module among the above communication modules may communicate with at least one of an external electronic device (e.g., the second external electronic device 205) (e.g., a portable terminal) or the electronic devices 201 and 202 through a first network (e.g., the first network 198 in FIG. 1) or a second network (e.g., the second network 199 in FIG. 1). The communication module 320 may include one or more communication processors that operate independently of the processor 310 and support direct (e.g., wired) communication or wireless communication.

The antenna module 321 may transmit or receive a signal or power to or from other electronic devices (e.g., the external electronic device (e.g., the second external electronic device 205 in FIG. 2) or the electronic devices 201 and 202). According to an embodiment, the antenna module 321 may include one antenna including a radiator configured as a conductor or a conductive pattern formed on a substrate (e.g., a PCB). According to an embodiment, the antenna module 321 may include a plurality of antennas. In this case, at least one antenna suitable for a communication scheme used in a communication network such as a first network (e.g., the first network 198 in FIG. 1) or a second network (e.g., the second network 199 in FIG. 2) may be selected from the plurality of antennas by, for example, the communication module 320. A signal or power may be transmitted or received between the communication module 320 and another electronic device through at least one selected antenna. According to some embodiments, other components (e.g., an RFIC) other than the radiator may be further formed as a part of the antenna module 321.

According to various embodiments, the antenna module 321 may include at least one of a coil in which current may be induced by a magnetic field to wirelessly receive power from a power source 305 or an external electronic device (e.g., the second external electronic device 205 in FIG. 2), a resonator in which a resonance phenomenon is generated by a magnetic field having a specific resonance frequency, or a plurality of patch antennas for receiving electromagnetic waves.

According to various embodiments, the antenna module 321 may include at least one of a coil for producing a change in a magnetic field to wirelessly receive power from the electronic devices 201 and 202, a resonator for generating a magnetic field having a specific resonance frequency, or a plurality of patch antennas for transmitting electromagnetic waves.

The sensor module 330 may measure a physical quantity or sense an operation state of the first external electronic device 301. The sensor module 330 may convert measured or sensed information into an electrical signal. The sensor module 330 may include, for example, an acceleration sensor, a gyro sensor, a geomagnetic sensor, a magnetic sensor, a proximity sensor, a gesture sensor, a grip sensor, an optical sensor, or a biometric sensor. According to an embodiment, the sensor module 330 may sense whether or not one or more of the electronic devices 201 and 202 are located inside the first external electronic device 301. According to an embodiment, the sensor module 330 may detect the state in which a cover of the first external electronic device 301 is open and the state in which the cover is closed. According to an embodiment, the processor 310 may be electrically connected to the sensor module 330 and receive signals indicating an open state and a closed state of the cover from the sensor module 330. If one or more of the electronic devices 201 and 202 are located inside the first external electronic device 301 and if the cover switches from the closed state to the open state, the processor 310 may generate a signal to turn on the communication modules (e.g., the communication module 210 in FIG. 2) of the electronic devices 201 and 202, and if one or more of the electronic devices 201 and 202 are located inside the first external electronic device 301 and if the cover switches from the open state to the closed state, the processor 310 may generate a signal to turn off the communication modules (e.g., the communication module 210 in FIG. 2) of the electronic devices 201 and 202. According to an embodiment, if the cover is in the open state, the sensor module 330 may trigger the processor 310 such that the electronic devices 201 and 202 and an external electronic device (e.g., the second external electronic device 205 in FIG. 2) enter a pairing mode.

At least one charging indicator 335 may display the charge levels of the battery 380 and/or the batteries (e.g., the battery 270 in FIG. 2) of the electronic devices 201 and 202. The user may identify the amount of charge in the battery 380 of the first external electronic device 301 or the amounts of charge in the batteries (e.g., the battery 270 in FIG. 2) of the electronic devices 201 and 202 through the charging indicator 335 on the surface of the first external electronic device 301. The charging indicator 335 may be implemented as a display, or may be implemented as an LED.

The input device 340 may be configured to generate various input signals necessary for operation of the first external electronic device 301. The input device 340 may include a touch pad, a touch panel, or buttons. The touch pad may recognize a touch input using, for example, capacitive touch-sensing, a pressure-sensitive touch-sensing, an infrared touch-sensing, and/or an ultrasonic touch-sensing. In the case where a capacitive touch pad is provided, physical contact or proximity recognition may be possible. The touch pad may further include a tactile layer. The touch pad including a tactile layer may provide a tactile response to a user. The buttons may include, for example, physical buttons or an optical key.

The electronic device interface 345 may support one or more specified protocols that may be used by the first external electronic device 301 to directly or wirelessly connect with the electronic devices 201 and 202. According to an embodiment, the electronic device interface 345 may include, for example, a high-definition multimedia interface (HDMI), a universal serial bus (USB) interface, an SD card interface, or an audio interface. According to an embodiment, the interface 345 may include a connection terminal for establishing a physical connection with the electronic devices 201 and 202. According to an embodiment, the processor 310 may identify whether or not a physical connection is established between the first external electronic device 301 and the electronic devices 201 and 202 through the electronic device interface 345. According to an embodiment, if the processor 310 identifies the physical contact between the first external electronic device 301 and the electronic devices 201 and 202 through the electronic device interface 345, the processor 310 may generate a charging signal to initiate charging of electronic devices 201 and 202. According to an embodiment, the processor 310 may identify that either or both of the electronic devices 201 and 202 have been removed from the first external electronic device 301 through the electronic device interface 345, and the processor 310 may generate a removal signal to stop charging of the removed electronic devices 201 and/or 202.

The power interface 350 may support one or more specified protocols to be used for the first external electronic device 301 to be directly or wirelessly connected to the power source 305 or an external electronic device (e.g., the second external electronic device 205 in FIG. 2). The power interface 350 according to an embodiment may include a USB connector, a lightning connector, or a part of a receptacle connector for another connector capable of providing power to the first external electronic device 301. The power interface 350 according to an embodiment may be equipped with a structure including an antenna 321 to wirelessly receive power from the power source 305 or an external electronic device (e.g., the second external electronic device 205 in FIG. 2).

The memory 360 may store a variety of data used by at least one element (e.g., the processor 310 or the sensor module 330) of the first external electronic device 301. Data may include, for example, software and input data on commands in relation thereto or output data thereof. The memory 360 may include a volatile memory or a non-volatile memory.

According to various embodiments, the memory 360 may store configuration information related to a Bluetooth communication connection. The configuration information may include at least one piece of first Bluetooth address information, second Bluetooth address information, or identification information of the first external electronic device 301. According to an embodiment, the first Bluetooth address information or the second Bluetooth address information may include a Bluetooth device address (e.g., BD_ADDR) or LE address information produced based on the Bluetooth device address. According to an embodiment, the first Bluetooth address information or the second Bluetooth address information may further include device classification information indicating one of a right earbud or a left earbud. According to an embodiment, the first Bluetooth address information or the second Bluetooth address information may further include device classification information indicating one of a master device and a slave device. According to an embodiment, the first Bluetooth address information and the second Bluetooth address information may include different Bluetooth device addresses and device classification information from each other. According to an embodiment, the configuration information regarding the Bluetooth communication connection may further include identification information of the first external electronic device 301. According to an embodiment, the identification information of the first external electronic device 301 may include communication address information (e.g., a MAC address or Bluetooth address) of the first external electronic device 301 or unique identification information such as a serial number configured by the manufacturer of the first external electronic device 301. The identification information 813 of the first external electronic device 301 is not limited to the above example, and may include information in various formats for identifying the first external electronic device 301.

According to various embodiments, the memory 360 may store information related to use of at least one of a near-field communication (NFC) tag, a radio frequency identification (RFID) tag, a magnetic secure transmission (MST) device, a quick response (QR) code, or a bar code. According to various embodiments, at least one of the NFC tag, the RFID tag, the MST device, the QR code, or the barcode may be included in the first external electronic device 301, and may be included in the elements of the first external electronic device 301 shown in FIG. 3 or may be implemented as a separate element in the first external electronic device 301. At least one of the NFC tag, the RFID tag, the MST device, the QR code, or the barcode may store at least one piece of the first Bluetooth address information, the second Bluetooth address information, or the identification information of the first external electronic device 301.

The power management module 370 may manage power supplied to the first external electronic device 301. According to an embodiment, the power management module 370 may be implemented as, for example, at least a part of a power management integrated circuit (PMIC). According to an embodiment, the power management module 370 may include a battery charging module. According to an embodiment, the power management module 370 may receive wireless or wired power from the power source 305 or an external electronic device (e.g., the second external electronic device 205 in FIG. 2) under the control of the processor 310 and charge the battery 380. According to an embodiment, the power management module 370 may provide wireless or wired power of the battery 380 to the electronic devices 201 and 202 through the electronic device interface 345 or the antenna 321 under the control of the processor 310.

The battery 380 may supply power to at least one element of the first external electronic device 301. According to an embodiment, the battery 380 may include, for example, a non-rechargeable primary cell, a rechargeable secondary cell, or a fuel cell.

According to various embodiments, the first electronic device 201 may identify at least one piece of the first Bluetooth address information, the second Bluetooth address information, or the identification information of the first external electronic device 301 stored in at least one of the memory 360, the NFC tag, the RFID tag, the MST device, the QR code, or the barcode from the first external electronic device 301 through a communication module (e.g., the communication module 210 in FIG. 2) or a sensor module (e.g., the sensor module 230 in FIG. 2).

According to various embodiments, the first external electronic device 301 may further include various modules according to its provision form. Although it is not possible to enumerate all of them due to the wide variety of variations according to the convergence of digital devices, the first external electronic device 301 may further include elements equivalent to the above-mentioned elements. In addition, in the first external electronic device 301 according to an embodiment, specific elements may be excluded from the above elements or replaced with other elements depending on its provision form. This will be easily understood by those of ordinary skill in the art.

Figure 4A:
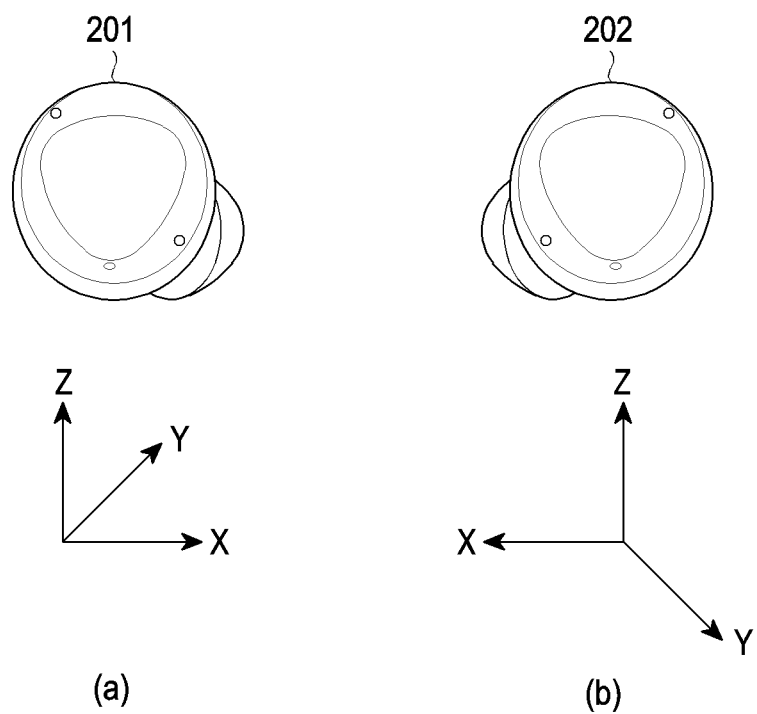
FIG. 4A is a diagram illustrating a 6-axis coordinate system of a first electronic device and a second electronic device according to various embodiments.

FIG. 4A is a diagram illustrating a 6-axis coordinate system of a first electronic device 201 and a second electronic device 202 according to various embodiments.

According to various embodiments, the first electronic device (e.g., the processor 290 in FIG. 2) may identify a 6-axis coordinate system using inertial sensors (e.g., an acceleration sensor and a gyro sensor). For example, the first electronic device (e.g., the processor 290 in FIG. 2) may identify the 6-axis coordinate system illustrated in (a) of FIG. 4A. According to various embodiments, the first electronic device (e.g., the processor 290 in FIG. 2) may identify movement of the first electronic device 201 using sensing data obtained from inertial sensors (e.g., an acceleration sensor and a gyro sensor) and calculate the identified movement into coordinates on the 6-axis coordinate system. For example, the first electronic device (e.g., the processor 290 in FIG. 2) may calculate a linear acceleration vector, a linear velocity vector, an angular acceleration vector, an angular velocity vector, and/or a rotation center point indicating the movement of the first electronic device 201 into coordinates on the 6-axis coordinate system.

According to various embodiments, the second electronic device 202 may identify a 6-axis coordinate system using inertial sensors (e.g., an acceleration sensor and a gyro sensor). For example, the second electronic device 202 may identify the 6-axis coordinate system shown in (b) of FIG. 4A. According to various embodiments, the second electronic device 202 may include the same modules as those of the first electronic device 201, and similarly, calculate movement of the second electronic device 202 into coordinates on the 6-axis coordinate system.

The above-described 6-axis coordinate system of the first electronic device 201 and the second electronic device 202 may be a coordinate system fixed with respect to the corresponding electronic device.

Figure 4B:
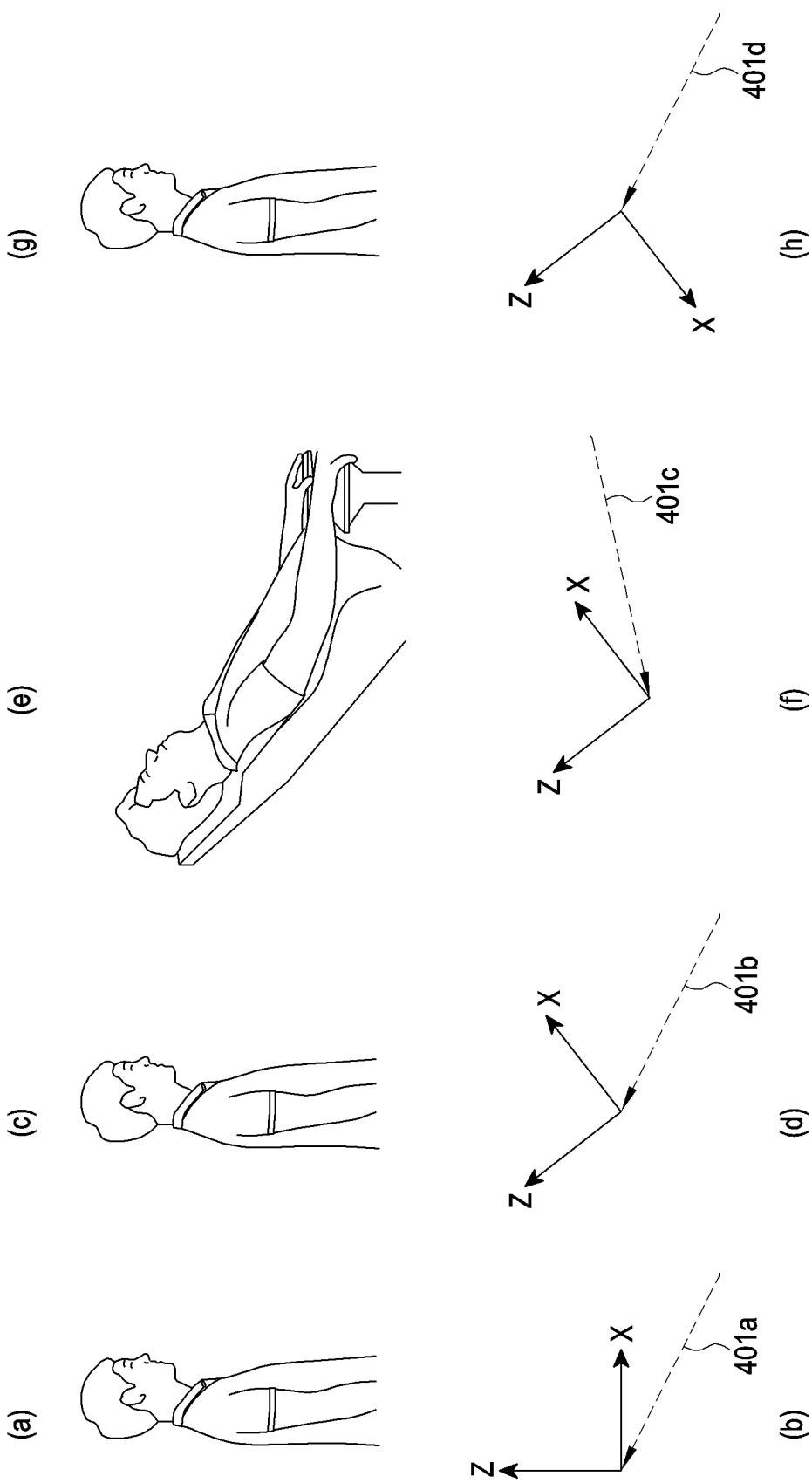
FIG. 4B illustrates an example of the state in which a user wears a first electronic device according to various embodiments.

FIG. 4B illustrates an example of the state in which a user wears a first electronic device (e.g., the first electronic device 201 in FIG. 2) according to various embodiments.

(a) of FIG. 4B shows a first example in which a user wears the first electronic device 201, (b) of FIG. 4B shows a direction 401a in which the user's voice is received (e.g., the direction of the mouth) on the coordinate system of the first electronic device 201 in the first example. For example, the first example may show the state in which the user wears the first electronic device 201 on the right ear such that the X-axis of the coordinate system of the first electronic device 201 is directed toward the front. Referring to (b) of FIG. 4B, the direction 401a in which the user's voice is received (e.g., the direction of the mouth) may be inclined clockwise at a predetermined angle with respect to the X-axis of the coordinate system of the first electronic device 201.

(c) of FIG. 4B shows a second example in which the user wears the first electronic device 201, and (d) of FIG. 4B shows a direction 401b in which the user's voice is received (e.g., the direction of the mouth) on the coordinate system of the first electronic device 201 in the second example. For example, compared to the first example, the second example may show the state in which the user rotates the first electronic device 201 counterclockwise by a predetermined angle and wears the same on the right ear. Referring to (b) and (d) of FIG. 4B, the direction 401b in which the user's voice is received (e.g., the direction of the mouth) may be further inclined by an angle at which the first electronic device 201 is rotationally worn from the X-axis of the coordinate system of the first electronic device 201, compared to the first example.

(e) of FIG. 4B shows a third example in which the user wears the first electronic device 201, and (f) of FIG. 4B shows a direction 401c in which the user's voice is received (e.g., the direction of the mouth) on the coordinate system of the first electronic device 201 in the third example. For example, the third example may show the state in which the user sits obliquely on a chair while wearing the first electronic device 201. Referring to (b) and (f) of FIG. 4B, although the direction in which the user's voice is received (e.g., the direction of the mouth) 401c in the third example is the same as that in the first example, based on the X-axis of the coordinate system of the first electronic device 201, the coordinate system in the third example may be tilting by a predetermined angle with respect to the direction of gravity (e.g., a direction perpendicular to the ground), compared to the coordinate system in the first example.

(g) of FIG. 4B illustrates a fourth example in which the user wears a second electronic device (e.g., the second electronic device 202 in FIG. 2), and (h) of FIG. 4B illustrates a direction 401d in which the user's voice is received (e.g., the direction of the mouth) on the coordinate system of the second electronic device 202 in the fourth example. For example, the fourth example may show the state in which the user wears the second electronic device 202 on the right ear, unlike the first to third examples. In the disclosure, the state in which the user wears the second electronic device 202 on the right ear or the state in which the user wears the first electronic device 201 on the left ear will be described as a left-right inversion wearing state or a reverse wearing state. Referring to (h) of FIG. 4B, the direction 401d in which the user's voice is received (e.g., the direction of the mouth) in the fourth example may be different from those in the first to third examples, based on the X-axis of the coordinate system of the second electronic device 202. In addition, the coordinate system of the second electronic device 202 in the fourth example may be different from the coordinate system of the first electronic device 201 in the first to third examples, based on the direction of gravity (e.g., the direction perpendicular to the ground).

Figure 5A:
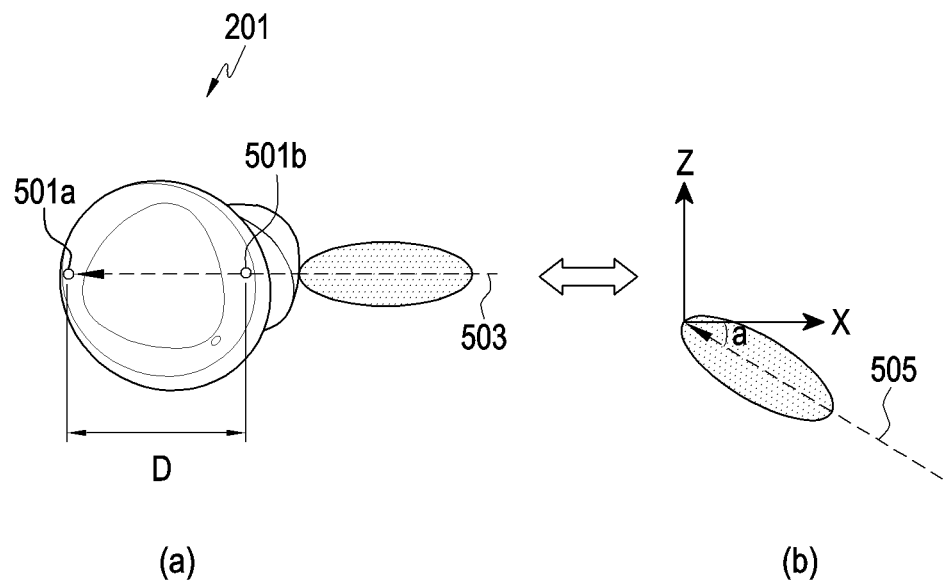
FIG. 5A is a diagram illustrating a method in which a first electronic device senses a user's voice using a beamforming microphone according to various embodiments.

FIG. 5A is a diagram illustrating a method in which a first electronic device (e.g., the first electronic device 201 in FIG. 2) senses a user's voice using a beamforming microphone according to various embodiments.

Referring to (a) of FIG. 5A, the first electronic device 201 may include two or more microphones. For example, the first electronic device 201 may include a first microphone 501a and a second microphone 501b, and the first microphone 501a and the second microphone 501b may be spaced a predetermined distance D apart from each other. According to various embodiments, the first electronic device 201 may sense a voice signal received in a specific direction 503 using the first microphone 501a and the second microphone 501b. For example, if a voice signal is received in a specific direction 503, a difference between a sound path through which a voice signal is received by the first microphone 501a and a sound path through which a voice signal is received by the second microphone 501b may be D. The first electronic device 201 may perform time delay on the voice signal sensed through the second microphone 501b by the difference D of the sound path, and then synthesize the same with the voice signal sensed through the first microphone 501a. According to various embodiments, if the degree of time delay (e.g., a beamforming parameter) is fixed, a voice signal received in the fixed specific direction 503 is amplified to be sensed, whereas voice signals received in other directions may be offset to be sensed. According to various embodiments, the degree of time delay may be adjusted by a processor (e.g., the processor 290 in FIG. 2).

Referring to (b) of FIG. 5A, sensing of a voice signal received in a specific direction 503 by the first electronic device 201 is illustrated on the coordinate system of the first electronic device 201. If the first electronic device 201 described above in (a) of FIG. 5A is configured to amplify and sense a voice signal received in a specific direction 503, a voice signal received in a direction 505 corresponding to the specific direction 503 may be amplified to be sensed. The specific direction 503 may be determined according to positions where the first microphone 501a and the second microphone 501b are disposed, and for example, the specific direction 503 may be inclined clockwise by a predetermined angle (a) with respect to the X-axis of the coordinate system of the first electronic device 201. The first electronic device 201 may adjust the angle (a) in the specific direction 503 by adjusting the degree of time delay. Hereinafter, amplifying and sensing a voice signal received in a specific direction 503 will be described as performing a beamforming operation in a specific direction (or a specific angle) by the first electronic device 201.

Figure 5B:
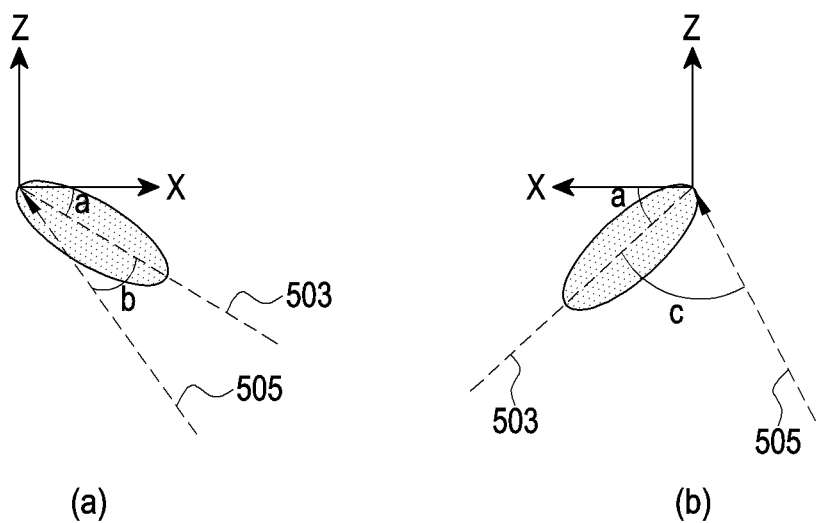
FIG. 5B illustrates examples in which a first electronic device or a second electronic device performs a beamforming operation in a fixed direction according to various embodiments.

FIG. 5B illustrates examples in which a first electronic device (e.g., the first electronic device 201 in FIG. 2) or a second electronic device (e.g., the second electronic device 202 in FIG. 2) performs a beamforming operation in a fixed direction according to various embodiments. Hereinafter, description will be made with reference to FIG. 4B.

According to various embodiments, the first electronic device 201 or the second electronic device 202 may perform a beamforming operation in a specific direction 503.

(a) of FIG. 5B illustrates a direction 505 in which a voice signal is received and a direction 503 in which the first electronic device 201 performs a beamforming operation on the coordinate system of the first electronic device 201 in the second example in FIG. 4B. As shown in the second example in FIG. 4B, if the user rotates the first electronic device 201 counterclockwise by a predetermined angle (b) and wears the same, there may be a difference between the angle at which the voice signal is received and the angle (a) at which the first electronic device 201 performs a beamforming operation by an angle (b) at which the device is rotated clockwise and worn. In this case, if the first electronic device 201 performs a beamforming operation in a fixed direction, a voice signal received at an angle different from the angle (a) at which the beamforming operation is performed may not be properly sensed. If the user rotates and wears the first electronic device 201 by a predetermined angle while sitting obliquely on a chair as shown in the third example in FIG. 4B, the same problem may occur.

(b) of FIG. 5B illustrates a direction 505 in which a voice signal is received and a direction 503 in which the second electronic device 202 performs a beamforming operation on the coordinate system of the second electronic device 202 in the fourth example in FIG. 4B. As shown in the second example in FIG. 4B, in the case of a reverse wearing state in which the user wears the second electronic device 202 on the right ear, the angle at which a voice signal is received may have a difference from the angle (a) at which the second electronic device 202 performs a beamforming operation by a certain angle (c) in the clockwise direction. In this case, if the second electronic device 202 performs a beamforming operation in a fixed direction, a voice signal received at an angle different from the angle (a) at which the beamforming operation is performed may not be properly sensed. If the user rotates and wears the second electronic device 202 by a predetermined angle in the reverse wearing state, the same problem may occur.

Figure 6A:
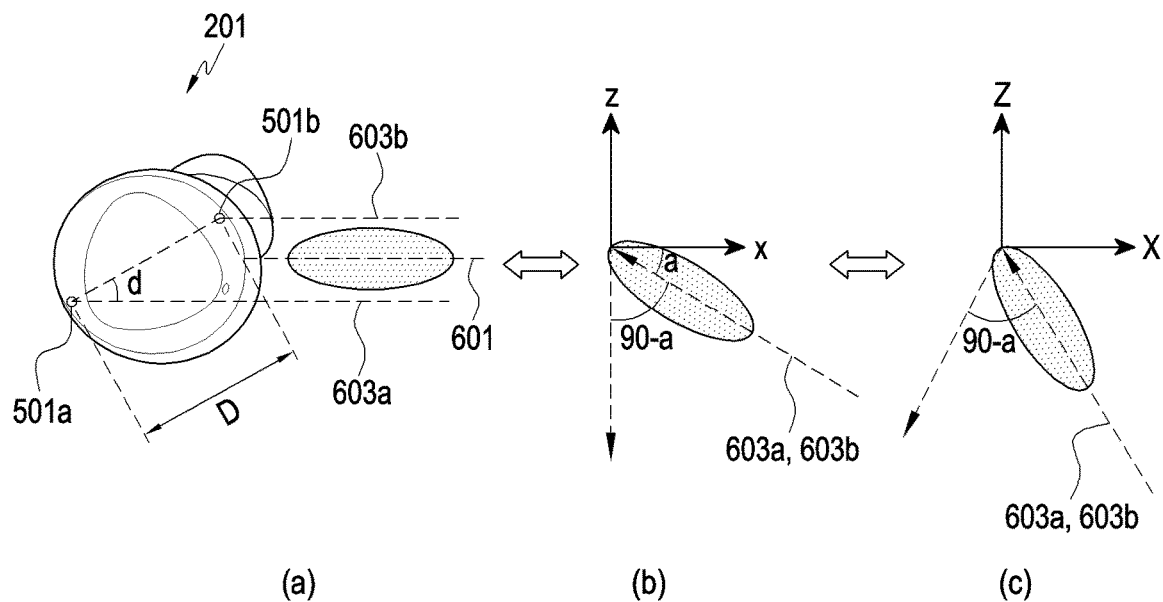
FIG. 6A is a diagram illustrating a method in which a first electronic device senses a user's voice using a beamforming microphone according to various embodiments.

FIG. 6A is a diagram illustrating a method in which a first electronic device (e.g., the first electronic device 201 in FIG. 2) senses a user's voice using a beamforming microphone according to various embodiments.

Referring to (a) of FIG. 6A, the first electronic device 201 may include two or more microphones. For example, the first electronic device 201 may include a first microphone 501a and a second microphone 501b, and the first microphone 501a and the second microphone 501b may be spaced a predetermined distance D apart from each other. According to various embodiments, the first electronic device 201 may sense a voice signal received in a specific direction 601 using the first microphone 501a and the second microphone 501b. For example, if a voice signal is received in a specific direction 601, a difference between a sound path through which a voice signal 603a is received by the first microphone 501a and a sound path through which a voice signal 603b received by the second microphone 501b may be D(1−cos(d)). The first electronic device 201 may perform time delay on the voice signal sensed through the second microphone 501b by the difference (D(1−cos(d))) of the sound path, and then synthesize the same with the voice signal sensed through the first microphone 501a. According to various embodiments, the first electronic device 201 may adjust the degree of time delay (e.g., a beamforming parameter). For example, the first electronic device 201 may sense the direction of gravity (g) and adjust the degree to which time delay is performed on the voice signal received through the first microphone 501a and/or the second microphone 501b such that the angle at which beamforming is performed corresponds to a predetermined angle (90°-a), based on the direction of gravity (g).

Referring to (b) of FIG. 6A, reception of voice signals 603a and 603b in a specific direction by the first electronic device 201 is illustrated on a coordinate system of the user. For example, the coordinate system of the user may be a coordinate system in which a direction opposite the direction of gravity (g) is the z-axis and in which the front of the user is the x-axis. The user's voice may be received by the first electronic device 201 in the state of being inclined by a predetermined angle (90°-a) with respect to the direction of gravity.

Referring to (c) of FIG. 6A, reception of the voice signals 603a and 603b in (b) of FIG. 6A by the first electronic device 201 is illustrated on the coordinate system of the first electronic device 201. The first electronic device 201 may adjust the angle at which beamforming is performed to correspond to a predetermined angle (90°-a) with respect to the direction of gravity (g) and perform a beamforming operation at a predetermined angle (90°-a) with the direction of gravity (g), thereby amplifying and sensing the voice signal received at a predetermined angle (90°-a) even if the first electronic device 201 is worn in the rotated state.

Figure 6B:
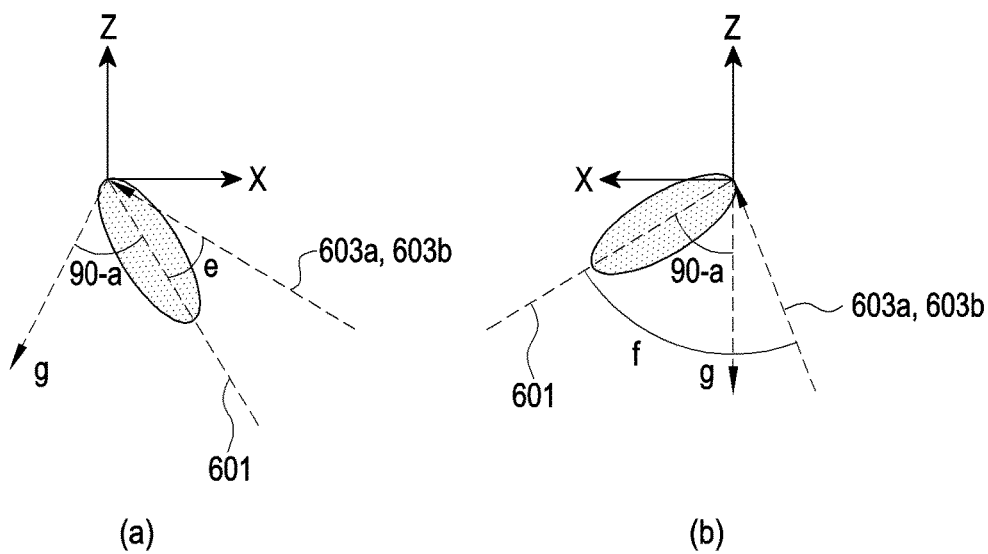
FIG. 6B illustrates examples in which a first electronic device or a second electronic device performs a beamforming operation, based on a direction of gravity, according to various embodiments.

FIG. 6B illustrates examples in which a first electronic device (e.g., the first electronic device 201 in FIG. 2) or a second electronic device (e.g., the second electronic device 202 in FIG. 2) performs a beamforming operation, based on a direction of gravity, according to various embodiments. Hereinafter, description will be made with reference to FIG. 4B.

According to various embodiments, the first electronic device 201 or the second electronic device 202 may perform a beamforming operation at a predetermined angle (90°-a) with the direction of gravity (g).

(a) of FIG. 6B illustrates a direction in which voice signals 603a and 603b are received and a direction 601 in which the first electronic device 201 performs a beamforming operation on the coordinate system of the first electronic device 201 in the third example in FIG. 4B. As shown in the third example in FIG. 4B, the user may be in the state in which the user sits obliquely on a chair while wearing the first electronic device 201. In this case, there may be a difference between the angle at which the voice signals 603a and 603b are received and the angle (90°-a) at which the first electronic device 201 performs a beamforming operation based on the direction of gravity (g) by the angle (e) at which the user sits obliquely. If the first electronic device 201 determines the angle (90°-a), based on the direction of gravity (g), and performs the beamforming operation, the voice signals 603a and 603b received at an angle different from the angle (90°-a) at which the beamforming operation is performed may not be properly sensed.

(b) of FIG. 6B illustrates a direction in which voice signals 603a and 603b are received and a direction 601 in which the second electronic device 202 performs a beamforming operation on the coordinate system of the second electronic device 202 in the fourth example in FIG. 4B. As shown in the second example in FIG. 4B, in the case of a reverse wearing state in which the user wears the second electronic device 202 on the right ear, the angle at which a voice signal is received may have a difference from the angle (90°-a) at which the second electronic device 202 performs a beamforming operation with respect to the direction of gravity (g) by a certain angle (f). If the first electronic device 201 determines the angle (90°-a) based on the direction of gravity (g) and performs a beamforming operation, a voice signal received at an angle different from the angle (90°-a) at which the beamforming operation is performed may not be properly sensed.

As described above with reference to FIGS. 5B and 6B, if the first electronic device 201 performs a beamforming operation in a fixed direction or performs a beamforming operation based on the direction of gravity, voice signals may not be properly sensed depending on the posture or angle at which the user wears the electronic devices in daily life.

Figure 7:
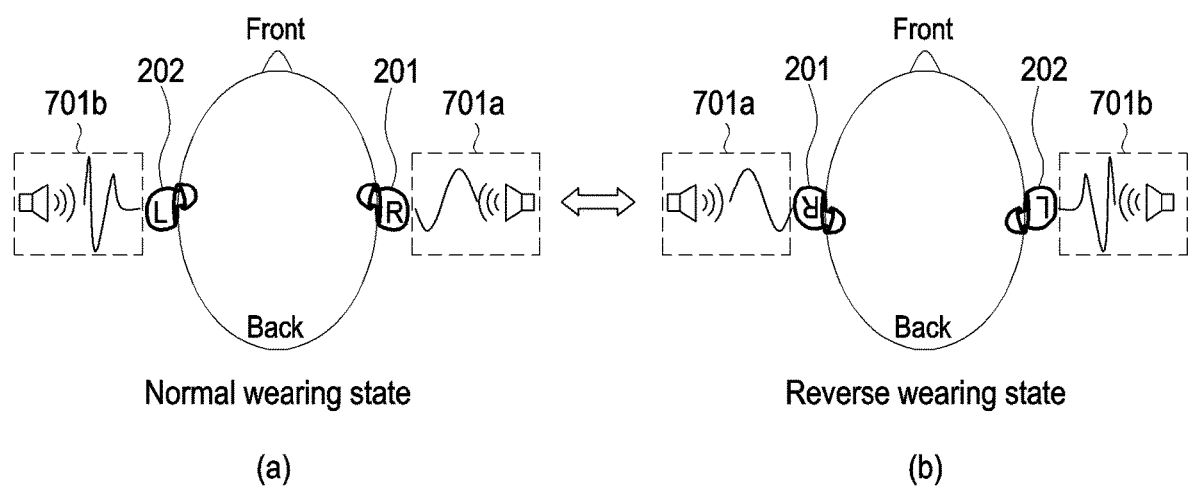
FIG. 7 is a diagram illustrating the case in which a first electronic device and a second electronic device provide a stereo sound according to various embodiments.

FIG. 7 is a diagram illustrating the case in which a first electronic device 201 and a second electronic device 202 provide a stereo sound according to various embodiments.

Referring to (a) of FIG. 7, the state in which the user normally wears the first electronic device 201 and the second electronic device 202 is illustrated. For example, the normal wearing state may be the state in which the first electronic device 201 is worn on the user's right ear and in which the second electronic device 202 is worn on the user's left ear. The first electronic device 201 may be configured to output an audio signal 701*a* corresponding to the right ear, and the second electronic device 202 may be configured to output an audio signal 701*b* corresponding to the left ear. As shown in the drawing, in the normal wearing state, the audio signal 701*a* corresponding to the right ear may be output through the first electronic device 201 worn on the right side, and the audio signal 701*b* corresponding to the left ear may be output through the second electronic device 202 worn on the left side, thereby normally providing a stereo sound output function.

Referring to (b) of FIG. 7, the state in which the user wears the first electronic device 201 and the second electronic device 202 to be reverse between left and right. For example, the reverse wearing state may be the state in which the first electronic device 201 is worn on the user's left ear and in which the second electronic device 202 is worn on the user's right ear. As described above, it may be the state in which the first electronic device 201 is configured to output the audio signal 701*a* corresponding to the right ear and in which the second electronic device 202 is configured to output the audio signal 701*b* corresponding to the left ear. In the reverse wearing state, the audio signal 701*a* corresponding to the right ear may be output through the first electronic device 201 worn on the left side, and the audio signal 701*b* corresponding to the left ear may be output through the second electronic device 202 worn on the right side, so that a stereo sound may be output reversely between left and right.

Figure 8:
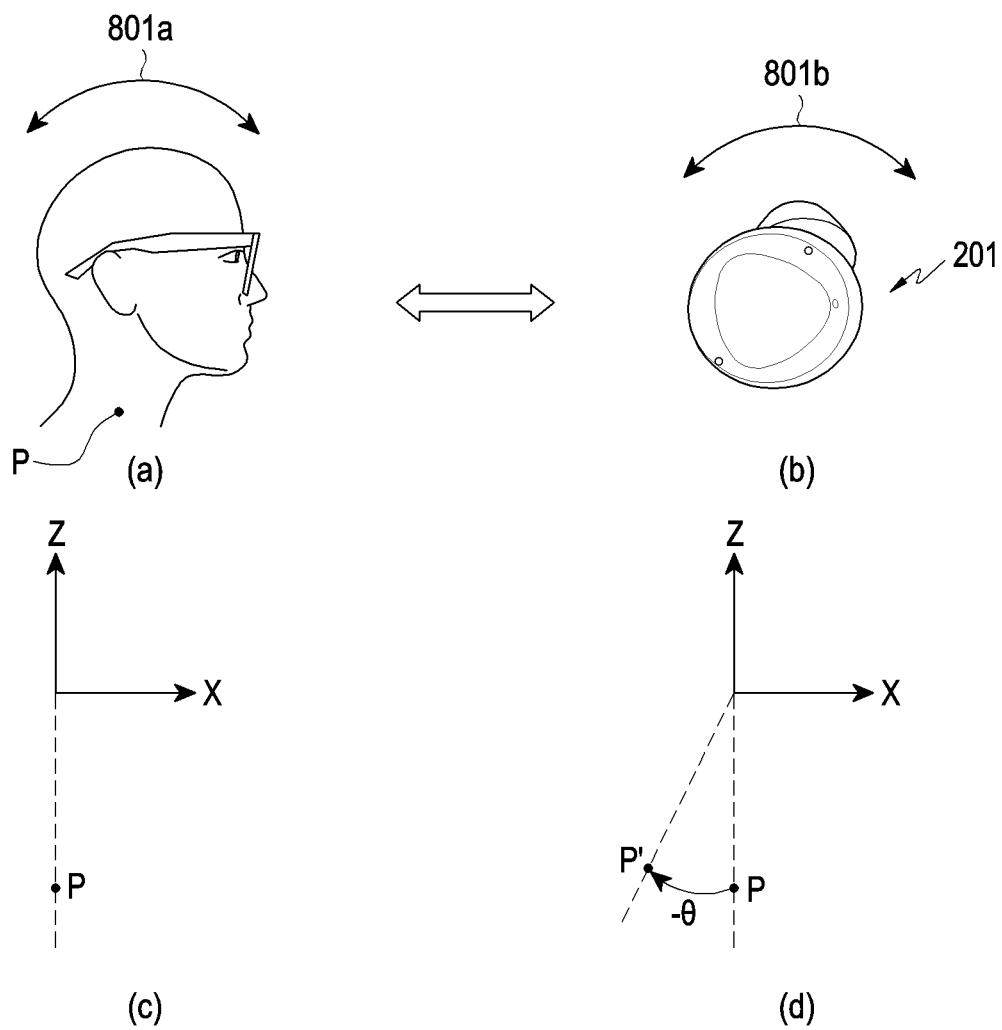
FIG. 8 is a diagram illustrating a position where a rotation center point is sensed when a user moves while wearing a first electronic device according to various embodiments.

FIG. 8 is a diagram illustrating a position where a rotation center point is sensed when a user moves while wearing a first electronic device 201 according to various embodiments.

Referring to (a) and (b) of FIG. 8, if the user moves in a predetermined direction 801*a* while wearing the first electronic device 201, the worn first electronic device 201 also moves corresponding thereto. For example, if the user nods the head (e.g., a nod motion), the user's motion may be a rotational motion using one point P of the neck as a rotation center point. In response to the user's motion, the first electronic device 201 may also move in a predetermined direction 801*b*. The first electronic device 201 may sense a movement in a predetermined direction 801*b* using inertial sensors.

Referring to (c) of FIG. 8, the state in which a rotation center point of the user's motion is shown on the user's coordinate system is illustrated. The illustrated P represents the rotation center point of the user's motion. For example, if the user nods the head (e.g., a nod motion), the coordinates of the rotation center point P may be located on the z-axis (or close to the z-axis) of the user's coordinate system.

Referring to (d) of FIG. 8, a rotation center point sensed by the first electronic device (e.g., the processor 290 in FIG. 2) according to the movement of the first electronic device 201 is shown on the coordinate system of the first electronic device 201. The illustrated P' represents the rotation center point sensed by the first electronic device (e.g., the processor 290 in FIG. 2). The illustrated P denotes the rotation center point to be sensed in the state in which the user wears the first electronic device 201 without rotation thereof (e.g., the state in which the first electronic device 201 is worn such that the X-axis of the first electronic device 201 is directed toward the front of the user), and the rotation center point P may be located on the Z-axis (or close to the Z-axis) of the coordinate system of the first electronic device 201. If the user rotates the first electronic device 201 counterclockwise by θ and wears the same (e.g., the state in which the first electronic device 201 is worn such that the X-axis of the first electronic device 201 rotates counterclockwise by θ from the front of the user), the coordinates of the rotation center point P' sensed by the first electronic device 201 may correspond to coordinates rotated by −θ compared to P (e.g., rotated clockwise more than P by θ). The first electronic device 201 may identify the angle between the sensed coordinates of the rotation center point P' and the Z-axis, thereby identifying whether the first electronic device 201 is in a rotated wearing state and/or a rotated wearing angle thereof.

Figure 9A:
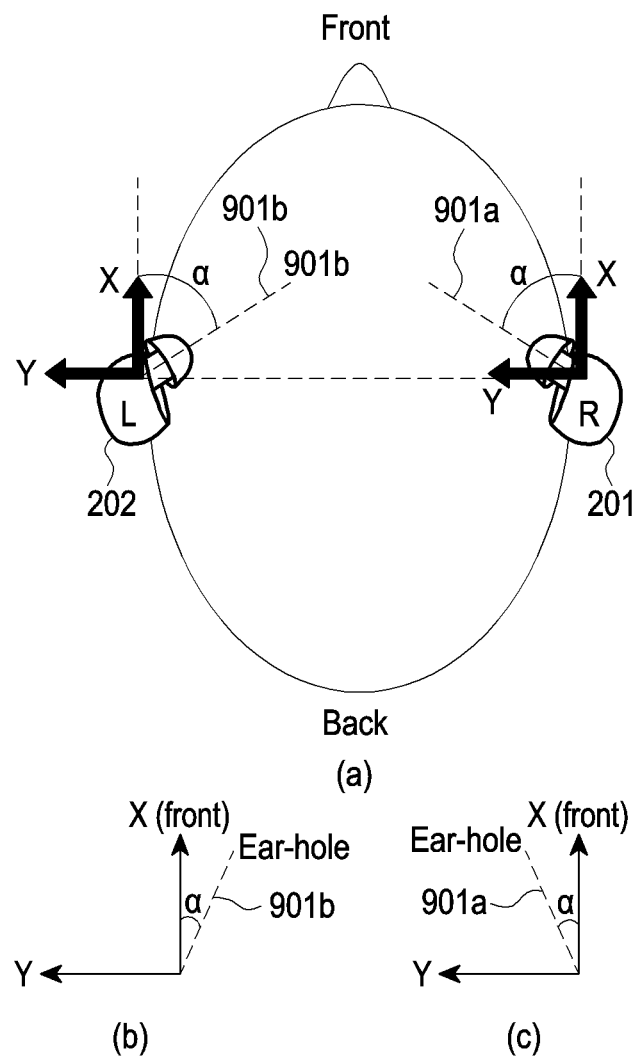
FIG. 9A is a diagram illustrating a method in which a first electronic device identifies reverse or normal wearing in a normal wearing state according to various embodiments.
Figure 9B:
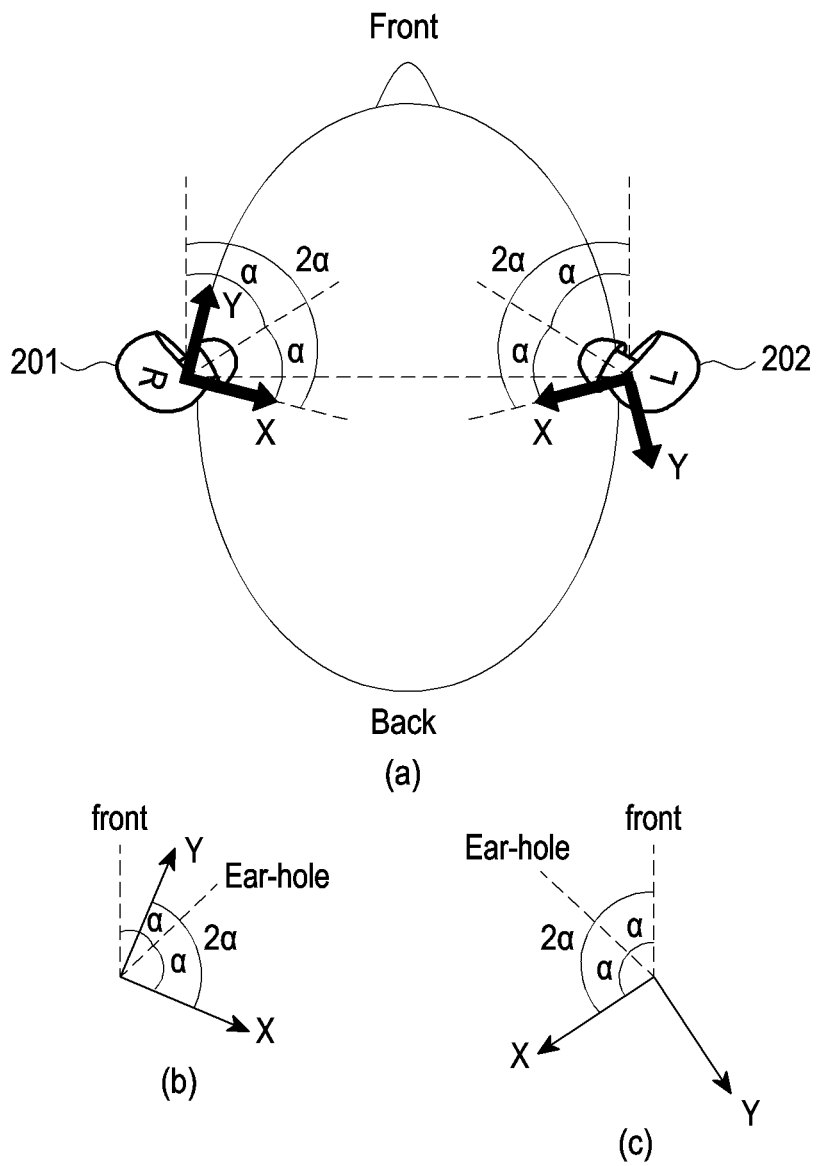
FIG. 9B is a diagram illustrating a method in which a first electronic device identifies reverse or normal wearing in a reverse wearing state according to various embodiments.

FIG. 9A is a diagram illustrating a method in which a first electronic device 201 identifies reverse or normal wearing in a normal wearing state according to various embodiments. FIG. 9B is a diagram illustrating a method in which a first electronic device 201 identifies reverse or normal wearing in a reverse wearing state according to various embodiments.

Referring to (a) of FIG. 9A, the user's earhole is inclined in the front direction of the user "front". As shown in the drawing, the user's earhole is inclined by a certain angle α with respect to the front direction of the user "front". The first electronic device 201 and the second electronic device 202 may be respectively inserted into the user's earholes to be worn. Statistically, the angle α at which the earhole is tilting with respect to the front direction of the user (hereinafter, the angle of the earhole) may be, for example, about 50° (e.g., 50.45°) as an average value (μ) with the standard deviation (σ) of 8.86°. Thus, the angle α of the earhole may be estimated (expected), for example, as a range of $\mu-2\sigma < \alpha < \mu+2\sigma$ (e.g., greater than 32.28° and less than 67.72°) with a reliability of 95% or a range of $\mu-3\sigma < \alpha < \mu+3\sigma$ (e.g., greater than 23.87° and less than 77.03°) with a reliability of 99%.

(b) of FIG. 9A illustrates an axis 901*b* (hereinafter, referred to as a first earhole axis) indicating the direction of a user's earhole on the coordinate system of the second electronic device 202. Since the X-axis of the second electronic device 202 is configured to correspond to the front direction of the user "front", the direction in which the second electronic device 202 is inserted into the user's earhole (e.g., the direction of the first earhole axis) may be a direction rotated clockwise by a certain angle α from the X-axis of the second electronic device 202.

(c) of FIG. 9A illustrates a first earhole axis 901*a* of the user on the coordinate system of the first electronic device

201. Since the X-axis of the first electronic device 201 is configured to correspond to the front direction of the user "front", the direction in which the first electronic device 201 is inserted into the user's earhole (e.g., the earhole axis) may be a direction rotated counterclockwise by a certain angle α from the X-axis of the first electronic device 201.

Referring to (a) of FIG. 9B, the user's earhole is inclined by a predetermined angle α with respect to the front direction of the user "front". Compared to (a) of FIG. 9A (a), it may show the state in which the first electronic device 201 is worn on the left ear and in which the second electronic device 202 is worn on the right ear.

(b) of FIG. 9B illustrates the first earhole axis 901a of the user on the coordinate system of the first electronic device 201. If the first electronic device 201 is worn on the left ear, the X-axis of the first electronic device 201 may not correspond to the front direction of the user "front", and may have a difference from the front direction of the user "front" by 2α, which is double the angle α at which the earhole axis is inclined.

(c) of FIG. 9B illustrates the first earhole axis 901a of the user on the coordinate system of the second electronic device 202. If the second electronic device 202 is worn on the right ear, the X-axis of the second electronic device 202 may not correspond to the front direction of the user "front", and may have a difference from the front direction of the user "front" by 2α, which is double the angle α at which the earhole axis is inclined.

As described above, referring to FIGS. 9A and 9B, both the X-axis of the first electronic device 201 and the X-axis of the second electronic device 202 correspond to the front direction of the user "front" in the normal wearing state, whereas both the X-axis of the first electronic device 201 and the X-axis of the second electronic device 202 may differ from the front direction ("front") by 2α in the reverse wearing state. Accordingly, the first electronic device 201 (or the second electronic device 202) may compare the X-axis with the front direction of the user "front" and, if it is identified that a difference between the X-axis and the front direction of the user "front" falls within a range that is double the estimated angle range of the earhole and/or a range close to double the actual angle of the earhole, identify the reverse wearing state. According to various embodiments, the first electronic device 201 (or the second electronic device 202) may identify the direction of a linear velocity vector of the movement of the first electronic device 201 (or the second electronic device 202) to identify the front direction of the user "front", which will be described in more detail with reference to the drawings described later.

Figure 10A:
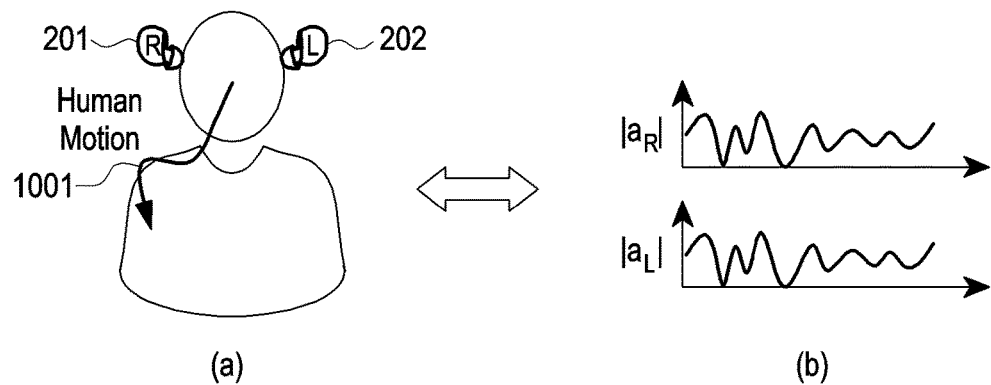
FIG. 10A is a diagram illustrating a method of identifying whether or not a first electronic device and a second electronic device are in a separate wearing state according to various embodiments.

FIG. 10A is a diagram illustrating a method of identifying whether or not a first electronic device 201 and a second electronic device 202 are in a separate wearing state according to various embodiments. In the disclosure, the separate wearing state may indicate the state in which the first electronic device 201 and the second electronic device 202 are respectively worn on two different users.

Referring to (a) in FIG. 10A, the first electronic device 201 and the second electronic device 202 may be in the state of being worn on the same user. According to various embodiments, the first electronic device 201 and the second electronic device 202 may identify an acceleration according to the user's motion 1001 "Human Motion". For example, the first electronic device 201 (or the second electronic device 202) may identify an acceleration of the first electronic device 201 (or the second electronic device 202) using an inertial sensor (e.g., an acceleration sensor). For example, the first electronic device 201 (or the second electronic device 202) may receive, from the second electronic device 202 (or the first electronic device 201), information about an acceleration sensed by an acceleration sensor of the second electronic device 202 (or the first electronic device 201) through a communication module (e.g., the communication module 210 in FIG. 2) to identify the acceleration of the second electronic device 202 (or the first electronic device 201). According to various embodiments, the first electronic device 201 (or the second electronic device 202) may also receive the information about the acceleration of the second electronic device 202 (or the first electronic device 201) from a first external electronic device (e.g., the first external electronic device 204 in FIG. 2) or a second external electronic device (e.g., the second external electronic device 205 in FIG. 2).

For example, the acceleration of the first electronic device 201 and the acceleration of the second electronic device 202 may be expressed as Equations 1 and 2 described later.

$$|a_R| = \sqrt{a_{Rx}^2 + a_{Ry}^2 + a_{Rz}^2} \qquad \text{[Equation 1]}$$

$$|a_L| = \sqrt{a_{Lx}^2 + a_{Ly}^2 + a_{Lz}^2} \qquad \text{[Equation 2]}$$

In Equation 1, |aR| may be the magnitude of an acceleration sensed by the second electronic device 202 (e.g., an absolute value of an acceleration vector), $a_{Rx}$ may be an x-axis component of the acceleration vector sensed by the second electronic device 202, $a_{Ry}$ may be a y-axis component of the acceleration vector sensed by the second electronic device 202, and $a_{Rz}$ may be a z-axis component of the acceleration vector sensed by the second electronic device 202. In Equation 2, |aL| may be the magnitude of an acceleration sensed by the first electronic device 201 (e.g., an absolute value of an acceleration vector), $a_{Rx}$ may be an x-axis component of the acceleration vector sensed by the first electronic device 201, $a_{Ry}$ may be a y-axis component of the acceleration vector sensed by the first electronic device 201, and $a_{Rz}$ may be a z-axis component of the acceleration vector sensed by the first electronic device 201.

Referring to (b) of FIG. 10A, the magnitude of the acceleration (|$a_R$|) sensed by the first electronic device 201 and the magnitude of the acceleration (|$a_L$|) sensed by the second electronic device 202 with time are illustrated. Since the first electronic device 201 and the second electronic device 202 are worn on the same user, the magnitude of the acceleration (|$a_R$|) sensed by the first electronic device 201 and the magnitude of the acceleration (|$a_L$|) sensed by the second electronic device 202 may have a similar pattern with time.

According to various embodiments, the first electronic device 201 (or the second electronic device 202) may compare the acceleration identified from the first electronic device 201 and the acceleration identified from the second electronic device 202. For example, the acceleration of the first electronic device 201 and the acceleration of the second electronic device 202 may be compared through Equation 3 described later.

$$\text{Corr}(|a_R|, |a_L|) \qquad \text{[Equation 3]}$$

The corr function in Equation 3 is a correlation evaluation function, and may be, for example, a Pearson correlation coefficient function, a normalized cross correlation function, a mean square error function, a mean absolute error function, or a Huber loss (M-estimation) function.

According to various embodiments, the first electronic device 201 (or the second electronic device 202) may compare the acceleration identified from the first electronic device 201 with the acceleration identified from the second electronic device 202 to identify whether or not the first electronic device 201 and the second electronic device 202 are in the separate wearing state. For example, if it is identified that the result value of Equation 3 (e.g., 0.9) is greater than or equal to a specific value (e.g., 0.5), the first electronic device 201 (or the second electronic device 202) may identify that the first electronic device 201 and the second electronic device 202 are in the state of being worn on the same user.

Figure 10B:
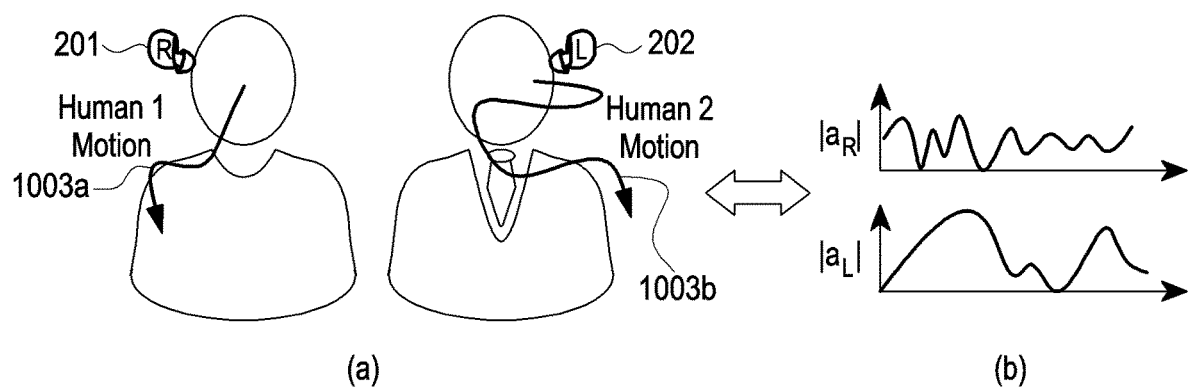
FIG. 10B is a diagram illustrating a method of identifying whether or not a first electronic device and a second electronic device are in a separate wearing state according to various embodiments.

FIG. 10B is a diagram illustrating a method of identifying whether or not a first electronic device 201 and a second electronic device 202 are in a separate wearing state according to various embodiments. Hereinafter, description will be made with reference to FIG. 10A as well.

Referring to (a) of FIG. 10B, it may be a separate wearing state in which the first electronic device 201 is worn on a first user and in which the second electronic device 202 is worn on a second user. The first user and the second user may move differently. For example, the first user's motion 1003a "Human 1 Motion" and the second user's motion 1003b "Human 2 Motion" may have different accelerations.

Referring to (b) of FIG. 10B, the magnitude of an acceleration ($|a_R|$) sensed by the first electronic device 201 and the magnitude of an acceleration ($|a_L|$) sensed by the second electronic device 202 are illustrated with time. Since the first electronic device 201 and the second electronic device 202 are worn on two different users, the magnitude of the acceleration ($|a_R|$) sensed by the first electronic device 201 and the magnitude of the acceleration ($|a_L|$) sensed by the second electronic device 202 may have different patterns with time.

According to various embodiments, the first electronic device 201 (or the second electronic device 202) may compare the acceleration identified from the first electronic device 201 and the acceleration identified from the second electronic device 202. For example, the acceleration of the first electronic device 201 and the acceleration of the second electronic device 202 may be compared through the above-described Equation 3.

According to various embodiments, the first electronic device 201 (or the second electronic device 202) may compare the acceleration identified from the first electronic device 201 with the acceleration identified from the second electronic device 202 to identify whether or not the first electronic device 201 and the second electronic device 202 are in the separate wearing state. For example, if it is identified that the result value of Equation 3 (e.g., 0.1) is less than a specific value (e.g., 0.5), the first electronic device 201 (or the second electronic device 202) may identify that the first electronic device 201 and the second electronic device 202 are in the state of being worn on different users from each other (e.g., a separate wearing state).

According to various embodiments, the first electronic device 201 (or the second electronic device 202) may also identify whether the first electronic device 201 (or the second electronic device 202) is in a single wearing state. For example, if the information about the acceleration of the second electronic device 202 (or the first electronic device 201) is not received from the second electronic device 202 (or the first electronic device 201) or if it is identified that the magnitude of the acceleration of the second electronic device 202 (or the first electronic device 201) approximates zero (e.g., 0.01), the first electronic device 201 (or the second electronic device 202) may identify that the second electronic device 202 (or the first electronic device 201) is in the state of not being worn (e.g., a single wearing state of the first electronic device 201 (or the second electronic device 202)) from the second electronic device 202 (or the first electronic device 201).

Figure 11:
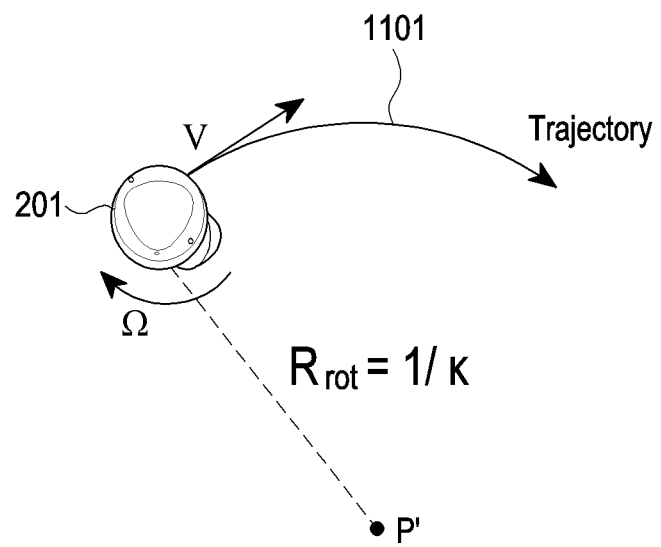
FIG. 11 is a diagram illustrating movement of a first electronic device according to various embodiments.

FIG. 11 is a diagram illustrating movement of a first electronic device 201 according to various embodiments.

According to various embodiments, the first electronic device 201 may move in response to the motion of a user wearing the first electronic device 201.

Referring to FIG. 11, a trajectory 1101 "Trajectory" of movement of the first electronic device 201 is illustrated. v may be a linear velocity vector indicating the linear movement of the first electronic device 201, $\Omega$ may be an angular velocity vector indicating the rotational movement of the first electronic device 201, $R_{rot}$ may be the rotation radius of the movement of the first electronic device 201, κ may be the curvature of the movement of the first electronic device 201, and P' may be the rotation center point of the movement of the first electronic device 201 identified from the first electronic device 201.

According to various embodiments, the first electronic device 201 may identify whether or not the movement (e.g., rotational movement) of the first electronic device 201 is a rotational movement of a pure rigid body (e.g., a third classification of movement) about a fixed axis. For example, the first electronic device 201 may identify whether the motion of the first electronic device 201 is a rotational movement of a pure rigid body about a fixed axis, based on Equations 4 and/or 5.

$$\frac{v' \times \Omega'}{|v'| \cdot |\Omega'|} < \text{Threshold 1} \qquad \text{[Equation 4]}$$

$$\frac{\kappa \cdot |v'|}{|\Omega'|} - 1 < \text{Threshold 2} \qquad \text{[Equation 5]}$$

v' in Equations 4 and 5 may be a linear velocity vector sensed by the first electronic device 201 according to the linear motion of the first electronic device 201, $\Omega'$ may be an angular velocity vector sensed by the first electronic device 201 according to the rotational movement of the first electronic device 201, and "•" may be a scalar product operator. "x" in Equation 4 is a vector product operator, and Threshold 1 is a threshold value for identifying whether or not the movement of the first electronic device 201 is a rotational movement of a pure rigid body about a fixed axis and may be, for example, a value close to 0. Threshold 2 in Equation 5 is a threshold value for identifying whether or not the movement of the first electronic device 201 is a rotational movement of a pure rigid body about a fixed axis, and may be, for example, a value close to 0.

According to various embodiments, if the vectors sensed by the first electronic device 201 satisfy Equations 4 and 5 described above, the first electronic device 201 may identify that the movement of the first electronic device 201 is a rotational movement of a pure rigid body about a fixed axis.

According to various embodiments, if the vectors sensed by the first electronic device 201 do not satisfy Equation 4 and/or Equation 5 described above, the first electronic device may identify that the movement of the first electronic device 201 is not a rotational movement of a pure rigid body about a fixed axis and re-sense the movement of the first electronic device 201 at the next time point to identify whether the movement sensed at the next time point identifies Equation 4 and/or Equation 5 described above.

Figure 12:
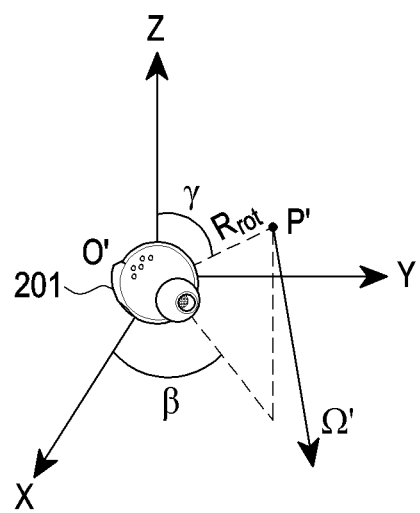
FIG. 12 is a diagram illustrating a coordinate system of a first electronic device according to various embodiments.

FIG. 12 is a diagram illustrating a coordinate system of a first electronic device 201 according to various embodiments.

Referring to FIG. 12, a coordinate system O' of the first electronic device 201 may include an X-axis, a Y-axis, and a Z-axis. The coordinate system O' of the first electronic device 201 may include a −X-axis in the opposite direction of the X-axis, a −Y-axis in the opposite direction of the Y-axis, and a −Z-axis in the opposite direction of the Z-axis, and information about the movement of the first electronic device 201 may be shown on the coordinate system of the first electronic device 201.

P' in FIG. 12 is a rotation center point of the first electronic device 201 sensed by the first electronic device 201, and may be expressed as ($R_{rot}$, β, γ) in spherical coordinates. Ω' is an angular velocity vector of the first electronic device 201 sensed by the first electronic device 201, and may be expressed as (|Ω'|, $β_Ω$, $γ_Ω$) in spherical coordinates.

Figure 13A:
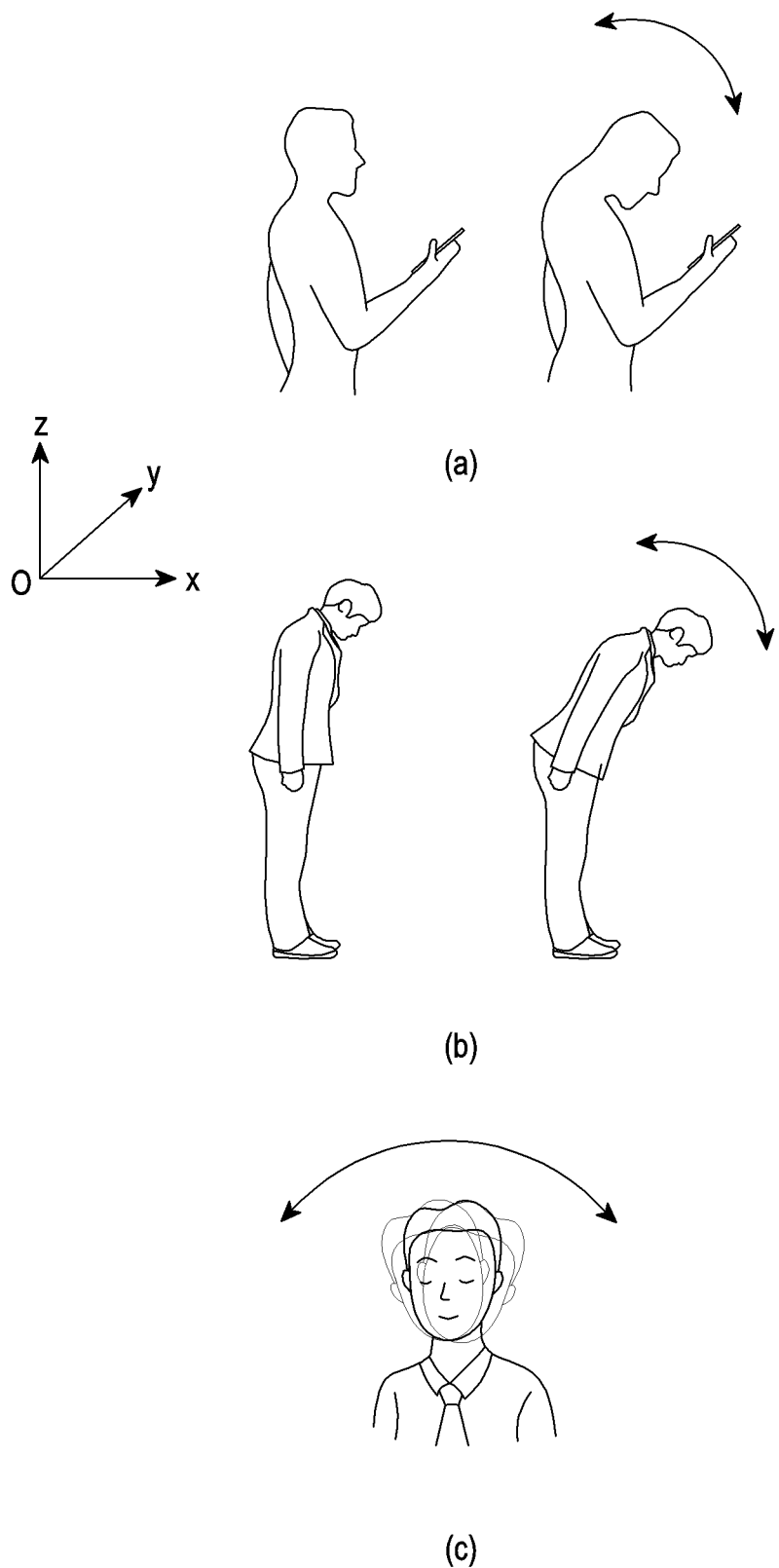
FIG. 13A illustrates examples of user's motions according to various embodiments.

FIG. 13A illustrates examples of user's motions according to various embodiments.

Referring to (a) of FIG. 13A, the user's motion may be a nod motion. For example, the nod motion is a motion in which the user lowers or raises the user's head while facing the front of the user, and may be a motion performed on the plane (e.g., the xy plane) perpendicular to the y-axis direction on the user coordinate system O. Since a rotation center point of the nod motion is located near the user's neck, coordinates of the rotation center point of the nod motion may be located on the z-axis of the user coordinate system O (e.g., the z-axis component thereof may be negative).

Referring to (b) of FIG. 13A, the user's motion may be a bow motion. For example, the bow motion is a motion in which the user bends or straightens the user's back while facing the front of the user, and may be a motion performed on the plane (e.g., the xy plane) perpendicular to the y-axis direction on the user coordinate system O. Since a rotation center point of the bow motion is located near the user's back, coordinates of the rotation center point of the bow motion may be located on the z-axis of the user coordinate system O (e.g., a z-axis component thereof may be negative).

Referring to (c) of FIG. 13A, the user's motion may be a tilt motion. For example, the tilt motion is a motion in which the user tilts the user's head toward the lateral direction of the user or tilts the user's upper body toward the lateral direction of the user, and may be a motion performed on the plane (e.g., the yz plane) perpendicular to the x-axis direction on the user coordinate system O. Since a rotation center point of the tilt motion is located near the user's neck or waist, coordinates of the rotation center point of the tilt motion may be located on the z-axis of the user coordinate system O (e.g., a z-axis component thereof may be negative).

As described above, in the case where the user's motion is a nod motion, a bow motion, or a tilt motion, the coordinates of the rotation center point of each motion may all be located on the z-axis on the user coordinate system O.

Figure 13B:
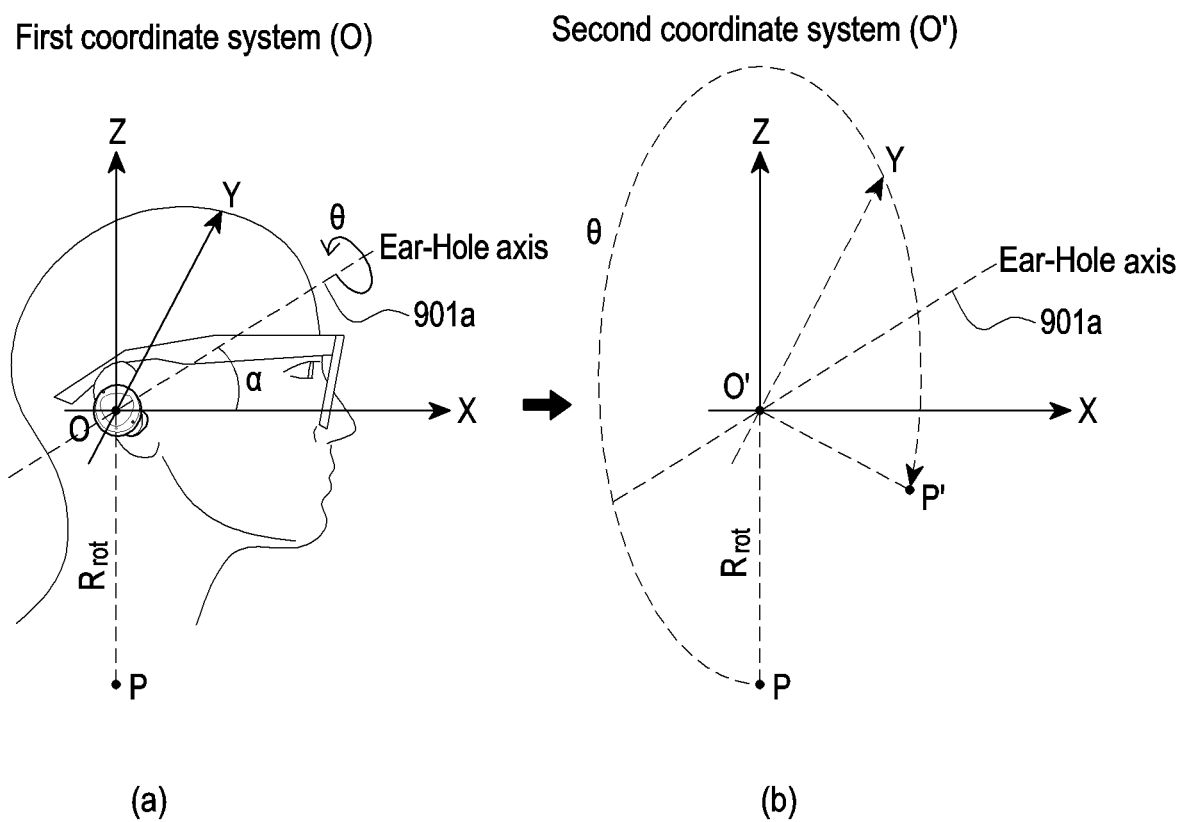
FIG. 13B is a diagram illustrating a user's motion and movement of a first electronic device in the case where the user's motion is a nod motion according to various embodiments.

FIG. 13B is a diagram illustrating a user's motion and movement of a first electronic device 201 in the case where the user's motion is a nod motion according to various embodiments.

FIG. 13B shows the case where a user having an angle α of the first earhole axis 901a wears the first electronic device 201 in the state of being rotated counterclockwise by θ about the first earhole axis 901a and performs a nod motion. Since the first electronic device 201 is inserted into the user's earhole, the angle at which the first electronic device 201 is inserted (hereinafter, a first inserting angle) may have a value corresponding to (e.g., the same as or similar to) the angle α of the first earhole axis 901a. Hereinafter, it is assumed that the first inserting angle is the same as the angle α of the first earhole axis 901a for convenience of description.

Referring to (a) of FIG. 13B, a user coordinate system O (hereinafter, a first coordinate system O) is illustrated. For example, the illustrated first coordinate system O may be a coordinate system in which the front direction of the user is an x-axis, the lateral direction thereof is a y-axis, and the upward direction thereof (e.g., the opposite direction of the direction of gravity) is a z-axis with a point (e.g., the ear) of the user's head as the origin. According to various embodiments, if the user performs a nod motion, the coordinates of the rotation center point P may be located on the z-axis of the first coordinate system O, and the z-axis component thereof may have a negative value of the rotation radius $R_{rot}$. For example, since the rotation center point of the user's nod motion is located near the user's neck, the rotation radius $R_{rot}$ may be 15 cm or less. Even if the user's motion is a bow motion, the coordinates of the rotation center point P may be located on the z-axis of the first coordinate system O, and the z-axis component thereof may have a negative value of the rotation radius $R_{rot}$. For example, since the rotation center of the user's bow motion is located near the user's waist, the rotation radius $R_{rot}$ may be 1.5 m or less. Even if the user's motion is a tilt motion, the coordinates of the rotation center point P may be located on the z-axis of the first coordinate system O, and the z-axis component thereof may have a negative value of the rotation radius $R_{rot}$. For example, since the rotation center of the user's tilt motion is located near the user's neck, the rotation radius $R_{rot}$ may be 15 cm or less.

Referring to (b) of FIG. 13B, a coordinate system of the first electronic device 201 (hereinafter, a second coordinate system O') is illustrated. For example, the illustrated second coordinate system O' is a fixed coordinate system, and may be a coordinate system in which the front direction of the user is an x-axis, the lateral direction thereof is a y-axis, and the upward direction thereof (e.g., the opposite direction of the direction of gravity) is a z-axis in the case where the device is worn in the state of not being rotated and may be a preconfigured coordinate system. Compared to FIG. 8, (b) of FIG. 13B illustrates the movement of the first electronic device 201 according to the user's nod motion, based on the angle α of the first earhole axis 901a. Since the first electronic device 201 is inserted in the state of being inclined at a predetermined angle (e.g., the angle α of the first earhole axis) and worn in the state of being rotated counterclockwise by θ about the first earhole axis 901a of the user, the rotation center point P' sensed according to the movement of the first electronic device 201 may be located at the point at which the rotation center point P is rotated clockwise by θ about the earhole axis 901a. In other words, the rotation center point P' may be sensed on a circular plane perpendicular to the first earhole axis 901a, and the radius of the circular plane may be the rotation radius $R_{rot}$ (e.g., 15 cm or less). In the case where the user's motion is a bow motion, the rotation center point P') sensed according to the movement of the first electronic device 201 may be sensed on a circular plane perpendicular to the first earhole axis 901a, and the radius of the circular plane may be the rotation radius $R_{rot}$ (e.g., 1.5 m or less). In the case where the user's motion is a tilt motion, the rotation center point P' sensed according to the movement of the first electronic device 201 may be sensed on a circular plane perpendicular to the first earhole axis 901a, and the radius of the circular plane may be the rotation radius $R_{rot}$ (e.g., 15 cm or less).

Figure 14A:
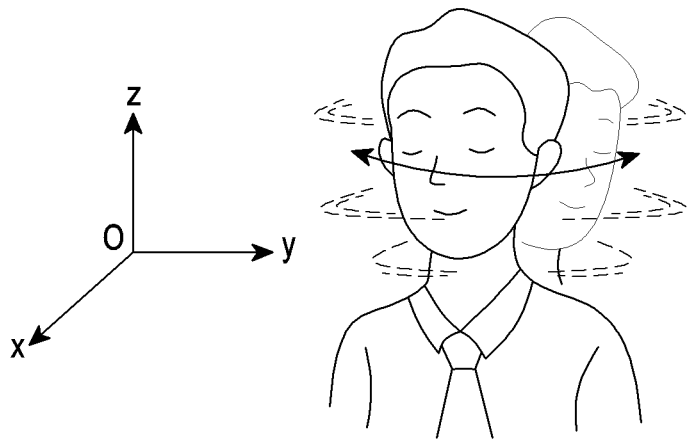
FIG. 14A illustrates another example of user's motions according to various embodiments.

FIG. 14A illustrates another example of user's motions according to various embodiments.

Referring to FIG. 14A, the user's motion may be a shake motion. For example, the shake motion is a motion in which the user turns the users' head about the rotation axis in the upward direction of the user (e.g., the opposite direction of the direction of gravity), and may be a motion parallel to the zx plane with respect to the rotation axis in the z-axis direction on the user coordinate system O. Since the rotation center point of the shake motion is located near the center of the user's head, coordinates of the rotation center point of the shake motion may be located on the y-axis of the user coordinate system O (e.g., a y-axis component thereof may be negative).

As described above, if the user's motion is a shake motion, since the coordinates of the rotation center point are located on the y-axis in the user coordinate system O, it may be distinguished from the above-described nod motion, bow motion, or tilt motion in which the coordinates of the rotation center points are located on the z-axis.

Figure 14B:
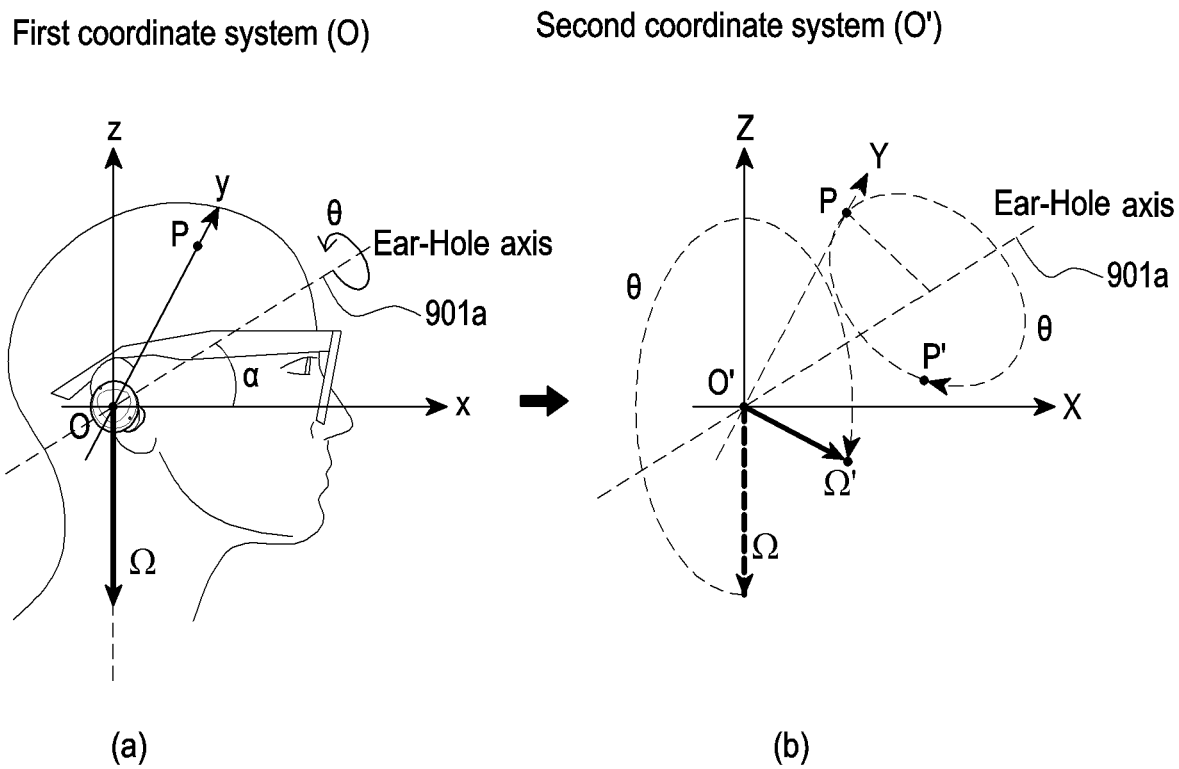
FIG. 14B is a diagram illustrating a user's motion and movement of a first electronic device in the case where the user's motion is a shake motion according to various embodiments.

FIG. 14B is a diagram illustrating a user's motion and movement of a first electronic device 201 in the case where the user's motion is a shake motion according to various embodiments.

FIG. 14B shows the case where a user having an angle α of the first earhole axis 901a wears the first electronic device 201 in the state of being rotated counterclockwise by θ about the first earhole axis 901a and performs a shake motion. Since the first electronic device 201 is inserted into the user's earhole, a first inserting angle of the first electronic device 201 may have a value corresponding to (e.g., the same as or similar to) the angle α of the first earhole axis 901a. Hereinafter, it is assumed that the angle at which the first electronic device 201 is inserted is the same as the angle α of the earhole axis 901a for convenience of description.

Referring to (a) of FIG. 14B, a user coordinate system (hereinafter, a first coordinate system O) is illustrated. For example, the illustrated first coordinate system O may be a coordinate system in which the front direction is an x-axis, the lateral direction is a y-axis, and the upward direction (e.g., the opposite direction of the direction of gravity) is a z-axis with a point (e.g., the right ear) of the user's head as the origin. According to various embodiments, if the user performs a shake motion, the coordinates of the rotation center point P may be located on the y-axis of the first coordinate system O, and the y-axis component may have a positive value of the rotation radius $R_{rot}$. In the case where the first coordinate system O is expressed with respect to the user's left ear as the origin, the coordinates of the rotation center point P may be located on the y-axis of the first coordinate system O, and the y-axis component may have a negative value of the rotation radius $R_{rot}$. For example, since the rotation center point of the user's shake motion is located near the center of the user's head, the rotation radius $R_{rot}$ may be 15 cm or less. According to various embodiments, if the user performs a shake motion, the coordinates of an angular velocity vector Ω may be located on the z-axis of the first coordinate system O. For example, if the user performs a shake motion, the coordinates of the angular velocity Ω may have a positive or negative value as the z-axis component depending on the rotational direction of the shake motion.

Referring to (b) of FIG. 14B, a coordinate system of the first electronic device 201 (hereinafter, a second coordinate system O') is illustrated. For example, the illustrated second coordinate system O' is a fixed coordinate system, and may be a coordinate system in which the front direction of the user is an x-axis, the lateral direction thereof is a y-axis, and the upward direction thereof (e.g., the opposite direction of the direction of gravity) is a z-axis in the case where the device is worn in the state of not being rotated and may be a preconfigured coordinate system. According to various embodiments, the rotation center point P' sensed according to the movement of the first electronic device 201 may be located at the point at which the rotation center point P is rotated clockwise by θ about the earhole axis 901a. In other words, the rotation center point P' may be sensed on a conical surface (e.g., side surface) of a cone having a circular bottom plane perpendicular to the earhole axis 901a, and the length of a generator of the cone may have a value of the rotation radius $R_{rot}$ (e.g., 15 cm or less). According to various embodiments, since the first electronic device 201 is inserted in the state of being inclined at a predetermined angle (e.g., the angle α of the first earhole axis) and worn in the state of being rotated counterclockwise by θ about the first earhole axis 901a of the user, the angular velocity vector Ω' sensed according to the movement of the first electronic device 201 may be located at the point at which the angular velocity vector Ω worn in the state of not being rotated is rotated clockwise by θ about the first earhole axis 901a. In other words, the angular velocity vector Ω' may be sensed on a circular plane perpendicular to the first earhole axis 901a. According to various embodiments, the illustrated angular velocity vector Ω is an angular velocity vector Ω in the case where the user performs a shake motion in the clockwise direction, and if the user performs a shake motion in the counterclockwise direction, it may have a +Z component on the Z-axis.

Figure 15:
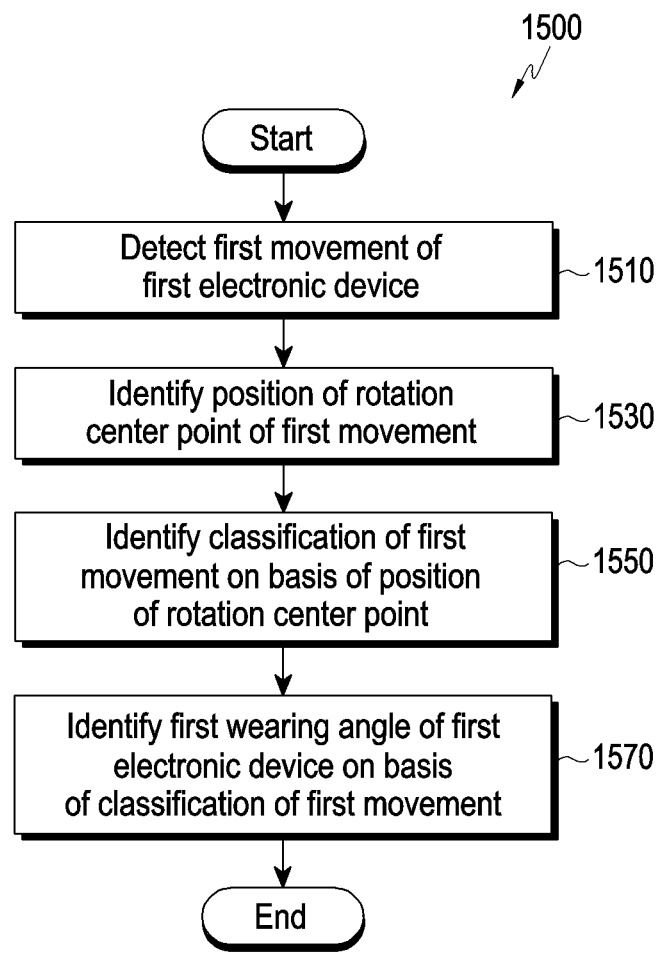
FIG. 15 is a flowchart illustrating a method for a first electronic device to identify a first wearing angle according to various embodiments.

FIG. 15 is a flowchart 1500 illustrating a method for a first electronic device (e.g., the first electronic device 201 in FIG. 2) to identify a first wearing angle according to various embodiments.

According to various embodiments, the first electronic device (e.g., the processor 290 in FIG. 2) may detect a first movement of the first electronic device 201 in operation 1510. For example, the first movement may be a rotational movement of a pure rigid body about a fixed axis according to a user's motion (e.g., a nod motion, a bow motion, a tilt motion, or a shake motion). According to various embodiments, the first movement may be a rotational movement including a translational movement, and the operation of the first electronic device (e.g., the processor 290 in FIG. 2) in this case will be described in more detail with reference to the drawings described later.

According to various embodiments, the first electronic device (e.g., the processor 290 in FIG. 2) may identify a position of the rotation center point P' of the first movement in operation 1530. According to various embodiments, the first electronic device (e.g., the processor 290 in FIG. 2) may identify an acceleration and/or an angular velocity of the first movement using at least one inertial sensor (e.g., an acceleration sensor and/or a gyro sensor) and identify the coordinates of the rotation center point P' on the coordinate system of the first electronic device 201 (e.g., the second coordinate system O'), based on the identified acceleration and/or angular velocity.

According to various embodiments, the first electronic device (e.g., the processor 290 in FIG. 2) may identify the classification of the first movement, based on the position of the rotation center point, in operation 1550. For example, the classification of the first movement may be a first classification or a second classification. For example, the first classification is a movement corresponding to the user's motion in which the rotation center point P is located on the z-axis in the user coordinate system (e.g., the first coordinate system O), and may be, for example, a movement corresponding to a nod motion, a bow motion, or a tilt motion. For example, the second classification is a movement corresponding to the user's motion in which the rotation center point P is located on the y-axis in the user coordinate system (e.g., the first coordinate system O), and may be, for example, a movement corresponding to a shake motion. According to various embodiments, the first electronic device (e.g., the processor 290 in FIG. 2) may identify whether the classification of the first movement is the first classification or the second classification, based on an expected earhole axis. For example, the first electronic device (e.g., the processor 290 in FIG. 2) may estimate the angle α of the user's earhole and determine an earhole axis expected based on the estimated angle. For example, the angle α of the user's earhole may be estimated as an average value of statistical earhole angles (e.g., the average value μ in FIG. 9A (e.g., about 50°)). The angle α of the user's earhole may be estimated as a certain range ($\mu-n\sigma<\alpha<\mu+n\sigma$, (n=2 or 3)), instead of a single value (e.g., the average value), which will be described in more detail with reference to the drawings described later. The first electronic device (e.g., the processor 290 in FIG. 2) may identify the classification of the first movement, based on the earhole axis based on the estimated angle. For example, the first electronic device (e.g., the processor 290 in FIG. 2) may identify whether or not the rotation center point P' of the first movement is perpendicular to the earhole axis based on the estimated angle on the second coordinate system O' and is located on a circular plane having a radius less than or equal to a predetermined value (e.g., 15 cm or 1.5 m). For example, the first electronic device (e.g., the processor 290 in FIG. 2) may identify whether or not the rotation center point P' of the first movement is perpendicular to the earhole axis based on the estimated angle on the second coordinate system O' and is located on the conical surface (e.g., side surface) of a cone having a generator of a predetermined size (e.g., 15 cm) or less. According to various embodiments, if the rotation center point P' of the first movement is located on a circular plane having a radius less than or equal to a predetermined value (e.g., 15 cm or 1.5 m), the first electronic device (e.g., the processor 290 in FIG. 2) may identify that the first movement corresponds to the first classification. According to various embodiments, if the rotation center point P' of the first movement is located on the conical surface (e.g., side surface) of a cone having a generator of a predetermined size (e.g., 15 cm) or less, the first electronic device (e.g., the processor 290 in FIG. 2) may identify that the first movement corresponds to the second classification. According to various embodiments, if it is identified that the first movement does not correspond to the first classification or the second classification, the first electronic device (e.g., the processor 290 in FIG. 2) may detect a first movement at the next time point and perform operation 1530 and/or operation 1550, based on the first movement sensed at the next time point.

According to various embodiments, the first electronic device (e.g., the processor 290 in FIG. 2) may identify a first wearing angle of the first electronic device 201, based on the classification of the first movement, in operation 1570.

For example, if it is identified that the first movement is the first classification, the first electronic device (e.g., the processor 290 in FIG. 2) may identify that the distance from the origin on the second coordinate system O' to the rotation center point P' corresponds to the rotation radius $R_{rot}$ and identify that the coordinates (e.g., rectangular coordinates) of the rotation center point P are (0, 0, $-R_{rot}$). The first electronic device (e.g., the processor 290 in FIG. 2) may compare the identified coordinates of the rotation center point P with the identified coordinates of the rotation center point P' of the first movement to identify that the angle θ at which the rotation center point P' of the first movement is rotated from the rotation center point P about the earhole axis based on the estimated angle is the angle at which the first electronic device 201 is worn in the state of be rotated (hereinafter, a first wearing angle).

For example, if it is identified that the first movement is the second classification, the first electronic device (e.g., the processor 290 in FIG. 2) may identify that the distance from the origin on the second coordinate system O' to the coordinates of the angular velocity vector Ω' corresponds to the rotation radius $R_{rot}$ and identify that the coordinates of the angular velocity vector Ω' are (0, $\pm R_{rot}$, 0). The first electronic device (e.g., the processor 290 in FIG. 2) may compare the identified coordinates of the angular velocity vector Ω with the identified coordinates of the angular velocity vector Ω' of the first movement to identify that the angle θ at which the angular velocity vector Ω' of the first movement is rotated from the angular velocity vector Ω about the earhole axis based on the estimated angle is the first wearing angle of the first electronic device 201.

Figure 16:
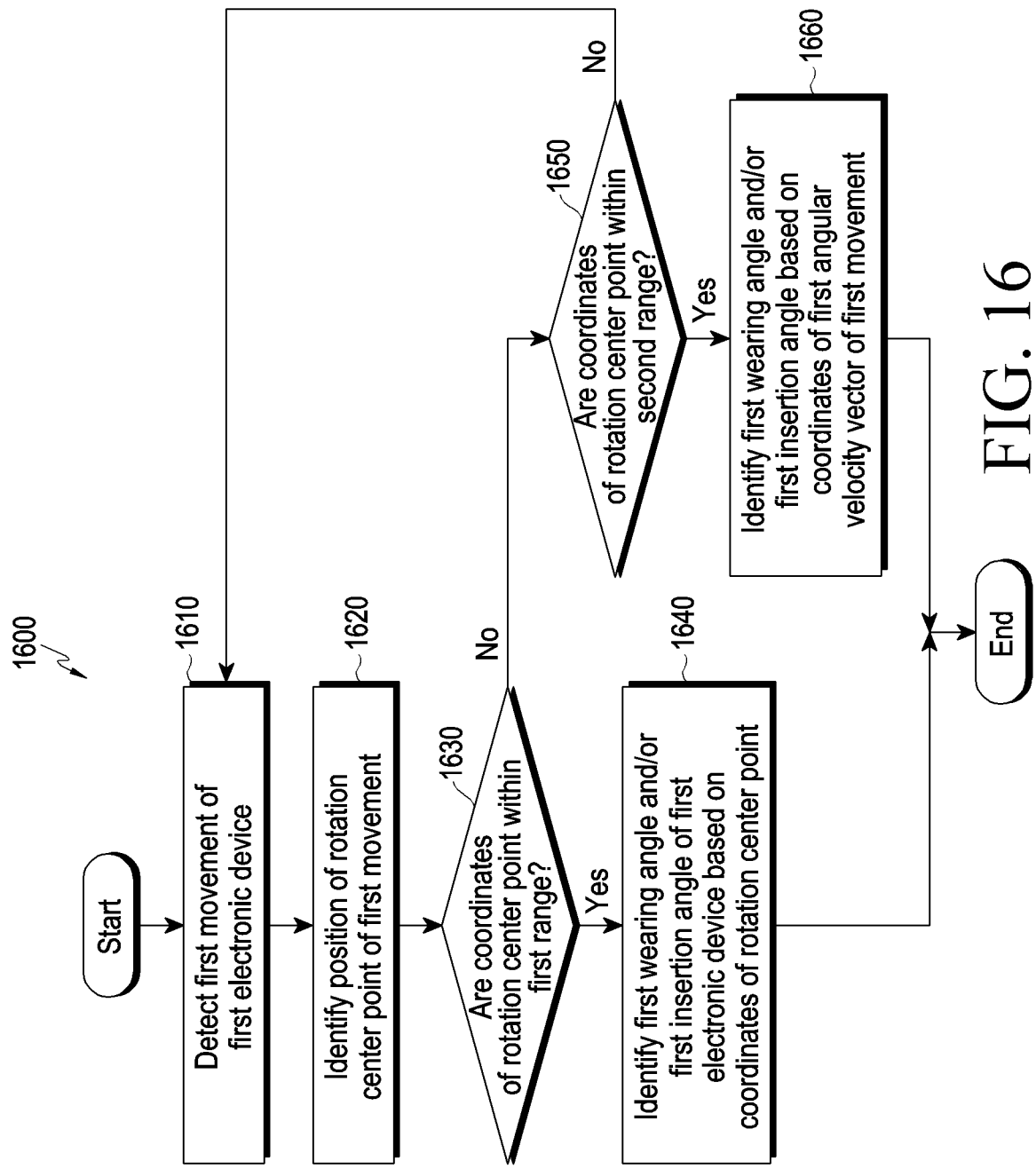
FIG. 16 is a flowchart illustrating a method in which a first electronic device identifies a first wearing angle and/or a first inserting angle, based on an estimated range of an earhole angle according to various embodiments.

FIG. 16 is a flowchart 1600 illustrating a method in which a first electronic device (e.g., the first electronic device 201 in FIG. 2) identifies a first wearing angle and/or a first inserting angle, based on an estimated range of an earhole angle, according to various embodiments.

According to various embodiments, the first electronic device (e.g., the processor 290 in FIG. 2) may detect a first movement of the first electronic device 201 in operation 1610. For example, the first movement may be a rotational movement of a pure rigid body about a fixed axis according to a user's motion (e.g., a nod motion, a bow motion, a tilt motion, or a shake motion). According to various embodiments, the first movement may be a rotational movement including a translational movement, and the operation of the first electronic device (e.g., the processor 290 in FIG. 2) in this case will be described in more detail with reference to the drawings described later.

According to various embodiments, the first electronic device (e.g., the processor 290 in FIG. 2) may identify coordinates of the rotation center point P' of the first movement in operation 1620.

According to various embodiments, the first electronic device (e.g., the processor 290 in FIG. 2) may identify whether or not the coordinates of the rotation center point P' are within a first range in operation 1630.

According to various embodiments, the first range is a range determined based on an estimated range of the earhole angle and, if the first movement is the first classification, may be a range indicating the region on the second coordinate system O' where the rotation center point P' may be located. For example, the estimated range of the earhole angle α may be described through Equation 6.

$$\mu-n\sigma<\alpha<\mu+n\sigma \quad \text{[Equation 6]}$$

μ in Equation 6 may be a statistical average value of the earhole angle α and may be, for example, about 500 (e.g., 50.45°). σ may be a statistical standard deviation of the earhole angle and may be, for example, 8.86°. n is an integer value according to the reliability of the estimation range of the earhole angle and may have a value of 2 under a reliability of 95% and a value of 3 under a reliability of 99%. Referring to FIG. 13B together, if the estimated earhole angle α is estimated as the range in Equation 6, instead of as a single value, the angle α of the first earhole axis 901a shown in FIG. 13B may have any value included in the range of Equation 6.

If the earhole angle α is estimated to be in the range of Equation 6, the first range may be described by Equations 7 to 9.

$$-\frac{\pi}{2} + \mu - n\sigma < \beta < -\frac{\pi}{2} + \mu + n\sigma \quad \text{[Equation 7]}$$

$$\frac{\pi}{2} + \mu - n\sigma < \beta < \frac{\pi}{2} + \mu + n\sigma \quad \text{[Equation 8]}$$

$$R_{rot} < 1.5 \text{ m} \quad \text{[Equation 9]}$$

The coordinates (e.g., spherical coordinates) of the rotation center point P' may be ($R_{rot}$, β, γ). Equations 7 and 8 represents conditions in which the coordinates of the rotation center point P' are located on a plane perpendicular to the first earhole axis 901a in the case where the angle α of the earhole axis has an arbitrary value included in the range of Equation 5. Equation 8 represents conditions in which the plane on which the coordinates of the rotation center point P' are located is a circular plane having a radius of 1.5 m or less.

According to various embodiments, the first electronic device (e.g., the processor 290 in FIG. 2) may identify whether the identified coordinates of the rotation center point P' satisfy Equations 7 and 9 or Equations 8 and 9. According to various embodiments, if the identified coordinates of the rotation center point P' satisfy Equations 7 and 9 or Equations 8 and 9, the first electronic device (e.g., the processor 290 in FIG. 2) may identify the first movement as the first classification.

For example, the first electronic device (e.g., the processor 290 in FIG. 2) may identify a first wearing angle θ and a first inserting angle α such that the coordinates (e.g., rectangular coordinates) of the rotation center point P become (0, 0, $-R_{rot}$). The first inserting angle α may be an angle at which the first electronic device 201 is actually inserted into the user's ear. For example, the first wearing angle θ may be identified by Equation 10, and the first inserting angle α may be identified by Equations 11 and 12. In order for the coordinates of the rotation center point P to be (0, 0, $-R_{Rot}$), the coordinates (P'x, P'y, P'z) (e.g., rectangular coordinates) of the rotation center point P' may be ($-R_{rot}$·sin θ·sin, $R_{rot}$·sin θ·cos α, $-R_{rot}$·cos θ).

$$\tan\alpha = -\frac{P'_X}{P'_Y}, (\mu - n\sigma < \alpha < \mu + n\sigma) \quad \text{[Equation 10]}$$

$$\sin\theta = -\frac{P'_X}{R_{rot} \cdot \sin\alpha} \quad \text{[Equation 11]}$$

$$\cos\theta = -\frac{P'_Z}{R_{rot}} \quad \text{[Equation 12]}$$

According to various embodiments, if it is identified that the first movement is not the first classification, the first electronic device (e.g., the processor 290 in FIG. 2) may identify whether or not the coordinates of the rotation center point P' are within a second range in operation 1650. The first electronic device (e.g., the processor 290 in FIG. 2) does not necessarily identify first whether the coordinates of the rotation center point P' are within the first range, and may identify whether the coordinates of the rotation center point P' are within the first range after identifying whether the coordinates of the rotation center point P' are within the second range or simultaneously identify whether the coordinates of the rotation center point P' are within the first range and whether the coordinates of the rotation center point P' are within the second range.

According to various embodiments, the second range is a range determined based on an estimated range of the earhole angle and, if the first movement is the second classification, may be a range indicating the region on the second coordinate system O' where the rotation center point P' may be located. According to various embodiments, if it is identified that the coordinates of the rotation center point P' are within the second range, the first electronic device (e.g., the processor 290 in FIG. 2) may identify that the first movement is the second classification. According to various embodiments, the first electronic device (e.g., the processor 290 in FIG. 2) may identify whether or not the coordinates of the first angular velocity vector Ω' are within a third range, thereby identifying whether or not the first movement is the second classification, which will be described in more detail with reference to the drawings described later.

The estimated range of the earhole angle α may be described by Equation 6 above.

Referring to FIG. 14B together, if the estimated earhole angle α is estimated as the range of Equation 6, instead of a single value, the angle α of the earhole axis 901a shown in FIG. 14B may have any value included in the range of Equation 6.

In the case where the earhole angle α is estimated as the range of Equation 6, the second range may be described by Equations 13 and 15 or Equations 13 and 15.

$$|\sin\gamma\cdot(\cos\beta\cdot\cot(\mu+n\sigma)+\sin\beta)|<1 \quad \text{[Equation 13]}$$

$$|\sin\gamma\cdot(\cos\beta\cdot\cot(\mu-n\sigma)+\sin\beta)|>1 \quad \text{[Equation 14]}$$

$$R_{rot} < 15 \text{ cm} \quad \text{[Equation 15]}$$

The coordinates (e.g., spherical coordinates) of the rotation center point P' may be ($R_{rot}$, β, γ). Equations 13 and 14 represent conditions in which the coordinates of the rotation center point P' are located on a conical surface (e.g., side surface) of a cone having a bottom plane perpendicular to the earhole axis in the case where the angle α of the earhole axis has an arbitrary value included in the range of Equation 6. Equation 15 represents conditions in which the length of the generator of the cone in Equation 13 or 14 is 15 cm or less.

According to various embodiments, if it is identified that the first movement is the second classification, the first electronic device (e.g., the processor 290 in FIG. 2) may identify a first wearing angle and/or a first inserting angle of the first electronic device 201, based on the coordinates of the first angular velocity vector Ω' of the first movement, in operation 1660.

For example, the first electronic device (e.g., the processor 290 in FIG. 2) may identify a first inserting angle α and a first wearing angle θ such that the coordinates (e.g., rectangular coordinates) of the angular velocity vector Ω become (0, 0, +|Ω|) or (0, 0, −|Ω|). The first inserting angle α may be an angle at which the first electronic device 201 is actually inserted into the user's ear. For example, the first inserting angle α may be identified by Equations 16, and the first wearing angle θ may be identified by Equations 17 and 18. In order the coordinates of the angular velocity vector Ω to be (0, 0, Ω) (where Ω is +|Ω| or −|Ω|), the coordinates (Ω'$_X$, Ω'$_Y$, Ω'$_Z$) (e.g., rectangular coordinates) of the first angular velocity vector Ω' may be (Ω·sin θ·sin α, −Ω·sin θ·cos α, Ω·cos θ).

$$\tan\alpha = -\frac{\Omega'_X}{\Omega'_Y}, (\mu - n\sigma < \alpha < \mu + n\sigma) \quad \text{[Equation 16]}$$

$$\sin\theta = \frac{\Omega'_X}{\Omega \cdot \sin\alpha} \quad \text{[Equation 17]}$$

$$\cos\theta = -\frac{\Omega'_Z}{\Omega} \quad \text{[Equation 18]}$$

The first wearing angle θ satisfying Equations 17 and 18 described above may be identified as two values. For example, since there is no constraint that Ω is positive (in other words, it may be positive or negative), the first wearing angle θ may be identified as two values, and a method of determining one of the two identified values as the first wearing angle θ will be described in more detail with reference to the drawings described later.

Figure 17:
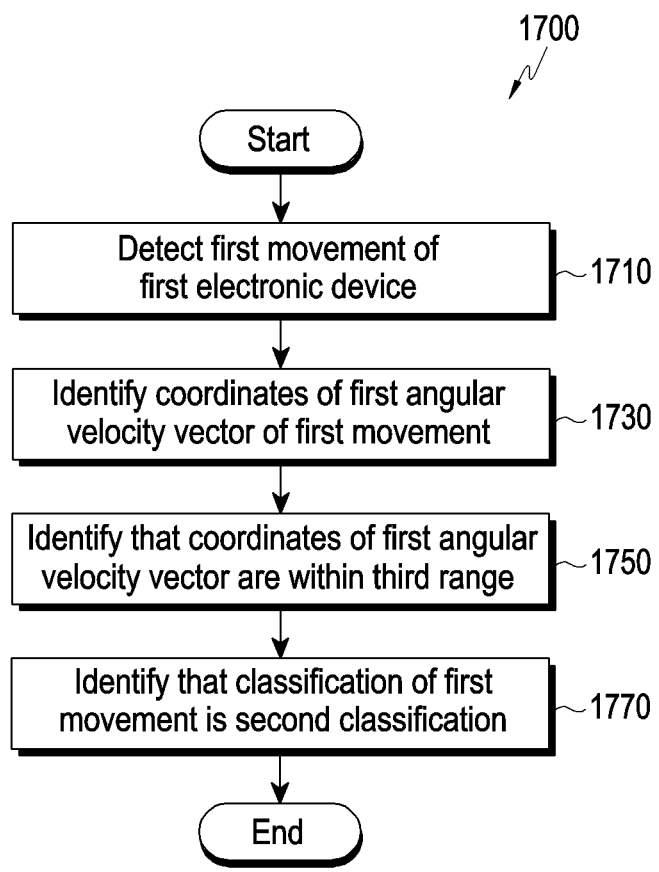
FIG. 17 is a flowchart illustrating a method in which a first electronic device identifies whether or not a first movement is a second type, based on an estimated range of an earhole angle, according to various embodiments.

FIG. 17 is a flowchart 1700 illustrating a method in which a first electronic device (e.g., the first electronic device 201 in FIG. 2) identifies whether or not a first movement is a second classification, based on an estimated range of an earhole angle, according to various embodiments.

According to various embodiments, the first electronic device (e.g., the processor 290 in FIG. 2) may detect a first movement of the first electronic device 201 in operation 1710.

According to various embodiments, the first electronic device (e.g., the processor 290 in FIG. 2) may identify the coordinates of a first angular velocity vector Ω' of the first movement in operation 1730.

According to various embodiments, the first electronic device (e.g., the processor 290 in FIG. 2) may identify whether or not the coordinates of the first angular velocity vector Ω' are within a third range in operation 1750.

According to various embodiments, the third range is a range determined based on an estimated range of the earhole angle and, if the first movement is the second classification, may be a range indicating the region on the second coordinate system O' where the first angular velocity vector Ω' may be located. For example, the estimated range of the earhole angle α may be described through the above-described Equation 6.

In the case where the earhole angle α is estimated as the range of Equation 6, the third range may be described by Equations 19 and 20.

$$-\frac{\pi}{2} + \mu - m\sigma < \beta_\Omega < -\frac{\pi}{2} + \mu + n\sigma \quad \text{[Equation 19]}$$

$$\frac{\pi}{2} + \mu - n\sigma < \beta_\Omega < \frac{\pi}{2} + \mu + n\sigma \quad \text{[Equation 20]}$$

The coordinates (e.g., spherical coordinates) of the first angular velocity vector Ω' may be (Ω', β$_\Omega$, γ$_\Omega$). Equations 19 and 20 represent conditions in which the coordinates of the first angular velocity vector Ω' are on a plane perpendicular to the earhole axis in the case where the angle α of the earhole axis has an arbitrary value included in the range of Equation 6.

According to various embodiments, the first electronic device (e.g., the processor 290 in FIG. 2) may identify whether or not the identified coordinates of the first angular velocity vector Ω' satisfy Equation 19 or Equation 20.

According to various embodiments, the first electronic device (e.g., the processor 290 in FIG. 2) may identify that the classification of the first movement is the second classification in operation 1770. For example, if the identified coordinates of the first angular velocity vector Ω' satisfy Equation 19 or Equation 20 described above, the first electronic device (e.g., the processor 290 in FIG. 2) may identify that the first movement is the second classification.

Figure 18:
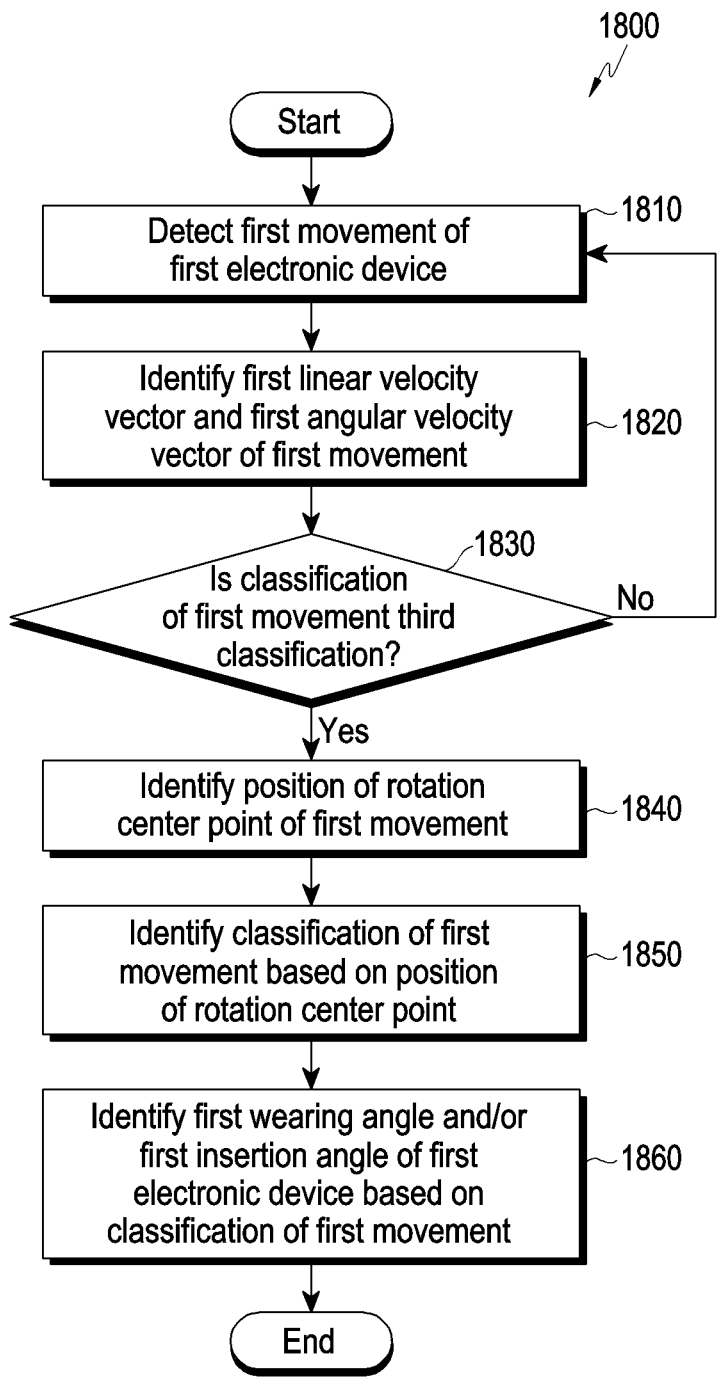
FIG. 18 is a flowchart illustrating an operation of a first electronic device depending on whether or not a first movement is a third type according to various embodiments.

FIG. 18 is a flowchart 1800 illustrating an operation of a first electronic device (e.g., the first electronic device 201 in FIG. 2) depending on whether or not a first movement is a third classification according to various embodiments.

According to various embodiments, the first electronic device (e.g., the processor 290 in FIG. 2) may detect a first movement of the first electronic device 201 in operation 1810. For example, the first movement may be a rotational movement of a pure rigid body about a fixed axis (e.g., a third classification of first movement) or a rotational movement including a translational movement.

According to various embodiments, the first electronic device (e.g., the processor 290 in FIG. 2) may identify a first linear velocity vector and a first angular velocity vector of the first movement in operation 1820. For example, the first linear velocity vector may be obtained by performing an integral operation on an acceleration vector (e.g., a linear acceleration vector) obtained using at least one inertial sensor (e.g., an acceleration sensor) of the first electronic device 201. For example, the first angular velocity vector may be obtained using at least one inertial sensor (e.g., a gyro sensor) of the first electronic device 201.

According to various embodiments, the first electronic device (e.g., the processor 290 in FIG. 2) may identify whether or not the classification of the first movement is the third classification in operation 1830. For example, referring to FIG. 11 together, the first electronic device (e.g., the processor 290 in FIG. 2) may identify whether or not the identified first linear velocity vector v' and first angular velocity vector Ω' satisfy Equation 4 and/or Equation 5. If the identified first linear velocity vector v' and first angular velocity vector Ω' do not satisfy Equation 4 or Equation 5, the first electronic device (e.g., the processor 290 in FIG. 2) may identify that the classification of the first movement is not the third classification and perform operation 1810 again. For example, the first electronic device (e.g., the processor 290 in FIG. 2) may sense a first movement of the first electronic device 201 at the next time point. If the identified first linear velocity vector v' and first angular velocity vector Ω' satisfy Equation 4 and Equation 5, the first electronic device (e.g., the processor 290 in FIG. 2) may identify that the classification of the first movement is the third classification and perform operation 1840.

According to various embodiments, if it is identified that the classification of the first movement is the third classification, the first electronic device (e.g., the processor 290 in FIG. 2) may identify a position of the rotation center point P' of the first movement in operation 1840. For example, operation 1840 may be described in the same manner as operation 1530 in FIG. 15 or operation 1620 in FIG. 16.

According to various embodiments, the first electronic device (e.g., the processor 290 in FIG. 2) may identify the classification of the first movement, based on the position of the rotation center point P', in operation 1850. For example, operation 1850 may be described in the same manner as operation 1550 in FIG. 15 or operation 1630 or operation 1650 in FIG. 16. According to various embodiments, when identifying the classification of the first movement in operation 1850, it is possible to identify whether or not the first movement is the second classification according to operations 1730 to 1770 in FIG. 17.

According to various embodiments, in operation 1860, the first electronic device (e.g., the processor 290 in FIG. 2) may identify a first wearing angle and/or a first inserting angle of the first electronic device 201, based on the classification of first movement. For example, operation 1860 may be described in the same manner as operation 1570 in FIG. 15 or operation 1640 or operation 1660 in FIG. 16.

Figure 19A:
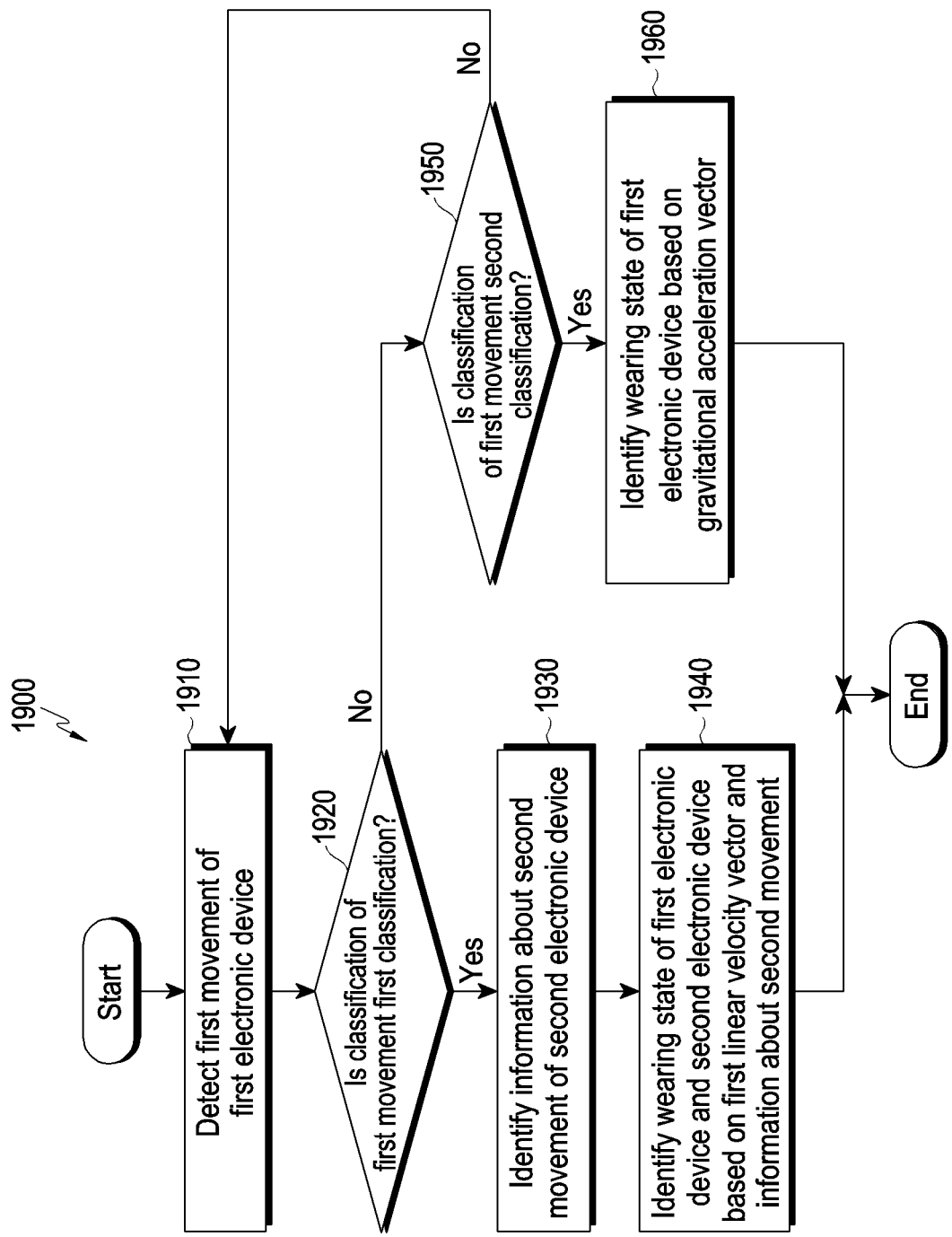
FIG. 19A is a flowchart illustrating a method in which a first electronic device identifies a wearing state of the first electronic device according to various embodiments.

FIG. 19A is a flowchart 1900 illustrating a method in which a first electronic device (e.g., the first electronic device 201 in FIG. 2) identifies a wearing state of the first electronic device 201 according to various embodiments. For example, the wearing state of the first electronic device 201 may be a normal wearing state or a reverse wearing state.

According to various embodiments, the first electronic device (e.g., the processor 290 in FIG. 2) may detect a first movement of the first electronic device 201 in operation 1910.

According to various embodiments, the first electronic device (e.g., the processor 290 in FIG. 2) may identify whether or not the classification of the first movement is the first classification in operation 1920.

According to various embodiments, if it is identified that the classification of the first movement is the first classification, the first electronic device (e.g., the processor 290 in FIG. 2) may identify information about a second movement of a second electronic device (e.g., the second electronic device 202 in FIG. 2) in operation 1930. The second electronic device 202 may be in the state of being worn on the same user as the first electronic device 201. The information about the second movement of the second electronic device 202 may include information about a linear velocity of the second movement obtained using at least one inertial sensor (e.g., an acceleration sensor and/or a gyro sensor) of the second electronic device 202. For example, the information about the linear velocity of the second movement may include information about the coordinates converted from the coordinates of a second linear velocity vector sensed by the second electronic device 202 according to the second movement (hereinafter, information about the transformed second linear velocity vector ($V_L$)) on the user coordinate system (e.g., the first coordinate system O). A method of converting the coordinates of the sensed second linear velocity vector into the user coordinate system (e.g., the first coordinate system O) by the second electronic device 202 may be performed based on a second wearing angle and a second inserting angle of the second electronic device 202. According to various embodiments, the first electronic device (e.g., the processor 290 in FIG. 2) may receive information about the second movement from the second electronic device 202 through a communication module (e.g., the communication module 210 in FIG. 2) and, based on the received information about the second movement, identify information about the converted second linear velocity vector ($V_L$).

According to various embodiments, the first electronic device (e.g., the processor 290 in FIG. 2) may identify the wearing state of the first electronic device 201 and the second electronic device 202, based on a first linear velocity vector and the information about the second movement, in operation 1940. According to various embodiments, the first electronic device (e.g., the processor 290 in FIG. 2) may perform an integral operation on an acceleration vector (e.g., a linear acceleration vector) obtained using at least one inertial sensor (e.g., an acceleration sensor), thereby obtaining a first linear velocity vector v'. For example, the obtained first linear velocity vector v' may be a vector value on the coordinate system of the first electronic device 201 (e.g., the second coordinate system O'). The first electronic device (e.g., the processor 290 in FIG. 2) may convert the first linear velocity vector v' on the coordinate system of the first electronic device 201 (e.g., the second coordinate system O'), based on a first wearing angle α and a first inserting angle θ, into a coordinate value on the user coordinate system (e.g., the first coordinate system O), thereby identifying a converted first linear velocity vector ($v_R$). According to various embodiments, the first electronic device (e.g., the processor 290 in FIG. 2) may identify and compare the converted first linear velocity vector ($v_R$) and the converted second linear velocity vector ($V_L$) to identify the wearing state of the first electronic device 201 and the second electronic device 202, which will be described in more detail with reference to the drawings described later.

According to various embodiments, if it is identified that the classification of the first movement is not the first classification, the first electronic device (e.g., the processor 290 in FIG. 2) may identify whether the classification of the first movement is the second classification in operation 1950. According to various embodiments, if it is identified that the classification of the first movement is not the second classification, the first electronic device (e.g., the processor 290 in FIG. 2) may perform operation 1910 again.

According to various embodiments, if it is identified that the classification of the first movement is the second classification, the first electronic device (e.g., the processor 290 in FIG. 2) may identify the wearing state of the first electronic device 201, based on a gravitational acceleration vector, in operation 1960. A method in which the first electronic device (e.g., the processor 290 in FIG. 2) identifies the wearing state of the first electronic device 201, based on the gravitational acceleration vector, will be described in more detail with reference to drawings described later. According to various embodiments, the second electronic device 202 may also identify the wearing state of the second electronic device 202 in the same manner.

Figure 19B:
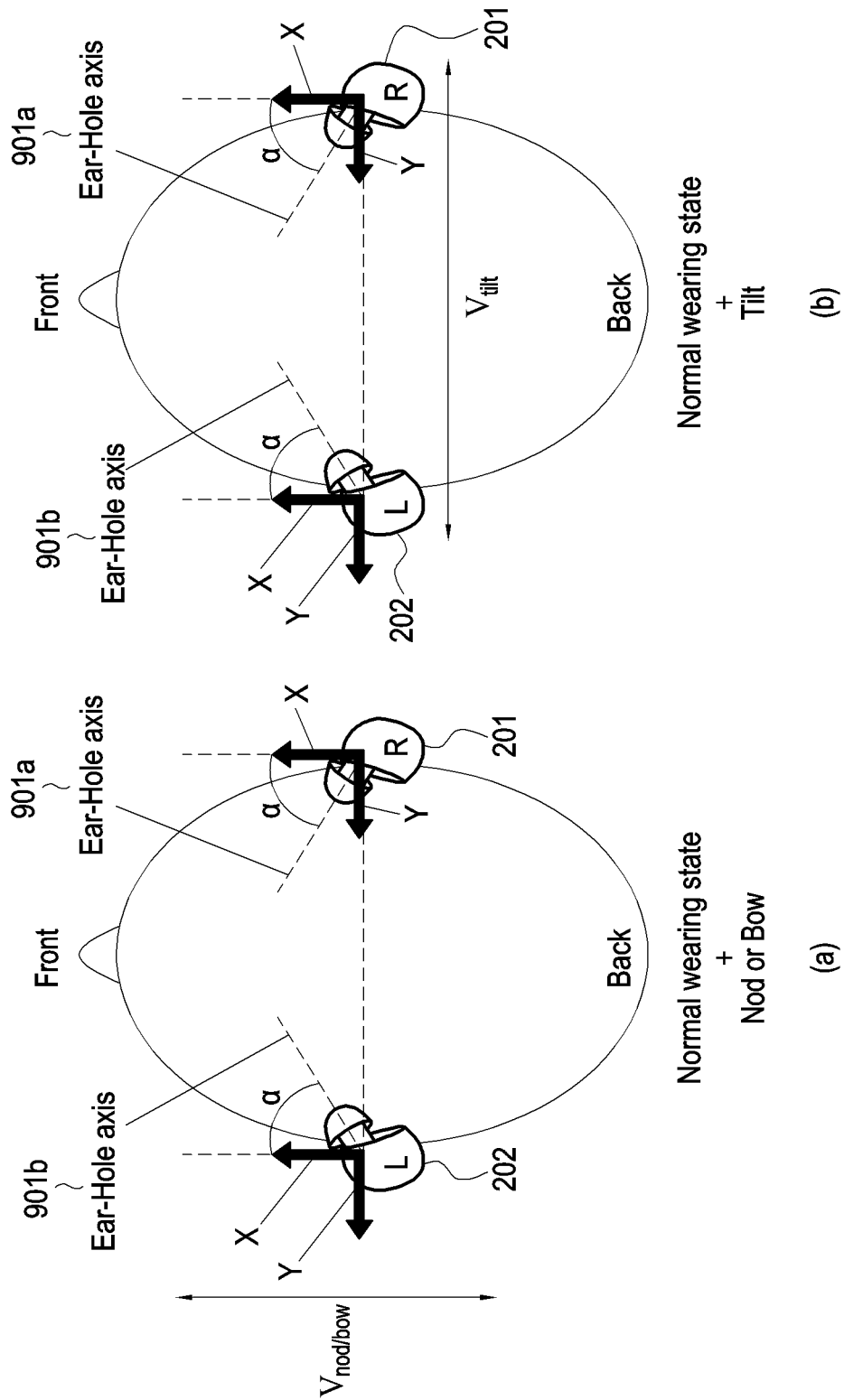
FIG. 19B is a diagram illustrating a method in which a first electronic device identifies that the first electronic device is in a normal wearing state when a user's motion is a nod motion, a bow motion, or a tilt motion according to various embodiments.
Figure 19C:
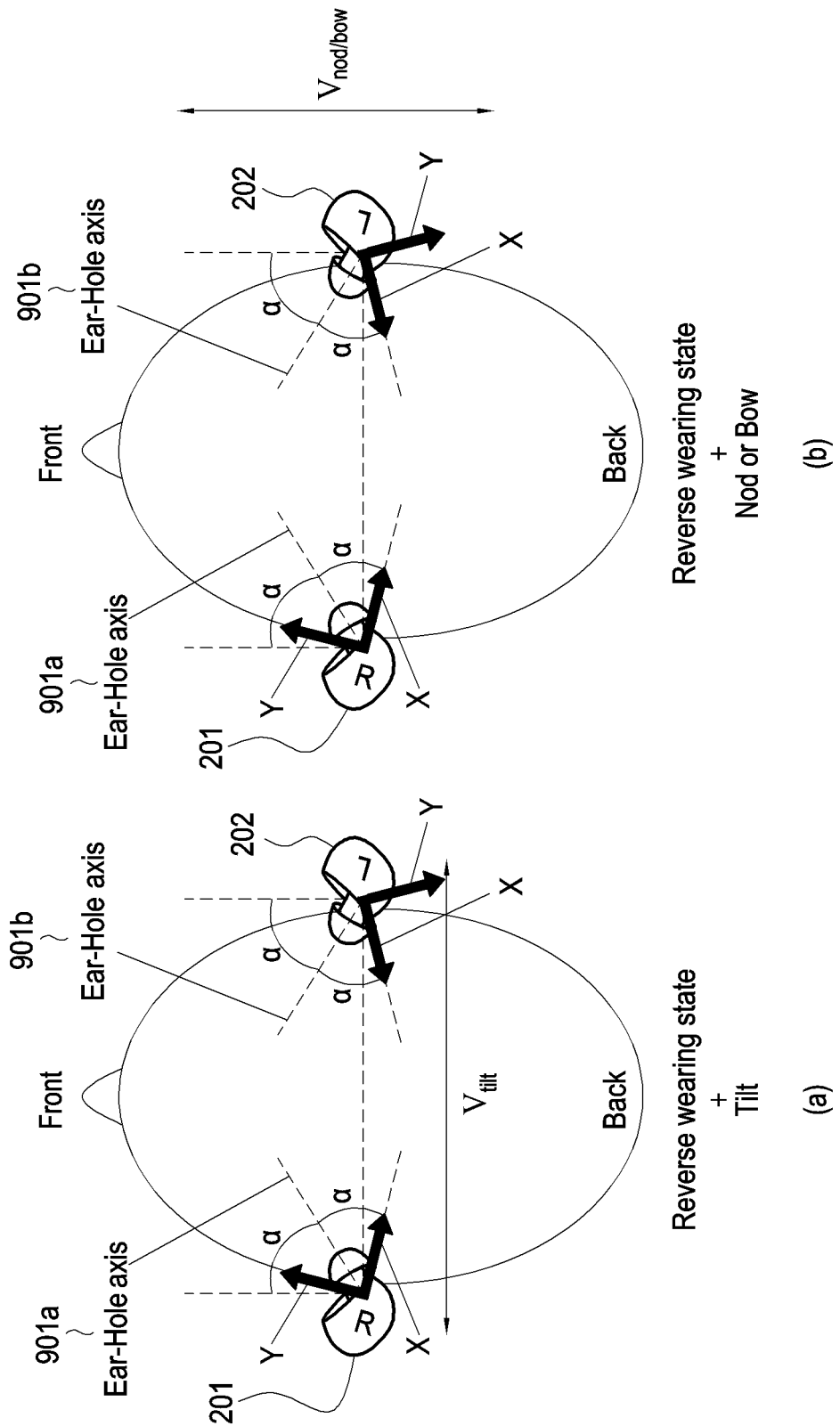
FIG. 19C illustrates a method in which a first electronic device identifies that the first electronic device is in a reverse wearing state when a user's motion is a nod motion, a bow motion, or a tilt motion according to various embodiments.

FIG. 19B is a diagram illustrating a method in which a first electronic device 201 identifies that the first electronic device is in a normal wearing state when a user's motion is a nod motion, a bow motion, or a tilt motion according to various embodiments. FIG. 19C illustrates a method in which a first electronic device 201 identifies that the first electronic device is in a reverse wearing state when a user's motion is a nod motion, a bow motion, or a tilt motion according to various embodiments.

According to various embodiments, in the case where the user's motion is a nod motion or a bow motion, the direction of a user's linear velocity ($v_{nod/bow}$) may be substantially parallel to the x-axis on the user coordinate system (e.g., the first coordinate system O). In the case where the user's motion is a tilt motion, the direction of a user's linear velocity ($v_{tilt}$) may be substantially parallel to the y-axis on the user coordinate system (e.g., the first coordinate system O).

According to various embodiments, the first electronic device 201 may identify a first linear velocity vector ($V_R$)

and a second linear velocity vector ($V_L$), which are converted into the coordinates on the user coordinate system (e.g., the first coordinate system O). According to various embodiments, the first electronic device 201 may compare the converted first linear velocity vector ($V_R$) and the converted second linear velocity vector ($V_L$) on the x-axis or the y-axis, respectively, of the user coordinate system (e.g., the first coordinate system O).

For example, in the case of normal wearing, it may be identified whether or not the first linear velocity vector ($V_R$) and the second linear velocity vector ($V_L$), which are converted into the coordinates on the user coordinate system (e.g., the first coordinate system O), have substantially the same direction as each other (e.g., whether they are parallel to each other within a preconfigured angle). For example, the preconfigured angle may be a preconfigured value in consideration of an error that may occur in the process of identifying (calculating) the earhole angle α using Equation 10. For example, whether or not the converted first linear velocity vector ($V_R$) and the converted second linear velocity vector ($V_L$) are parallel to each other within a preconfigured angle may be identified by Equation 21.

$$\frac{V_R \cdot V_L}{|V_R| \cdot |V_L|} > \text{Threshold 3} \qquad \text{[Equation 21]}$$

Threshold 3 is a preconfigured value in consideration of the above-described error, and may be, for example, 0. According to various embodiments, if the converted first linear velocity vector ($V_R$) and second linear velocity vector ($V_L$) are in the same direction (e.g., if Equation 21 is satisfied), the first electronic device 201 may determine that the first electronic device 201 and the second electronic device 202 are in the normal wearing state (e.g., FIG. 19B), and if the converted first linear velocity vector ($V_R$) and second linear velocity vector ($V_L$) are in the opposite direction (e.g., if Equation 21 is not satisfied), the first electronic device 201 may determine that the first electronic device 201 and the second electronic device 202 are in the left-right inversion wearing state (e.g., FIG. 19C).

According to various embodiments, if the wearing state of the first electronic device 201 and the second electronic device 202 are determined, the first electronic device 201 may identify whether the converted first linear velocity vector ($V_R$) and the converted second linear velocity vector ($V_L$) are parallel to the x-axis or the y-axis within a preconfigured angle. For example, the preconfigured angle may be a preconfigured value in consideration of an error that may occur in the process of identifying (calculating) the earhole angle α using Equation 10.

For example, the first electronic device 201 may identify whether or not the converted first linear velocity vector ($V_R$) and the converted second linear velocity vector ($V_L$) are parallel to the x-axis within a preconfigured angle. For example, whether or not the converted first linear velocity vector ($V_R$) and the converted second linear velocity vector ($V_L$) are parallel to the x-axis within a preconfigured angle may be identified by Equation 22.

$$\frac{|v_x|}{|v|} > \text{threshold 4} \qquad \text{[Equation 22]}$$

In Equation 22, v denotes the converted first linear velocity vector ($V_R$) or the converted second linear velocity vector ($V_L$), and $v_x$ may be an x-axis component of v. Threshold 4 is a preconfigured value in consideration of the above-described error, and may be, for example, 0.9. If the earhole angle α is identified (calculated) to exactly match the angle at which the first electronic device 201 or the second electronic device 202 is actually inserted into the user's ear, $|v_x|/|v|$ in Equation 22 may be calculated as 1 or a value close to 1.

For example, the first electronic device 201 may identify whether or not the converted first linear velocity vector ($V_R$) and the converted second linear velocity vector ($V_L$) are parallel to the y-axis within a preconfigured angle. For example, whether or not the converted first linear velocity vector ($V_R$) and the converted second linear velocity vector ($V_L$) are parallel to the y-axis within a preconfigured angle may be identified by Equation 23.

$$\frac{|v_y|}{|v|} > \text{threshold 5} \qquad \text{[Equation 23]}$$

In Equation 23, v denotes the converted first linear velocity vector ($V_R$) or the converted second linear velocity vector ($V_L$), and $v_y$ may be a y-axis component of v. Threshold 5 is a preconfigured value in consideration of the above-described error, and may be, for example, 0.9. If the earhole angle α is identified (calculated) to exactly match the angle at which the first electronic device 201 or the second electronic device 202 is actually inserted into the user's ear, $|v_y|/|v|$ in Equation 23 may be calculated as 1 or a value close to 1.

Referring to (a) of FIG. 19B and (a) of FIG. 19C, if the converted first linear velocity vector ($V_R$) and the converted second linear velocity vector ($V_L$) are parallel to the x-axis within a preconfigured angle, the user's motion may be a nod motion or a bow motion in a normal wearing state, (e.g., the case shown in (a) of FIG. 19B), and may be a tilt motion in a reverse wearing state (e.g., the case shown in (a) of FIG. 19C).

For example, referring to (a) of FIG. 19B, if the user's motion is a nod motion or a bow motion in the state in which the first electronic device 201 and the second electronic device 202 are normally worn, both the converted first linear velocity vector ($v_R$) and the converted second linear velocity vector ($V_L$) corresponding to the linear velocity ($v_{nod/bow}$) of the user may be parallel to the x-axis within a preconfigured angle in the user coordinate system (e.g., the first coordinate system O).

For example, referring to (a) of FIG. 19C, if the user's motion is a tilt motion in the state in which the first electronic device 201 and the second electronic device 202 are reversely worn between left and right, both the converted first linear velocity vector ($V_R$) and the converted second linear velocity vector ($V_L$) corresponding to the linear velocity ($v_{tilt}$) of the user may be parallel to the x-axis within a preconfigured angle in the user coordinate system (e.g., the first coordinate system O).

As described above, if it is identified that the converted first linear velocity vector ($V_R$) and the converted second linear velocity vector ($V_L$) are parallel to the x-axis within a preconfigured angle in the case of determining a normal wearing state, the first electronic device 201 and/or the second electronic device 202 may identify that the user's motion is a nod or bow motion, and if it is identified that the converted first linear velocity vector ($v_R$) and the converted second linear velocity vector ($V_L$) are parallel to the x-axis within a preconfigured angle in the case of determining a reverse wearing state, the first electronic device 201 and/or the second electronic device 202 may identify that the user's motion is a tilt motion.

Referring to (b) of FIG. 19B and (b) of FIG. 19C, if the converted first linear velocity vector ($V_R$) and the converted second linear velocity vector ($V_L$) are parallel to the y-axis within a preconfigured angle, the user's motion may be a tilt motion (e.g., the case shown in (b) of FIG. 19B) in the normal wearing state, and may be a nod motion or a bow motion (e.g., the case shown (b) of FIG. 19C) in the reverse wearing state.

For example, referring to (b) of FIG. 19B, if the user's motion is a tilt motion in the state in which the first electronic device 201 and the second electronic device 202 are normally worn, both the converted first linear velocity vector ($V_R$) and the converted second linear velocity vector ($V_L$) corresponding to the linear velocity ($v_{tilt}$) of the user may be parallel to the y-axis within a preconfigured angle in the user coordinate system (e.g., the first coordinate system O).

For example, referring to (b) of FIG. 19C, if the user's motion is a nod motion or a bow motion in the state in which the first electronic device 201 and the second electronic device 202 are reversely worn between left and right, both the converted first linear velocity vector ($V_R$) and the converted second linear velocity vector ($V_L$) corresponding to the linear velocity ($v_{nod/bow}$) of the user may be parallel to the y-axis within a preconfigured angle in the user coordinate system (e.g., the first coordinate system O).

As described above, if it is identified that the converted first linear velocity vector ($v_R$) and the converted second linear velocity vector ($V_L$) are parallel to the y-axis within a preconfigured angle in the case of determining the normal wearing state, the first electronic device 201 and/or the second electronic device 202 may identify that the user's motion is a tilt motion, and if it is identified that the converted first linear velocity vector ($v_R$) and the converted second linear velocity vector ($V_L$) are parallel to the y-axis within a preconfigured angle in the case of determining the reverse wearing state, the first electronic device 201 and/or the second electronic device 202 may identify that the user's motion is a nod or bow motion.

Figure 20:
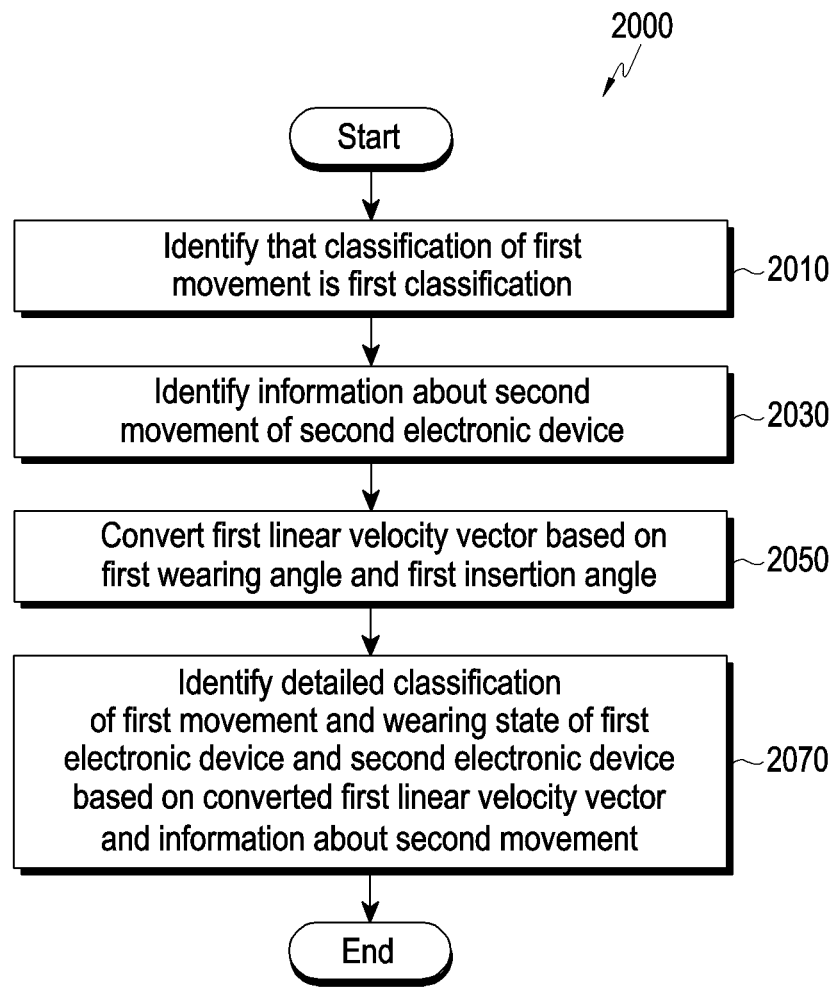
FIG. 20 is a flowchart illustrating a method in which a first electronic device identifies the wearing state of the first electronic device and a second electronic device to identify a detailed type of a first movement according to various embodiments.

FIG. 20 is a flowchart 2000 illustrating a method in which a first electronic device (e.g., the first electronic device 201 in FIG. 2) identifies the wearing state of the first electronic device 201 and a second electronic device (e.g., the second electronic device 202 in FIG. 2) to identify a detailed classification of a first movement according to various embodiments. Hereinafter, a description will be made with reference to FIGS. 19A to 19C together. According to various embodiments, the first electronic device 201 and the second electronic device 202 may be in the state of being worn on the same user.

According to various embodiments, the first electronic device (e.g., the processor 290 in FIG. 2) may identify that the classification of the first movement is the first classification in operation 2010. For example, the first classification may be a motion corresponding to a nod motion, a bow motion, or a tilt motion of the user.

According to various embodiments, the first electronic device (e.g., the processor 290 in FIG. 2) may identify information about a second movement of the second electronic device 202 in operation 2030. For example, the first electronic device (e.g., the processor 290 in FIG. 2) may receive information about the second movement from the second electronic device 202 using a communication module (e.g., the communication module 210 in FIG. 2).

According to various embodiments, the first electronic device (e.g., the processor 290 in FIG. 2) may convert a first linear velocity vector v', based on a first wearing angle θ and a first inserting angle α in operation 2050. For example, the first electronic device (e.g., the processor 290 in FIG. 2) may convert a first linear velocity vector v' obtained using at least one inertial sensor (e.g., an acceleration sensor) into a coordinate value on the user coordinate system O, based on the wearing angle θ and the first inserting angle α. According to various embodiments, the information about the second movement of the second electronic device 202 received in operation 2030 may include information about a second linear velocity vector ($v_L$) converted into a coordinate value on the user coordinate system O in the second electronic device 202. According to various embodiments, if the information about the second movement of the second electronic device 202 received in operation 2030 includes the second linear velocity vector obtained by the second electronic device 202 and the information about the second wearing angle and the second inserting angle of the second electronic device 202, the first electronic device 201 may also convert the second linear velocity vector into a coordinate value on the user coordinate system O, based on the information about the second wearing angle and the second inserting angle of the second electronic device 202, and obtain information about the converted second linear velocity vector ($V_L$).

According to various embodiments, the first electronic device (e.g., the processor 290 in FIG. 2), based on the converted first linear velocity vector ($V_R$) and the information about the second movement, may identify a detailed classification of the first movement and the wearing state of the first electronic device 201 and the second electronic device 202 in operation 2070. For example, the detailed classification of the first classification may be a first detailed classification (e.g., a movement corresponding to a nod motion/a bow motion) or a second detailed classification (e.g., a movement corresponding to a tilt motion). According to various embodiments, the first electronic device (e.g., the processor 290 in FIG. 2) may compare directions of the converted first linear velocity vector ($V_R$) and the converted second linear velocity vector ($V_L$), and then compare the direction of the converted first linear velocity vector ($V_R$) and the direction of the converted second linear velocity vector ($V_L$) with the x-axis or the y-axis of the user coordinate system, thereby identifying the detailed classification of the first movement and the wearing state of the first electronic device 201 and the second electronic device 202.

Figure 21:
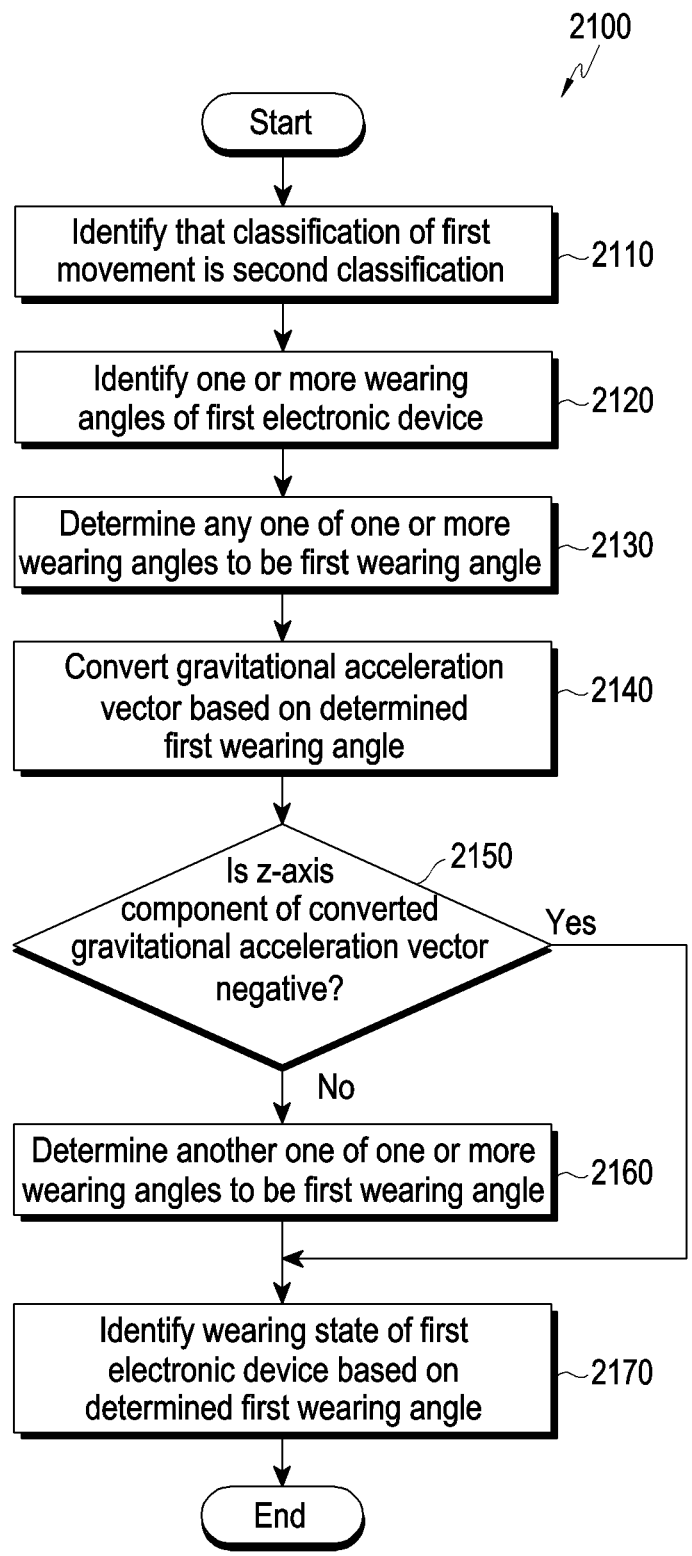
FIG. 21 is a diagram illustrating a method in which a first electronic device identifies the wearing state of the first electronic device and a second electronic device when a first movement is a second type according to various embodiments.

FIG. 21 is a diagram illustrating a method in which a first electronic device 201 identifies the wearing state of the first electronic device 201 and a second electronic device 202 when a first movement is a second classification according to various embodiments.

According to various embodiments, the first electronic device (e.g., the processor 290 in FIG. 2) may identify that the classification of the first movement is the second classification in operation 2110.

According to various embodiments, the first electronic device (e.g., the processor 290 in FIG. 2) may identify one or more wearing angles of the first electronic device 201 in operation 2120. For example, referring to FIG. 16 together, if the first movement is the second classification, the first wearing angle θ satisfying Equations 17 and 18 may be identified as two values.

According to various embodiments, the first electronic device (e.g., the processor 290 in FIG. 2) may determine any one of one or more wearing angles to be the first wearing angle in operation 2130. For example, the first electronic device (e.g., the processor 290 in FIG. 2) may determine any one of two values satisfying Equations 17 and 18 to be the first wearing angle θ.

According to various embodiments, the first electronic device (e.g., the processor 290 in FIG. 2) may convert a gravitational acceleration vector, based on the determined first wearing angle in operation 2140. For example, the first electronic device (e.g., the processor 290 in FIG. 2) may identify a gravitational acceleration vector (g') using at least one inertial sensor (e.g., an acceleration sensor). The first electronic device (e.g., the processor 290 in FIG. 2) may convert the identified gravitational acceleration vector (g') into the user coordinate system, based on the first wearing angle determined in operation 2130.

According to various embodiments, the first electronic device (e.g., the processor 290 in FIG. 2) may identify whether or not a z-axis component of the converted gravitational acceleration vector is negative in operation 2150. For example, the first electronic device (e.g., the processor 290 in FIG. 2) may identify whether or not the z-axis component of the gravitational acceleration vector converted into the user coordinate system is negative.

According to various embodiments, if the z-axis component of the converted gravitational acceleration vector is not negative (e.g., 0 or positive), the first electronic device (e.g., the processor 290 in FIG. 2) may determine another one of the one or more wearing angles to be the first wearing angle in operation 2160.

According to various embodiments, the first electronic device (e.g., the processor 290 in FIG. 2) may identify the wearing state of the first electronic device 201, based on the determined first wearing angle in operation 2170. For example, if the z-axis component of the converted gravitational acceleration vector is negative as a result of operation 2150, the first electronic device (e.g., the processor 290 in FIG. 2) may identify the wearing state of the first electronic device 201, based on the first wearing angle determined in operation 2130. For example, if the z-axis component of the converted gravitational acceleration vector is not negative as a result of operation 2150, the first electronic device (e.g., the processor 290 in FIG. 2) may identify the wearing state of the first electronic device 201, based on the first wearing angle determined in operation 2160. For example, the first electronic device (e.g., the processor 290 in FIG. 2) may identify a first linear velocity vector (v') using at least one inertial sensor (e.g., an acceleration sensor) and convert the first linear velocity vector (v') into the user coordinate system (e.g., the first coordinate system O), based on the first wearing angle θ determined in operation 2130 or 2150 and the first inserting angle α identified by Equation 16. If the user's motion in the normal wearing state is a shake motion, the direction of a linear velocity ($v_{shake}$) of the user may be substantially parallel to the x-axis on the user coordinate system (e.g., the first coordinate system O). If the user's motion in the reverse wearing state is a shake motion, the direction of a linear velocity ($v_{shake}$) of the user may be substantially parallel to the y-axis on the user coordinate system (e.g., the first coordinate system O). According to various embodiments, if the converted first linear velocity vector ($V_R$) is parallel to the x-axis of the user coordinate system (e.g., the first coordinate system O) within a preconfigured angle, the first electronic device (e.g., the processor 290 in FIG. 2) may determine that as a normal wearing state. For example, whether or not the converted first linear velocity vector ($V_R$) is parallel to the x-axis within a preconfigured angle may be identified according to Equation 22. According to various embodiments, if the converted first linear velocity vector ($V_R$) is parallel to the y-axis of the user coordinate system (e.g., the first coordinate system O) within a preconfigured angle, the first electronic device (e.g., the processor 290 in FIG. 2) may determine that as a reverse wearing state. For example, whether or not the converted first linear velocity vector ($V_R$) is parallel to the y-axis within a preconfigured angle may be identified according to Equation 23.

Figure 22:
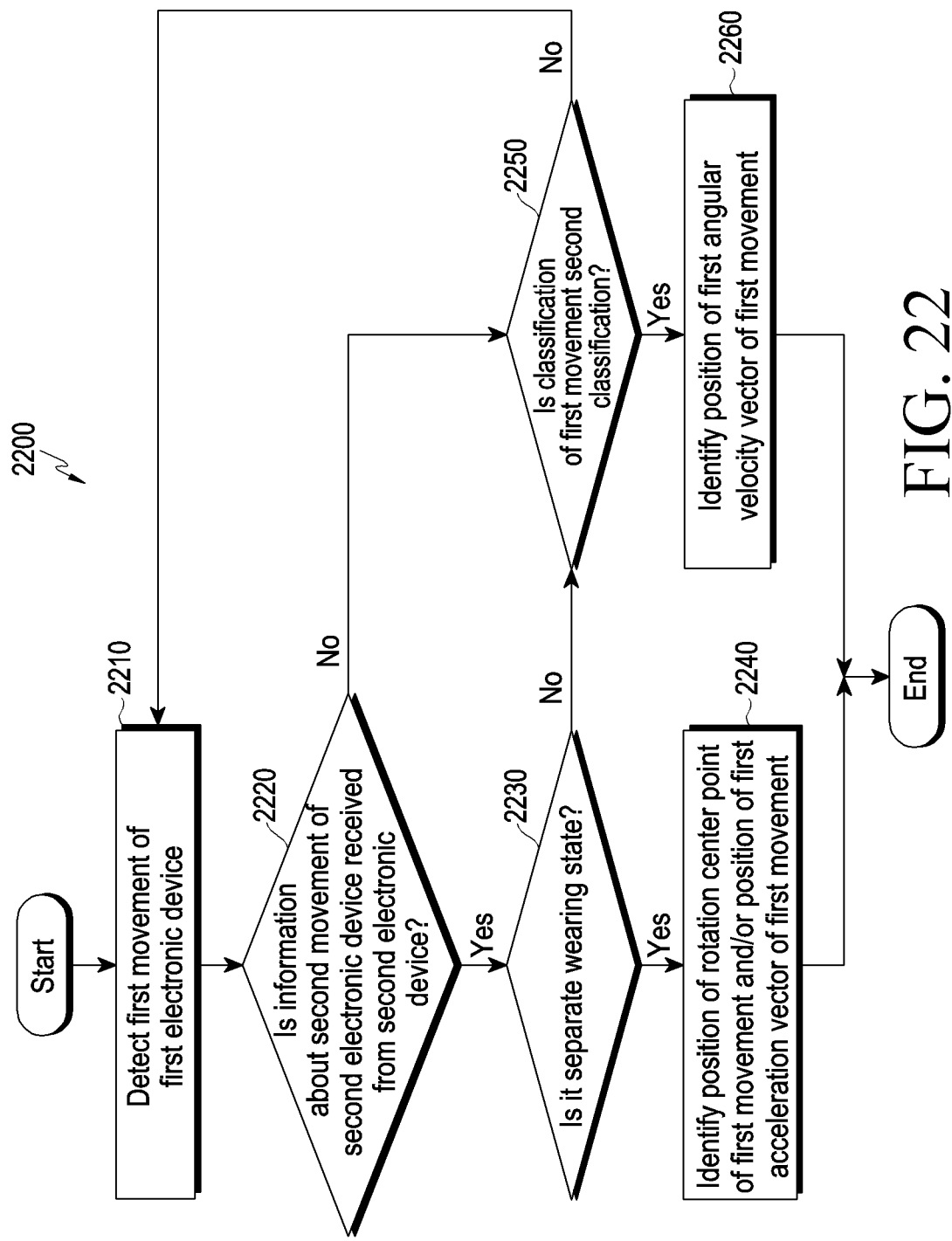
FIG. 22 is a flowchart illustrating an operation of a first electronic device depending on separate or non-separate wearing according to various embodiments.

FIG. 22 is a flowchart 2200 illustrating an operation of a first electronic device (e.g., the first electronic device 201 in FIG. 2) depending on separate wearing or non-separate wearing according to various embodiments.

According to various embodiments, the first electronic device (e.g., the processor 290 in FIG. 2) may detect a first movement of the first electronic device 201 in operation 2210.

According to various embodiments, the first electronic device (e.g., the processor 290 in FIG. 2) may identify whether or not information about a second movement of a second electronic device (e.g., the second electronic device 202 in FIG. 2) is received from the second electronic device 202 in operation 2220. For example, the first electronic device (e.g., the processor 290 in FIG. 2) may receive information about the second movement through a communication module (e.g., the communication module 210 in FIG. 2). For example, the information about the second movement may include information about an acceleration sensed by an inertial sensor (e.g., an acceleration sensor) of the second electronic device 202. For example, if the information about the second movement is not received from the second electronic device 202, the first electronic device (e.g., the processor 290 in FIG. 2) may identify that as a single wearing state.

According to various embodiments, if the information about the second movement of the second electronic device (e.g., the second electronic device 202 in FIG. 2) is received from the second electronic device 202, the first electronic device (e.g., the processor 290 in FIG. 2) transmits the from the second electronic device), if the information about the second movement may identify whether or not it is a separate wearing state in operation 2230. For example, the first electronic device (e.g., the processor 290 in FIG. 2) may identify whether or not it is a separate wearing state, based on Equations 1 to 3 in FIG. 10A.

According to various embodiments, if it is identified as not the separate wearing state, the first electronic device (e.g., the processor 290 in FIG. 2) may identify a position of the rotation center point of the first movement and/or a position of a first acceleration vector of the first movement in operation 2240. The first electronic device (e.g., the processor 290 in FIG. 2) may perform operations based on the position of the rotation center point of the first movement and/or the position of the first acceleration vector of the first movement described above in the disclosure.

According to various embodiments, if the information about the second movement of the second electronic device 202 is not received from the second electronic device 202 or if it is identified as the separate wearing state, the first electronic device (e.g., the processor 290 in FIG. 2) may identify whether or not the classification of the first movement is the second classification in operation 2250. According to various embodiments, if it is identified that the classification of the first movement is not the second classification, the first electronic device (e.g., the processor 290 in FIG. 2) may perform operation 2610 again.

According to various embodiments, if it is identified that the classification of the first movement is the second classification, the first electronic device (e.g., the processor 290 in FIG. 2) may identify a position of a first angular velocity vector of the first movement in operation 2260. The first electronic device (e.g., the processor 290 in FIG. 2) may perform operations based on the position of the first angular velocity vector of the first movement described above in the disclosure.

Figure 23:
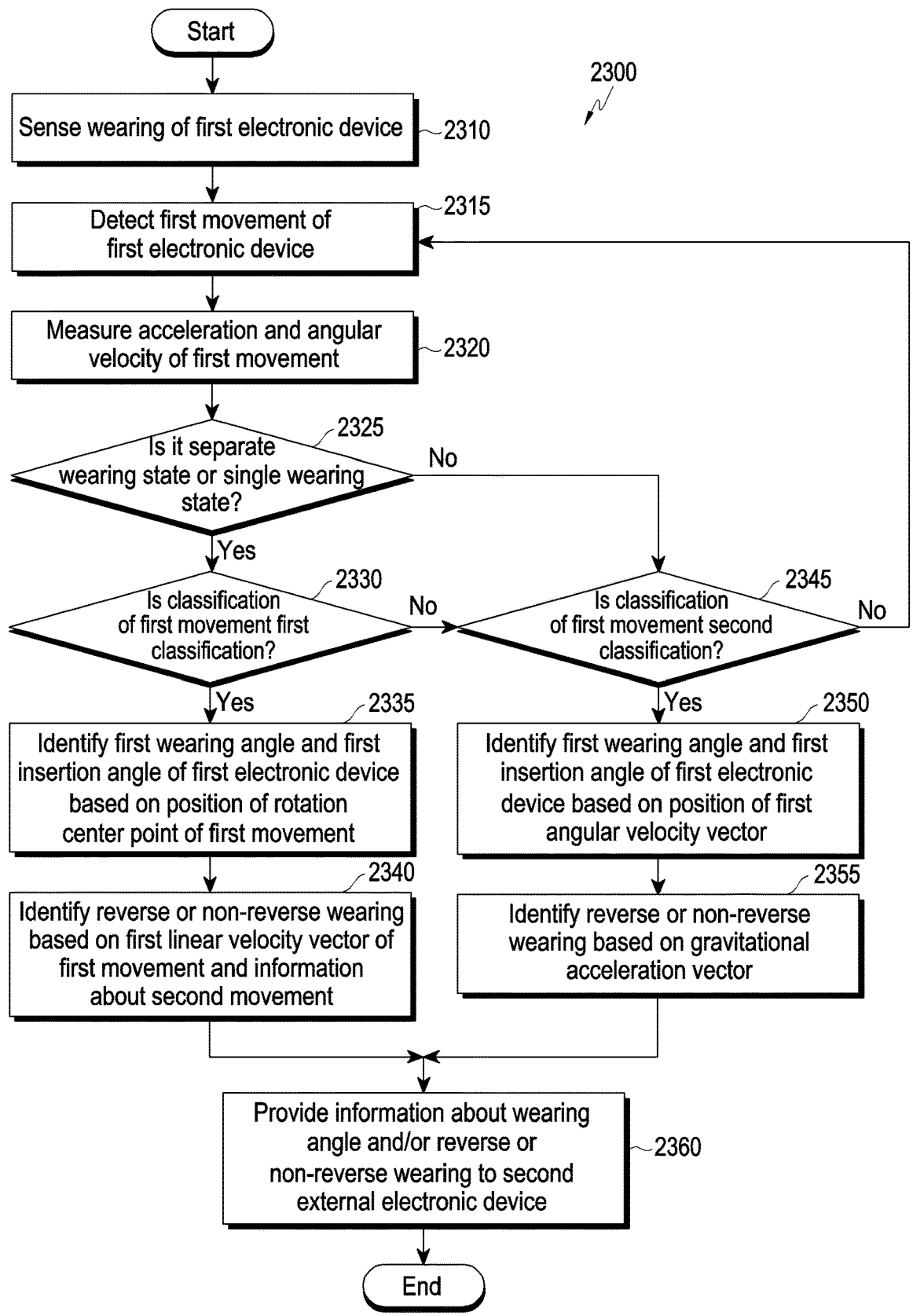
FIG. 23 is a flowchart illustrating an operation of a first electronic device according to various embodiments.

FIG. 23 is a flowchart 2300 illustrating an operation of a first electronic device (e.g., the first electronic device 201 in FIG. 2) according to various embodiments.

According to various embodiments, the first electronic device (e.g., the processor 290 in FIG. 2) may sense wearing of the first electronic device 201 in operation 2310. For example, the first electronic device (e.g., the processor 290 in FIG. 2) may include a sensor module (e.g., the sensor module 230 in FIG. 2) and/or a connection terminal (e.g., a connection terminal included in the interface 280 in FIG. 2) connection terminal included in), it may be identified whether the first electronic device 204 is separated from the first external electronic device (e.g., the first external electronic device 204 in FIG. 2). For example, the first electronic device (e.g., the processor 290 in FIG. 2) may identify whether or not the first electronic device 201 is separated from a first external electronic device (e.g., the first external electronic device 204 in FIG. 2) using a sensor module (e.g., the sensor module 230 in FIG. 2) and/or a connection terminal (e.g., a connection terminal included in the interface 280 in FIG. 2). For example, if no electrical connection is established between the sensor module (e.g., the sensor module 230 in FIG. 2) and/or the connection terminal (e.g., a connection terminal included in the interface 280 in FIG. 2) and the first external electronic device (e.g., the first external electronic device 205 in FIG. 2), the first electronic device (e.g., the processor 290 in FIG. 2) may identify that the first electronic device 201 has been separated from the first external electronic device (e.g., the first external electronic device 204 in FIG. 2). The first electronic device (e.g., the processor 290 in FIG. 2) may identify whether or not it is worn on the user after being separated from the first external electronic device (e.g., the first external electronic device 204 in FIG. 2), based on sensing data obtained from at least one sensor. For example, if proximity to the user's body is sensed by at least one proximity sensor or if a movement (e.g., rotational movement) of the first electronic device 201 is sensed by at least one inertial sensor, the first electronic device (e.g., the processor 290 in FIG. 2) may identify that the first electronic device 201 has been worn on the user.

According to various embodiments, the first electronic device (e.g., the processor 290 in FIG. 2) may sense a first movement of the first electronic device 201 in operation 2315. For example, the classification of first movement may be the third classification. According to various embodiments, if it is identified that the first movement classification is not the third classification, the first electronic device (e.g., the processor 290 in FIG. 2) may perform operation 2315 again.

According to various embodiments, the first electronic device (e.g., the processor 290 in FIG. 2) may measure an acceleration and an angular velocity of the first movement in operation 2320. For example, the first electronic device (e.g., the processor 290 in FIG. 2) may identify an acceleration vector and/or an angular velocity vector of the first movement.

According to various embodiments, the first electronic device (e.g., the processor 290 in FIG. 2) may identify whether it is a separate wearing state or a single wearing state in operation 2325. For example, the first electronic device (e.g., the processor 290 in FIG. 2) may identify whether it is a separate wearing state by comparing an acceleration of the first electronic device 201 with an acceleration of the second electronic device (e.g., the second electronic device 202 in FIG. 2). For example, the first electronic device (e.g., the processor 290 in FIG. 2) may identify whether or not it is a single wearing state, based on whether or not information about the second movement of the second electronic device 202 is received from the second electronic device 202.

According to various embodiments, if it is identified as not the separate wearing state and single wearing state, the first electronic device (e.g., the processor 290 in FIG. 2) may identify whether the classification of the first movement is the first classification in operation 2330.

According to various embodiments, if it is identified that the classification of the first movement is the first classification, the first electronic device (e.g., the processor 290 in FIG. 2) may identify a first wearing angle and a first inserting angle of the first electronic device, based on a position of the rotation center point of the first movement, in operation 2335.

According to various embodiments, the first electronic device (e.g., the processor 290 in FIG. 2) may identify reverse or non-reverse wearing, based on the first linear velocity vector of the first movement and information about the second movement in operation 2340.

According to various embodiments, if it is identified as the separate wearing state or the single wearing state, or if it is identified that the classification of the first movement is not the first classification, the first electronic device (e.g., the processor 290 in FIG. 2) may identify whether or not the classification of the first movement is the second classification in operation 2345. According to various embodiments, if it is identified that the classification of the first movement is not the second classification, operation 2315 may be performed again.

According to various embodiments, if it is identified that the classification of the first movement is the second classification, the first electronic device (e.g., the processor 290 in FIG. 2) may identify a first wearing angle and a first inserting angle of the first electronic device 201, based on a position of the first angular velocity vector, in operation 2350.

According to various embodiments, the first electronic device (e.g., the processor 290 in FIG. 2) may identify reverse or non-reverse wearing, based on a gravitational acceleration vector in operation 2355.

According to various embodiments, the first electronic device (e.g., the processor 290 in FIG. 2) may provide information about an wearing angle and/or reverse or non-reverse wearing to a second external electronic device (e.g., the second external electronic device 205 in FIG. 2) in operation 2360. For example, the first electronic device (e.g., the processor 290 in FIG. 2) may transmit information about an wearing angle and/or reverse or non-reverse wearing to the second external electronic device 205 through the communication module 210. For example, the information about an wearing angle and/or reverse or non-reverse wearing may include information about the first wearing angle and/or reverse or non-reverse wearing of the first electronic device 201. For example, the information about an wearing angle and/or reverse or non-reverse wearing may further include information about the second wearing angle and/or reverse or non-reverse wearing of the second electronic device 201.

Figure 24:
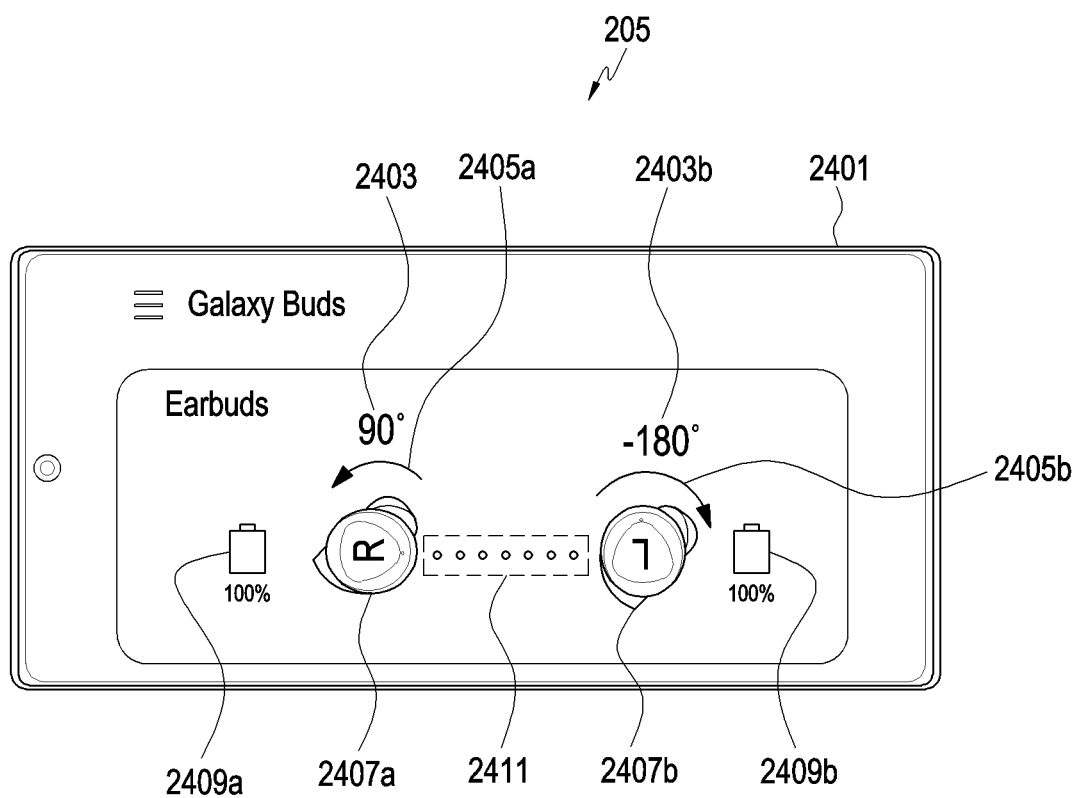
FIG. 24 is a diagram illustrating an operation in which a second external electronic device provides information about a first electronic device and/or a second electronic device according to various embodiments.

FIG. 24 is a diagram illustrating an operation in which a second external electronic device 205 provides information about a first electronic device (e.g., the first electronic device 201 in FIG. 2) and/or a second electronic device (e.g., the second electronic device 202 in FIG. 2) according to various embodiments.

According to various embodiments, the second external electronic device 205 may receive information about an wearing angle and/or reverse or non-reverse wearing of each of the first electronic device 201 and/or the second electronic device 202 from the first electronic device 201. According to various embodiments, the second external electronic device 205 may also receive information about an wearing angle and/or reverse or non-reverse wearing of the first electronic device 201 from the first electronic device 201 and receive information about an wearing angle of the second electronic device 202 from the second electronic device 202. According to various embodiments, the second external electronic device 205 may receive battery state information of each of the first electronic device 201 and the second electronic device 202 from the first electronic device 201. The second external electronic device 205 may also receive battery state information of the first electronic device 201 from the first electronic device 201 and receive battery state information of the second electronic device 202 from the second electronic device 202.

According to various embodiments, the second external electronic device 205 may display information about the first electronic device 201 and/or the second electronic device 202 through a display 2401 (e.g., the display module 160 in FIG. 1).

For example, the second external electronic device 205 may display the information about the wearing angle of the first electronic device 201 and the information about the wearing angle of the second electronic device 202. Referring to FIG. 24, of the wearing angle 2403*a* (e.g., 90°) of the first electronic device 201 and the rotated wearing direction 2403*b* (e.g., a counterclockwise direction) of the first electronic device 201 may be displayed. The wearing angle 2405*a* (e.g., 180°) of the second electronic device 202 and the rotated wearing direction 2405*b* (e.g., a clockwise direction) of the second electronic device 202 may be displayed.

For example, the second external electronic device 205 may display information about the wearing state (e.g., reverse wearing or non-reverse wearing) of the first electronic device 201 and the second electronic device 202. Referring to FIG. 24, an icon 2407*a* corresponding to the first electronic device 201 ("R") is displayed on the left, and an icon 2407*b* corresponding to the second electronic device 202 ("L") is displayed on the right, thereby displaying information indicating a reverse wearing state.

For example, the second external electronic device 205 may display battery state information of each of the first electronic device 201 and the second electronic device 202. Referring to FIG. 24, an icon 2409*a* indicating the battery state (e.g., the remaining battery level (100%)) of the first electronic device 201 and an icon 2409*b* indicating the battery state (e.g., the remaining battery level (100%)) of the second electronic device 202 may be displayed. The icon 2409*a* indicating the battery state (e.g., the remaining battery level (100%)) of the first electronic device 201 may be displayed adjacent to the icon 2407*a* corresponding to the first electronic device 201 ("R"), and the icon 2409*b* indicating the battery state (e.g., the remaining battery level (100%)) of the second electronic device 202 may be displayed adjacent to the icon 2407*b* corresponding to the second electronic device 202 ("L").

For example, the second external electronic device 205 may display information indicating separate or non-separate wearing of the first electronic device 201 and the second electronic device 202. Referring to FIG. 24, if the first electronic device 201 and the second electronic device 202 are in the state of being worn on the same user (e.g., not in a separate wearing state), an indicator 2411 indicating a non-separate wearing state may be displayed. If the first electronic device 201 and the second electronic device 202 are in a separate wearing state, in order to indicate the separate wearing state, the indicator 2411 may not be displayed, or an indicator different from the indicator 2411 and/or text may be displayed.

In the state in which one of either the first electronic device 201 or the second electronic device 202 is not worn on the user (e.g., when it is located inside the first external electronic device 204), the second external electronic device 205 may not display one of either the icon 2407*a* corresponding to the first electronic device 201 ("R") or the icon 2407*b* corresponding to the second electronic device 202 ("L").

Figure 25:
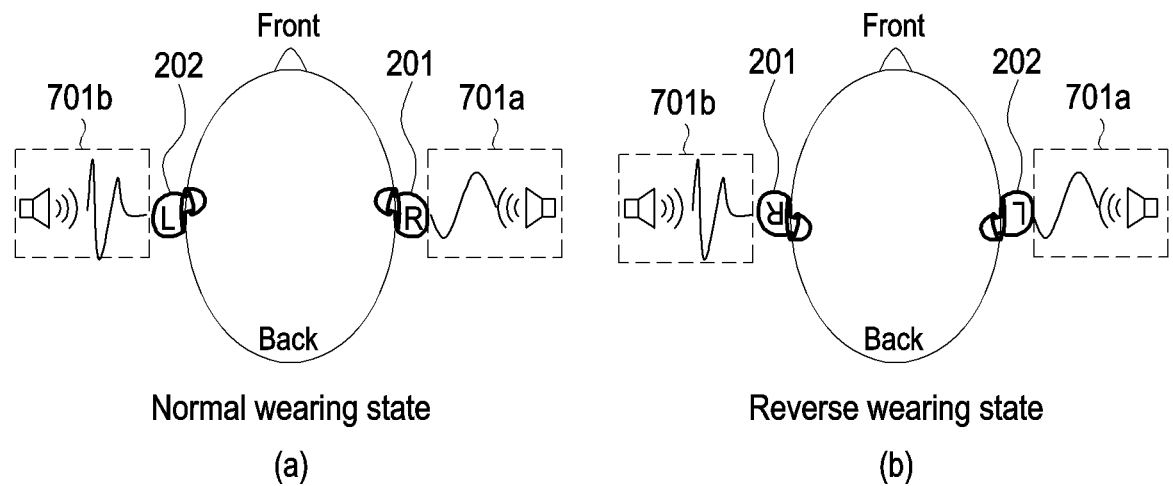
FIG. 25 is a diagram illustrating a method in which a first electronic device and a second electronic device control provision of stereo sound, based on reverse or non-reverse wearing, according to various embodiments.

FIG. 25 is a diagram illustrating a method in which a first electronic device 201 and a second electronic device 202 control provision of stereo sound, based on reverse or non-reverse wearing, according to various embodiments. Hereinafter, a description will be made with reference to FIG. 7 as well.

According to various embodiments, the first electronic device (e.g., the processor 290 in FIG. 2) may identify, when worn on the user, the wearing state of the first electronic device 201 and the second electronic device 202 according to, for example, the operation in FIG. 20 or 21.

According to various embodiments, the first electronic device (e.g., the processor 290 in FIG. 2) may transmit information about the wearing state of the first electronic device 201 and the second electronic device 202 (e.g., information indicating reverse or non-reverse wearing) to the second electronic device 202 through a communication module (e.g., the communication module 210 in FIG. 2). According to various embodiments, the first electronic device (e.g., the processor 290 in FIG. 2) may transmit information about the wearing state of the first electronic device 201 and the second electronic device 202 (e.g., information indicating a reverse wearing state) if the first electronic device 201 and the second electronic device 202 are identified to be in the reverse wearing state, and may not transmit information about the wearing state (e.g., information indicating reverse or non-reverse wearing) if they are identified to be in a normal wearing state. According to various embodiments, the first electronic device (e.g., the processor 290 in FIG. 2) may transmit, through a communication module (e.g., the communication module 210 in FIG. 2), information about the wearing state (e.g., information indicating reverse or non-reverse wearing) to the second external electronic device (e.g., the second external electronic device 205 in FIG. 2), and the second external electronic device 205 may transmit the information about the wearing state (e.g., information indicating reverse or non-reverse wearing) to the second electronic device 202.

Referring to (a) of FIG. 25, if it is identified as a normal wearing state, the first electronic device (e.g., the processor 290 in FIG. 2) may output an audio signal 701*a* corresponding to the right ear. If the received information about the wearing state indicates a normal wearing state or if the information about the wearing state is not received from the first electronic device (e.g., the processor 290 in FIG. 2), the second electronic device 202 may output an audio signal 701*b* corresponding to the left ear.

Referring to (b) of FIG. 25, if it is identified as a reverse wearing state, the first electronic device (e.g., the processor 290 in FIG. 2) may output an audio signal 701*b* corresponding to the left ear. If the received information about the wearing state indicates a reverse wearing state, the second electronic device 202 may output an audio signal 701*a* corresponding to the right ear.

Figure 26:
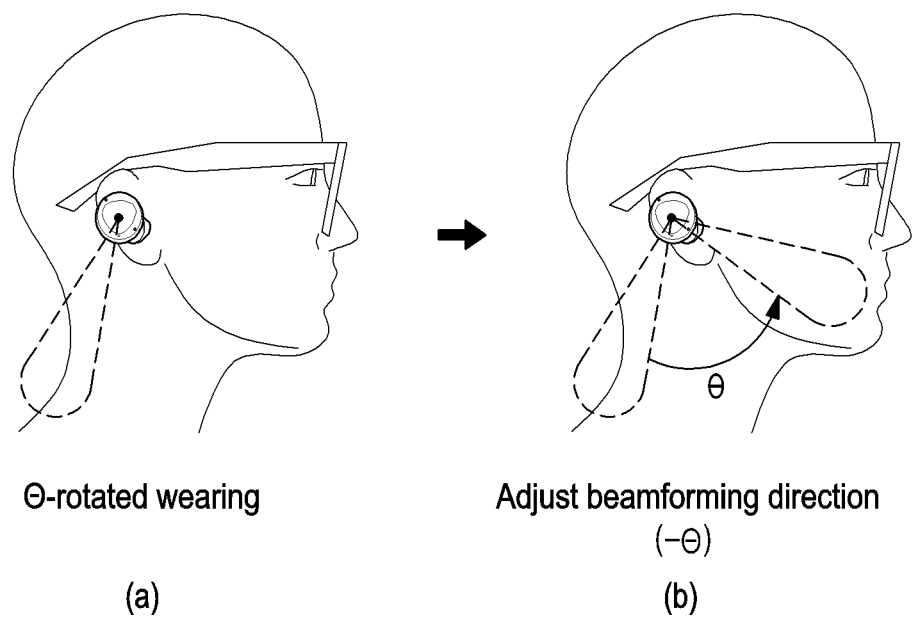
FIG. 26 is a diagram illustrating a method in which a first electronic device controls a beamforming microphone, based on a wearing angle and/or reverse or non-reverse wearing, according to various embodiments.

FIG. 26 is a diagram illustrating a method in which a first electronic device 201 controls a beamforming microphone, based on a wearing angle and/or reverse or non-reverse wearing, according to various embodiments. Hereinafter, a description will be made with reference to FIGS. 5A and 6A as well.

According to various embodiments, the first electronic device (e.g., the processor 290 in FIG. 2) may identify an angle θ at which the first electronic device 201 is rotated and worn on the user and whether the first electronic device 201 is reversely worn.

Referring to (a) and (b) of FIGS. 26, the first electronic device (e.g., the processor 290 in FIG. 2) may adjust a preconfigured direction (e.g., 503 in FIG. 5A), based on a wearing angle θ and reverse or non-reverse wearing. For example, if the first electronic device 201 is rotated and worn, it is possible to identify a direction obtained by adjusting a preconfigured direction (e.g., 503 in FIG. 5A) by θ in a direction opposite the rotated wearing direction, based on the wearing angle θ. For example, if the first electronic device 201 is reversely worn, it is possible to identify a direction obtained by adjusting a preconfigured direction (e.g., 503 in FIG. 5A) by 180 degrees.

According to various embodiments, the first electronic device (e.g., the processor 290 in FIG. 2) may adjust the degree of time delay performed on at least one of the first microphone 501*a* or the second microphone 501*b*, based on the identified direction. For example, the first electronic device (e.g., the processor 290 in FIG. 2) may identify a difference (D(1−cos(d))) of an expected sound path, based on the identified direction, and adjust the degree of time delay (e.g., a beamforming parameter) performed on at least one of the first microphone 501*a* and the second microphone 501*b*, based thereon.

According to various embodiments, a first electronic device may include at least one sensor and at least one processor, wherein the at least one processor may be configured to, detect a first movement of the first electronic device using the at least one sensor, identify a position of a rotation center point of the detected first movement, identify a classification of the first movement, based on the identified position of the rotation center point, and identify a first wearing angle of the first electronic device, based on the identified classification.

According to various embodiments, the at least one processor may be further configured to, identify at least one of a first linear velocity vector of the first movement or a first angular velocity vector of the first movement, based on sensing data obtained from the at least one sensor, and identify coordinates of the rotation center point, based on at least one of the first linear velocity vector or the first angular velocity vector.

According to various embodiments, the at least one processor may be configured to, identify whether or not the identified coordinates of the rotation center point are included in at least one range, and the at least one range may be a range preconfigured based on at least one axis corresponding to an expected inserting angle of the first electronic device.

According to various embodiments, the at least one processor may be configured to, identify, if the identified coordinates of the rotation center point are included in a first range among the at least one range, the classification of the first movement as a first classification, and wherein the first range among the at least one range may include a region configured as at least one plane perpendicular to the at least one axis.

According to various embodiments, the at least one processor may be configured to, identify, if the classification of the first movement is identified as the first classification, at least one of the first wearing angle or a first inserting angle of the first electronic device, based on the coordinates of the rotation center point.

According to various embodiments, the first electronic device may further include a communication circuit, and the at least one processor may be further configured to, receive information about a second movement of the second electronic device corresponding to the first movement from a second electronic device using the communication circuit and identify, if the classification of the first movement is identified as the first classification, a wearing state of the first electronic device and a wearing state of the second electronic device, based on the first linear velocity vector and the information about the second movement.

According to various embodiments, the at least one processor may be configured to convert the first linear velocity vector, based on the first wearing angle and the first inserting angle, identify the converted second linear velocity vector of the second movement, based on the information about the second movement, and identify the wearing state of the first electronic device and the wearing state of the second electronic device, based on the converted first linear velocity vector and the converted second linear velocity vector.

According to various embodiments, the at least one processor may be configured to identify, if the identified coordinates of the rotation center point are included in a second range among the at least one range, the classification of the first movement as a second classification, and wherein the second range may include a region configured as at least one conical surface having the at least one axis as a center axis.

According to various embodiments, the at least one processor of the first electronic device may be configured to identify, if the classification of the first movement is identified as the second classification, identify at least one of one or more wearing angles or the first inserting angle of the first electronic device, based on the identified coordinates of the first angular velocity vector.

According to various embodiments, the at least one processor may be configured to determine, if the classification of the first movement is identified as the second classification, any one of the one or more wearing angles to be the first wearing angle, based on the first linear velocity vector.

According to various embodiments, the at least one processor may be further configured to, identify a gravitational acceleration vector using the at least one sensor, convert the identified gravitational acceleration vector, based on the determined first wearing angle, and determine another one of the one or more wearing angles to be the first wearing angle for identifying the wearing state of the first electronic device, based on the converted gravitational acceleration vector.

According to various embodiments, the at least one processor may be configured to, identify whether or not a z-axis component of the converted gravitational acceleration vector is negative and determine, if the z-axis component is identified as not negative, another one of the one or more wearing angles to be the first wearing angle.

According to various embodiments, the at least one processor may be configured to, identify the wearing state of the first electronic device, based on the determine first wearing angle and the first inserting angle.

According to various embodiments, the at least one processor may be further configured to, identify, if the identified coordinates of the first angular velocity vector are included in a third range, the classification of the first movement as a second classification, and wherein the third range may include a region configured as at least one plane perpendicular to at least one axis corresponding to an expected inserting angle of the first electronic device.

According to various embodiments, the at least one processor may be configured to, identify whether or not the classification of the first movement is a third classification, based on the first linear velocity vector and the first angular velocity vector and identify, if the classification of the first movement is identified as the third classification, the coordinates of the rotation center point.

According to various embodiments, the first electronic device may further include a communication circuit, and the at least one processor may be configured to, receive information about a second movement of a second electronic device corresponding to the first movement from the second electronic device using the communication circuit, identify a first acceleration vector of the first movement, and identify separate or non-separate wearing of the first electronic device and the second electronic device, based on the identified first acceleration vector and information about the second movement.

According to various embodiments, a method for controlling a first electronic device may include: detecting a first movement of the first electronic device using at least one sensor of the first electronic device; identifying a position of a rotation center point of the detected first movement; identifying a classification of the first movement, based on the identified position of the rotation center point; and identifying a first wearing angle of the first electronic device, based on the identified classification.

According to various embodiments, the identifying of the position of the rotation center point of the detected first movement may further include: identifying at least one of a first linear velocity vector of the first movement and a first angular velocity vector of the first movement, based on sensing data obtained from the at least one sensor; and identifying the coordinates of the rotation center point, based on at least one of the identified first linear velocity vector or the identified first angular velocity vector.

According to various embodiments, a first electronic device may include: at least one beamforming microphone; at least one sensor; and at least one processor, wherein the at least one processor may be configured to, detect a first movement of the first electronic device using the at least one sensor, identify a position of a rotation center point of the detected first movement, identify a first wearing angle of the first electronic device, based on the identified position of the rotation center point, and adjust at least one parameter for the at least one beamforming microphone, based on the identified first wearing angle.

According to various embodiments, the first electronic device may further include a communication circuit, and the at least one processor may be further configured to, receive voice data from a second external electronic device using the communication circuit, identify a first wearing state of the first electronic device, based on the identified position of the rotation center point, and output a voice corresponding to the identified first wearing state to the outside, based on the received voice data.

The electronic device according to various embodiments may be one of various classifications of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   at least one sensor; and
   at least one processor configured to:
      detect a first movement of the electronic device using the at least one sensor,
      identify a position of a rotation center point of the detected first movement,
      identify a classification of the first movement, based on the identified position of the rotation center point, and
      identify a first wearing angle of the electronic device, based on the identified classification.

2. The electronic device of claim 1, wherein the at least one processor is further configured to:
   identify at least one of a first linear velocity vector of the first movement or a first angular velocity vector of the first movement, based on sensing data obtained from the at least one sensor, and
   identify coordinates of the rotation center point, based on at least one of the first linear velocity vector or the first angular velocity vector.

3. The electronic device of claim 2, wherein the at least one processor is further configured to identify whether the identified coordinates of the rotation center point are included in at least one range, and
   wherein the at least one range is a range preconfigured based on at least one axis corresponding to an expected inserting angle of the electronic device into a user.

4. The electronic device of claim 3, wherein the at least one processor is further configured to, based on the identified coordinates of the rotation center point being included in a first range of the at least one range, identify the classification of the first movement as a first classification, and
   wherein the first range comprises a region configured as at least one plane perpendicular to the at least one axis.

5. The electronic device of claim 4, wherein the at least one processor is further configured to, based on the classification of the first movement being identified as the first classification, identify the first wearing angle or a first inserting angle of the electronic device, based on the coordinates of the rotation center point.

6. The electronic device of claim 5, further comprising a communication circuit,
   wherein the at least one processor is further configured to:
      receive, from a second electronic device via the communication circuit, information about a second movement of the second electronic device corresponding to the first movement, and
      based on the classification of the first movement being identified as the first classification, identify a wearing state of the first electronic device and a wearing state of the second electronic device, based on the first linear velocity vector and the information about the second movement.

7. The electronic device of claim 6, wherein the at least one processor is further configured to:
   convert the first linear velocity vector, based on the first wearing angle and the first inserting angle,
   identify the converted second linear velocity vector of the second movement, based on the information about the second movement, and
   identify the wearing state of the first electronic device and the wearing state of the second electronic device, based on the converted first linear velocity vector and the converted second linear velocity vector.

8. The electronic device of claim 3, wherein the at least one processor is configured to, based on the identified coordinates of the rotation center point being included in a second range of the at least one range, identify the classification of the first movement as a second classification, and
   wherein the second range comprises a region configured as at least one conical surface having the at least one axis as a center axis.

9. The electronic device of claim 8, wherein the at least one processor is further configured to, based on the classification of the first movement being identified as the second classification, identify one or more wearing angles or a first inserting angle of the electronic device, based on the identified coordinates of the rotation center point based on the first angular velocity vector.

10. The electronic device of claim 9, wherein the at least one processor is further configured to, based on the classification of the first movement being identified as the second classification, identify one of the one or more wearing angles as the first wearing angle, based on the first linear velocity vector.

11. The electronic device of claim 10, wherein the at least one processor is further configured to:
- identify a gravitational acceleration vector using the at least one sensor,
- convert the identified gravitational acceleration vector, based on the determined first wearing angle, and
- identify another one of the one or more wearing angles as the first wearing angle for identifying a wearing state of the first electronic device, based on the converted gravitational acceleration vector.

12. The electronic device of claim 11, wherein the at least one processor is further configured to:
- identify whether a z-axis component of the converted gravitational acceleration vector is negative, and
- based on the z-axis component being identified as not negative, identify another one of the one or more wearing angles as the first wearing angle.

13. The electronic device of claim 10, wherein the at least one processor is further configured to identify a wearing state of the first electronic device, based on the identified first wearing angle and the first inserting angle.

14. The electronic device of claim 2, wherein the at least one processor is further configured to, based on the identified coordinates of the first angular velocity vector being included in a third range, identify the classification of the first movement as a second classification, and
- wherein the third range comprises a region configured as at least one plane perpendicular to at least one axis corresponding to an expected inserting angle of the electronic device into a user.

15. A method for controlling an electronic device, the method comprising:
- detecting a first movement of the electronic device using at least one sensor of the electronic device;
- identifying a position of a rotation center point of the detected first movement;
- identifying a classification of the first movement, based on the identified position of the rotation center point; and
- identifying a first wearing angle of the first electronic device, based on the identified classification.

16. The method of claim 15, wherein the identifying the position of the rotation center point of the detected first movement comprises:
- identifying at least one of a first linear velocity vector of the first movement or a first angular velocity vector of the first movement, based on sensing data received from the at least one sensor, and
- identifying coordinates of the rotation center point, based on at least one of the first linear velocity vector or the first angular velocity vector.

17. The method of claim 16, wherein the identifying the classification of the first movement comprises identifying whether the coordinates of the rotation center point are included in at least one range, and
- wherein the at least one range is a range preconfigured based on at least one axis corresponding to an expected inserting angle of the electronic device into a user.

18. The method of claim 17, wherein the identifying the classification of the first movement further comprises, based on the coordinates of the rotation center point being included in a first range of the at least one range, identifying that the classification of the first movement is a first classification, and
- wherein the first range comprises a region configured as at least one plane perpendicular to the at least one axis.

19. The method of claim 18, wherein the identifying the first wearing angle of the electronic device comprises, based on the classification of the first movement being identified as the first classification, identifying the first wearing angle of the electronic device, based on the coordinates of the rotation center point.

20. The method of claim 19, further comprising:
- receiving, from a second electronic device, information about a second movement of the second electronic device corresponding to the first movement, and
- based on the classification of the first movement being identified as the first classification, identifying a wearing state of the first electronic device and a wearing state of the second electronic device, based on the first linear velocity vector and the information about the second movement.

* * * * *